(12) United States Patent
Oba et al.

(10) Patent No.: US 12,534,563 B2
(45) Date of Patent: Jan. 27, 2026

(54) BLOCK COPOLYMER, RESIN COMPOSITION, STRETCH CONDUCTOR, ELECTRONIC DEVICE, AND PRESSURE-SENSITIVE ADHESIVE FILM

(71) Applicants: artience Co., Ltd., Tokyo (JP); NANYANG TECHNOLOGICAL UNIVERSITY, Singapore (SG)

(72) Inventors: Kazutoshi Oba, Tokyo (JP); Yukie Matsuda, Tokyo (JP); Yuki Mizuno, Tokyo (JP); Atsushi Nakazato, Tokyo (JP); Atsushi Goto, Singapore (SG)

(73) Assignees: artience CO., LTD., Tokyo (JP); NANYANG TECHNOLOGICAL UNIVERSITY, Singapore (SG)

( * ) Notice: Subject to any disclaimer, the term of this patent is extended or adjusted under 35 U.S.C. 154(b) by 729 days.

(21) Appl. No.: 17/784,097

(22) PCT Filed: Dec. 8, 2020

(86) PCT No.: PCT/JP2020/045680
§ 371 (c)(1),
(2) Date: Jun. 9, 2022

(87) PCT Pub. No.: WO2021/117723
PCT Pub. Date: Jun. 17, 2021

(65) Prior Publication Data
US 2023/0050336 A1    Feb. 16, 2023

(30) Foreign Application Priority Data

Dec. 13, 2019 (JP) ................. 2019-225478
Mar. 30, 2020 (JP) ................. 2020-060765

(51) Int. Cl.
| | |
|---|---|
| *C08F 297/02* | (2006.01) |
| *C08F 8/34* | (2006.01) |
| *C08F 293/00* | (2006.01) |
| *C09J 7/38* | (2018.01) |
| *H01B 5/02* | (2006.01) |

(52) U.S. Cl.
CPC ......... *C08F 297/026* (2013.01); *C08F 8/34* (2013.01); *C08F 293/005* (2013.01); *C09J 7/38* (2018.01); *H01B 5/02* (2013.01)

(58) Field of Classification Search
CPC ...... C08F 293/00; C08F 293/005; C08F 8/34; C08L 53/00; C08L 53/005; C09J 7153/00; C09J 153/005; C09J 7/38; C09J 7/387
See application file for complete search history.

(56) References Cited

U.S. PATENT DOCUMENTS

| | | |
|---|---|---|
| 2017/0169914 A1 | 6/2017 | Sekitani et al. |
| 2018/0230287 A1 | 8/2018 | Shiozawa |
| 2019/0194368 A1 | 6/2019 | Fujii et al. |

FOREIGN PATENT DOCUMENTS

| | | | |
|---|---|---|---|
| CN | 1615350 A | * | 5/2005 |
| EP | 2924695 | | 9/2015 |
| JP | 2003147312 | | 5/2003 |
| JP | 2017019974 | | 1/2017 |
| JP | 2019112591 | | 7/2019 |
| WO | WO9211332 A1 | * | 7/1992 |
| WO | 2014080470 | | 5/2014 |
| WO | 2015119217 | | 8/2015 |
| WO | 2016067406 | | 5/2016 |
| WO | 2017026420 | | 2/2017 |
| WO | 2018055890 | | 3/2018 |

OTHER PUBLICATIONS

"Notice of Reasons for Refusal of Japan Counterpart Application", issued on Mar. 12, 2024, with English translation thereof, p. 1-p. 6.
"International Search Report (Form PCT/ISA/210) of PCT/JP2020/045680," mailed on Feb. 2, 2021, with English translation thereof, pp. 1-4.
"Office Action of Japan Counterpart Application", issued on Aug. 4, 2020, with English translation thereof, p. 1-p. 8.
"Request for the Submission of an Opinion of Korea Counterpart Application", with English translation thereof, issued on Aug. 15, 2024, pp. 1-15.
"Notice of Reasons for Refusal of Japan Counterpart Application", with English translation thereof, issued on Sep. 17, 2024, pp. 1-5.

* cited by examiner

*Primary Examiner* — Jeffrey S Lenihan
(74) *Attorney, Agent, or Firm* — JCIPRNET

(57) ABSTRACT

A block copolymer consists mainly of structural units each derived from an ethylenically unsaturated monomer and has at least one mercapto group. The block copolymer has an Mn of 5,000-500,000 and has a block structure, which is an A-B-A triblock structure or a star-shaped block structure of [A-B]qX. The q is an integer of 2-6. The polymer block (A) has a glass transition temperature of 20° C. or higher. The polymer block (B) of the triblock structure has a glass transition temperature lower than 20° C., and the [polymer block (B)]qX of the star-shaped block structure has a glass transition temperature lower than 20° C. The X is an initiator residue or/and a coupling-agent residue or is a derivative thereof.

18 Claims, 8 Drawing Sheets

BLOCK COPOLYMER, RESIN COMPOSITION, STRETCH CONDUCTOR, ELECTRONIC DEVICE, AND PRESSURE-SENSITIVE ADHESIVE FILM

CROSS-REFERENCE TO RELATED APPLICATION

This application is a 371 application of the international PCT application serial no. PCT/JP2020/045680, filed on Dec. 8, 2020, which claims the priority benefits of Japan application no. 2019-225478, filed on Dec. 13, 2019, and Japan application no. 2020-060765, filed on Mar. 30, 2020. The entirety of each of the above-mentioned patent applications is hereby incorporated by reference herein and made a part of this specification.

TECHNICAL FIELD

The present invention relates to a block copolymer, also relates to a resin composition containing the block copolymer, and also relates to a stretch conductor formed of the resin composition, an electronic device having the stretch conductor, and a pressure-sensitive adhesive film having an adhesive layer formed of the resin composition.

BACKGROUND ART

Pressure-sensitive adhesive materials and conductive substances are used in various industrial fields, and various proposals have been made for further improving the functionality of these materials. For example, as a pressure-sensitive adhesive material, a (meth)acrylic pressure-sensitive adhesive tape having a hydroxy group or a carboxyl group obtained by living radical polymerization (Patent Literature 1) and an adhesive using a triblock polymer having a carboxyl group as an adhesive composition for a polarizing plate have been proposed (Patent Literature 2).

In addition, as a conductive substance, a flexible conductive member including a base material having stretchability and conductive layers including a first conductive layer formed of a specific highly electrically conducting substance and a second conductive layer formed of a specific highly extensible conductive substance is disclosed (Patent Literature 3). In addition, a stretch conductor which is composed of a mixture including a stretchable part formed of an elastomer and at least one type of conductive particles dispersed in the stretchable part, and in which a conduction part in which conductive particles are more densely aggregated than the inner side of the mixture is formed at one or more positions of the interface of the mixture has been proposed (Patent Literature 4).

In addition, a conductive composition containing at least one of a block copolymer represented by $X_1$—Y—$X_2$ (where, $X_1$ and $X_2$ each independently represent a polymer unit having a glass transition point Tg of 0° C. or higher, and Y represents a polymer unit having a glass transition point Tg of lower than 0° C.) and a functional-group-containing elastomer such as a styrene elastomer, and a chain-like silver powder having a tap density of 2.0 g/cm$^3$ or less is disclosed (Patent Literature 5). In addition, an electrically conducting material containing a (meth)acrylic elastomer having a weight average molecular weight of 1.2 million to 10 million and a conductive material has been proposed (Patent Literature 6).

CITATION LIST

Patent Literature

Patent Literature 1: PCT International Publication No. WO2016/067406
Patent Literature 2: Japanese Patent Laid-Open No. 2017-19974
Patent Literature 3: PCT International Publication No. WO2015/119217
Patent Literature 4: PCT International Publication No. WO2014/080470
Patent Literature 5: PCT International Publication No. WO2017/026420
Patent Literature 6: PCT International Publication No. WO2018/055890

SUMMARY OF INVENTION

Technical Problem

With the progress in the fields of healthcare devices such as biosensing, wearable devices, and robotics, conductive substances and pressure-sensitive adhesive materials having excellent stretchability are required. In these applications, in addition to properties (conductivity and pressure-sensitive adhesiveness) of respective materials, stretchability that can conform with a curved part and a movable part during processing and/or during use is required.

When a conductive substance or a pressure-sensitive adhesive material is used for a curved part or a movable part, there is a problem that cracks are likely to occur in the resin itself due to structural destruction of the resin due to repeated stretching. In particular, in the case of a conductive substance, since a conductive material is added, the conductive material is peeled off from the resin during extension, voids are generated in the resin, and cracks are likely to occur with the voids as the starting points. In addition, the pressure-sensitive adhesive material has a problem of being easily peeled off from an adherend due to stretching in addition to cracks due to extension.

Here, although problems with the conductive substance and the pressure-sensitive adhesive material have been described above, the same problems may occur with resin compositions for other applications or the resin itself which functions as a binder.

The present invention has been made in view of the above background, and an objective of the present invention is to provide a block copolymer which has excellent stretchability and can effectively reduce the occurrence of cracks during extension, a resin composition, a pressure-sensitive adhesive film, a stretch conductor formed of the resin composition, and an electronic device containing the stretch conductor.

Solution to Problem

The inventors conducted extensive studies, and as a result, found that the problems of the present invention can be addressed in the following aspects, and completed the present invention.

[1]: A block copolymer mainly composed of a structural unit derived from an ethylenically unsaturated monomer, which has at least one mercapto group, a number average molecular weight of 5,000 to 500,000, has a block structure that is a triblock structure of polymer block (A)-polymer block (B)-polymer block (A) or a star-shaped block structure of [polymer block (A)-polymer block (B)]$_q$X, wherein q represents an integer of 2 or more and 6 or less, the glass transition temperature of the polymer block (A) is 20° C. or higher, the glass transition temperature of the polymer block (B) in the case of the triblock structure and the glass transition temperature of [polymer block (B)]$_q$X in the case of the star-shaped block structure are lower than 20° C., and X represents an initiator residue and/or a coupling agent residue, or its derivatives.

[2]: The block copolymer according to [1], wherein at least some of the mercapto groups are introduced by a thiol-ene reaction between an alkenyl group of a precursor of the block copolymer and a compound represented by General Formula (1):

[Chem. 1]

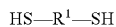

HS—R$^1$—SH      General Formula (1)

where R$^1$ each independently represents a divalent organic group having at least one selected from among an alkylene group, an arylene group, a heterocyclic group and an alkylene oxide group, which may have a substituent.

[3]: The block copolymer according to [1] or [2], which is obtained by a living radical polymerization method.

[4]: The block copolymer according to any one of [1] to [3], wherein the block copolymer contains an organic iodine-based living radical polymerization initiator residue and has any structure of the following General Formulae (2) to (4):

[Chem. 2]

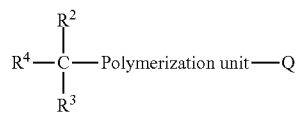

General Formula (2)

[Chem. 3]

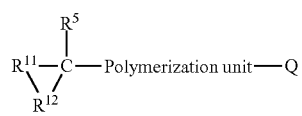

General Formula (3)

[Chem. 4]

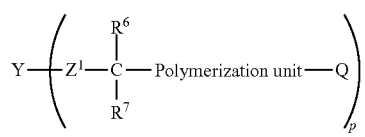

General Formula (4)

where the polymerization unit is a polymer unit mainly composed of a structural unit derived from an ethylenically unsaturated monomer independently for each branch from Y in the case of General Formula (4), Z$^1$ each independently represents a divalent group selected from the group consisting of an ester group, a ketone group and an amide group, or a direct bond for each branch from Y, Q represents a monovalent molecular terminal group, and the molecular terminal group is a functional group, a hydrocarbon group which may have a functional group, or an iodine group independently for each branch from Y, Y represents a p-valent hydrocarbon group which may have a substituent, p represents an integer of 2 to 6, R$^2$, R$^5$ and R$^6$ each independently represent a hydrogen atom or a monovalent hydrocarbon group which may have a substituent independently for each branch from Y in the case of General Formula (4), R$^3$ and R$^7$ each independently represent a hydrogen atom, a monovalent hydrocarbon group which may have a substituent or —COR$^8$ independently for each branch from Y in the case of General Formula (4), R$^4$ represents a monovalent hydrocarbon group which may have a substituent, —COR$^8$, a cyano group or a nitro group, R$^2$ and R$^3$, R$^3$ and R$^4$, R$^2$ and R$^4$ and R$^6$ and R$^7$ each independently may be bonded to each other to form a ring independently for each branch from Y in the case of General Formula (4), R$^8$ each independently represents a hydrogen atom, a hydroxy group, an alkoxy group, an amino group or a monovalent hydrocarbon group which may have a substituent, R$^{11}$ represents a divalent hydrocarbon group, which may have a substituent, R$^{12}$ represents a divalent hydrocarbon group selected from the group consisting of an alkylene group, an arylene group and an alkylene oxide group or a direct bond, and the hydrocarbon group may have a heterocycle, and each independently include at least one of a chain hydrocarbon group, an alicyclic hydrocarbon group and an aromatic hydrocarbon group.

[5]: The block copolymer according to [4], wherein the mercapto group is introduced into at least a part of the molecular terminal of the polymer block (A).

[6]: The block copolymer according to any one of [1] to [5], wherein the polymer block (A) contains 50 mass % or more of a structural unit derived from a methacrylic acid ester, and the polymer block (B) contains 70 mass % or more of a structural unit derived from an acrylic acid ester.

[7]: The block copolymer according to any one of [1] to [6], wherein the polymer block (A) contains 50 mass % or more of a structural unit derived from methyl methacrylate and the polymer block (B) contains 70 mass % or more of a structural unit derived from butyl acrylate.

[8]: The block copolymer according to any one of [1] to [7], wherein 90 mass % or more of the ethylenically unsaturated monomer is a hydrophobic ethylenically unsaturated monomer.

[9]: The block copolymer according to any one of [1] to [8], wherein the degree of polydispersity (Mw/Mn) is 2.5 or less.

[10]: The block copolymer according to any one of [1] to [9], wherein the content of the polymer block (A) with respect to the polymer block (A) and the polymer block (B) of the block copolymer is in a range of 1 to 50 mass %.

[11]: The block copolymer according to any one of [1] to [10], wherein the molar concentration of the mercapto group contained in 1 g of the block copolymer is in a range of 0.00001 to 1.0 mmol/g.

[12]: A resin composition containing the block copolymer according to any one of [1] to [11].

[13]: The resin composition according to [12], wherein the content of iodine with respect to the block copolymer is in a range of 0.0001 to 10,000 ppm (by mass).

[14]: The resin composition according to [12] or [13], which contains a cross-linking agent that is able to crosslink with the block copolymer.

[15]: The resin composition according to any one of [12] to [14], further containing at least one conductive material selected from the group consisting of conductive fine particles and conductive nanowires.

[16]: A stretch conductor formed of the resin composition according to [15].

[17]: An electronic device having the stretch conductor according to [16].

[18]: A pressure-sensitive adhesive film having an adhesive layer formed of the resin composition according to any one of [12] to [15].

Advantageous Effects of Invention

The present invention has an excellent effect of providing a block copolymer which has excellent stretchability and can effectively reduce the occurrence of cracks during extension, a resin composition, a pressure-sensitive adhesive film, a stretch conductor formed of the resin composition, and an electronic device containing the stretch conductor.

DESCRIPTION OF EMBODIMENTS

Figure 1:
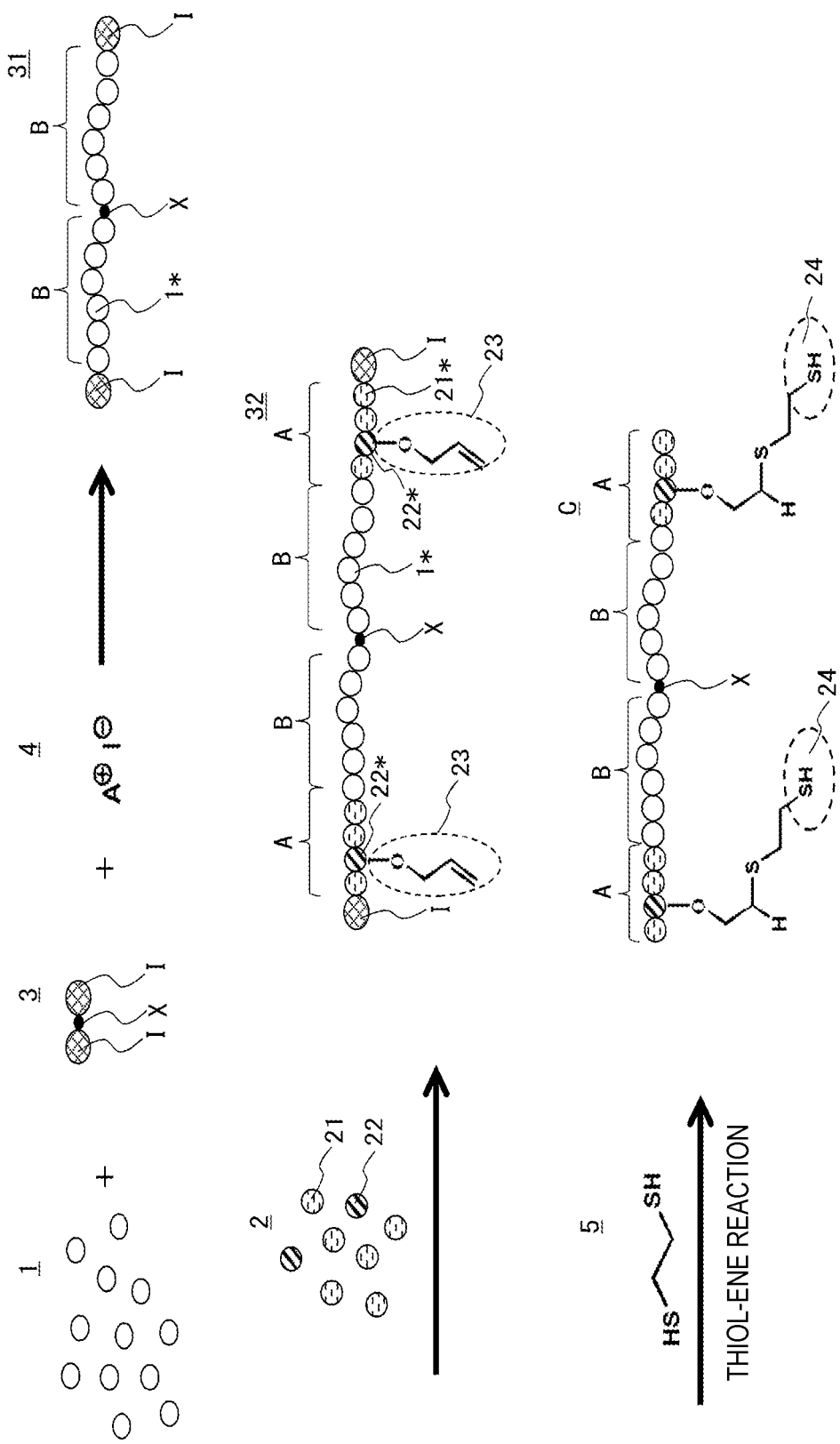
FIG. 1 is a schematic view for explaining a method for producing a block copolymer according to Production Example 1.

Hereinafter, an example of an embodiment to which the present invention is applied will be described. The numerical values specified in this specification are values obtained by methods described in the embodiments or examples. Here, other embodiments are also included in the scope of the present invention as long as they are within the spirit of the present invention. In addition, descriptions of the film in the present invention could also apply to a sheet, a tape or a label. In addition, unless otherwise specified, each of various components can be independently used or two or more thereof can be used in combination.

<Block Copolymer>

A block copolymer (C) according to the present embodiment is a block copolymer which is mainly composed of the structural unit derived from an ethylenically unsaturated monomer, has at least one mercapto group, has a number average molecular weight of 5,000 to 500,000, and has a block structure that is a triblock structure of polymer block (A)-polymer block (B)-polymer block (A) or a star-shaped block structure of [polymer block (A)-polymer block (B)]$_q$ X. Here, q represents an integer of 2 or more and 6 or less. In addition, the glass transition temperature of the polymer block (A) is set to 20° C. or higher, the glass transition temperature of the polymer block (B) in the case of the triblock structure is set to lower than 20° C., and the glass transition temperature of [polymer block (B)]$_q$X in the case of the star-shaped block structure is set to lower than 20° C. X represents an initiator residue and/or a coupling agent residue, or its derivative. Here, in the following description, the polymer block (A) and the polymer block (B) may be simply referred to as A and B, respectively.

In this specification, "ethylenically unsaturated monomer" refers to a monomer having one or more polymerizable ethylenically unsaturated groups in the molecule. In addition, "mainly composed of" means that the content of the structural unit derived from the ethylenically unsaturated monomer based on the total mass of the block copolymer (C) is 70 mass % or more. In addition, "triblock structure" refers to a structure composed of three blocks, polymer block (A)-polymer block (B)-polymer block (A), among the block structures, and "star-shaped block structure" refers to a structure of [polymer block (A)-polymer block (B)]$_q$X in which a plurality of (2 to 6) diblock components of polymer block (B)-polymer block (A) are bonded with X as a starting point (X and the polymer block (B) are bonded).

In addition, "initiator residue" refers to a partial structure derived from an initiator and indicates a residue derived from the initiator in the block copolymer (C). In addition, "coupling agent residue" refers to a partial structure derived from a coupling agent and indicates a residue derived from the coupling agent in the block copolymer (C). In addition, "its derivatives" refers to a structure in which a part of the initiator residue and/or the coupling agent residue is chemically converted. For example, it includes a structure in which a part of the initiator residue and/or the coupling agent residue is substituted or added when the block copolymer (C) is synthesized.

In addition, "structural unit derived from an ethylenically unsaturated monomer" in this specification includes derivatives of the residues of the ethylenically unsaturated monomers obtained by reacting a part of the residues of the ethylenically unsaturated monomers with a reactive compound during or after polymerization of the block copolymer (C) as well as the residues of the ethylenically unsaturated monomers. For example, it also includes a structural unit in which mercapto groups, other functional groups and/or substituents that are not originally contained in the monomers are introduced into a part of the residues of the ethylenically unsaturated monomers. Here, it is needless to say that the monomer itself may contain a mercapto group, a functional group and/or a substituent. In addition, it also includes a structure in which side groups in the block copolymer (C), side chains, or side groups and side chains are bonded to each other or via a reactive compound to form a ring. Here, the block copolymer (C) requires a mercapto group, but it may contain other functional groups (for example, an amino group, a glycidyl group, a hydroxyl group, a carboxyl group, a (meth)acryloyl group, a hydrolyzable silyl group, a nitrile group, and an isocyanate group) without departing from the spirit of the present invention.

When it is stated that the glass transition temperature (hereinafter referred to as Tg) of the polymer block (A) is 20° C. or higher, this means that the Tg of each polymer block (A) in the block copolymer (C) is 20° C. or higher. The Tg of the polymer block (A) can be confirmed by measuring the Tg in the stage in which the block of the polymer block (A) is obtained. Here, when the temperature of each polymer block (A) is 20° C. or higher, the Tg of the entire polymer block (A) obtained from the block copolymer (C) is also 20° C. or higher. That is, the Tg of the entire polymer block (A) (hereinafter referred to as <polymer block (A)>$_{Total}$), which is the sum of respective polymer blocks (A), and the Tg of each polymer block (A) are correlated, the Tg of <polymer block (A)>$_{Total}$ is obtained, and according to this Tg, it is possible to determine whether the Tg of each polymer block (A) satisfies a condition of 20° C. or higher.

The Tg of the polymer block (A) in this specification is a Tg of <polymer block (A)>$_{Total}$ observed in the curve obtained by DSC measurement in the stage in which the block copolymer (C) is obtained, which is a value obtained by performing measurement based on a plastic transition temperature measurement method in JIS K 7121:2012, and determined from an extrapolation glass transition start temperature (Tig) described in JIS 9.3. Since the Tg derived from <polymer block (A)>$_{Total}$ has a numerical value the same as or close to the Tg of a polymer that is not a block having a similar chemical structure, it can be easily distinguished from the Tg of the polymer block (B) in the case of the triblock structure, and the Tg of the [polymer block (B)]$_q$X in the case of the star-shaped block structure. Since the values of the Tg of <polymer block (A)>$_{Total}$ and the Tg of each polymer block (A) do not change significantly depending on the structure of the chain terminal of the block copolymer (C), that is, the chain terminal of the polymer block (A), in this specification, the Tg of each polymer block (A) and the Tg of <polymer block (A)>$_{Total}$ including the chain terminal of the polymer block (A) may be determined.

However, in cases in which the structural unit derived from the monomer of each polymer block (A) differs for each block, when a plurality of Tg are observed in the curve obtained by DSC measurement, determination may be performed with the Tg of each polymer block (A) in place of the Tg of <polymer block (A)>$_{Total}$. In this case, sampling is performed when the polymerization of each polymer block (A) is completed to obtain the Tg. Alternatively, since there is a correlation with the Tg of a polymer having the same chemical structure as each polymer block (A), the Tg of each corresponding polymer is obtained from the Fox equation, and it may be determined whether the Tg is 20° C. or higher. The FOX equation is a value obtained from the following Formula (1).

$$1/(Tg_A+273.15)=\Sigma[W_a/(Tg_a+273.15)] \quad (1)$$

In Formula (1), $Tg_A$ is Tg (° C.) of the polymer block (A), and $W_a$ is the mass fraction of the monomer a constituting the polymer block (A). $Tg_a$ is Tg (° C.) of the homopolymer of the monomer a. Here, $Tg_a$ is widely known as a characteristic value of a homopolymer, and for example, the value described in "POLYMER HANDBOOK, THIRD EDITION" or a manufacturer catalog value can be used.

When the block copolymer (C) has a triblock structure, the Tg of the polymer block (B) itself is set to lower than 20° C., and when the block copolymer (C) has a star-shaped block structure, the Tg of [polymer block (B)]$_q$X is set to lower than 20° C. Here, the polymer block (B) having a triblock structure and [polymer block (B)]$_q$X having a star-shaped block structure are collectively referred to as <polymer block (B)[X]>.

The Tg of <polymer block (B)[X]> is a Tg of <polymer block (B)[X]> observed in the curve obtained by DSC measurement in the stage in which the block copolymer (C) is obtained, which is a value obtained by performing measurement based on a plastic transition temperature measurement method in JIS K 7121:2012 and determined from an extrapolation glass transition start temperature (Tig) described in JIS 9.3. Since the Tg of <polymer block (B)[X]> has a numerical value the same as or close to the Tg of a polymer having a similar chemical structure, it can be easily distinguished from the Tg derived from the polymer block (A).

The block copolymer (C) has a block structure that may be a triblock structure of A-B-A or a star-shaped block structure of [A-B]$_q$X, and it is needless to say that it may have an initiator residue or its derivatives, a functional group, an inactive group, a crosslinkable group, a substituent and the like at the chain terminal of the polymer block (A).

In the case of the star-shaped block structure, the molecular weight of the initiator residue and/or the coupling agent residue, or its derivatives X is not particularly limited as long as it does not depart from the spirit of the present invention, and may be, for example, 50 to 2,500. Similarly, the molecular weight of the initiator residue or its derivatives which may be optionally contained at the chain terminal of the polymer block (A) is not particularly limited as long as it does not depart from the spirit of the present invention, and may be, for example, about 50 to 2,500.

The Tg of the polymer block (A) is 20° C. or higher, preferably 40° C. or higher, more preferably 60° C. or higher, still more preferably 80° C. or higher, and particularly preferably 100° C. or higher. The upper limit value of the Tg of the polymer block (A) is not particularly limited, and can be, for example, 300° C., 250° C. or 200° C. The Tg of the polymer block (A) can be read as the Tg of <polymer block (A)>$_{Total}$ as described above (the same applies hereinafter). That is, <polymer block (A)>$_{Total}$ is 20° C. or higher, preferably 40° C. or higher, more preferably 60° C. or higher, still more preferably 80° C. or higher, and particularly preferably 100° C. or higher. Similarly, the upper limit value of <polymer block (A)>$_{Total}$ is not particularly limited, and may be, for example, 300° C., 250° C. or 200° C.

The Tg of the polymer block (B) in the case of the triblock structure and the Tg of [polymer block (B)]$_q$X in the case of the star-shaped block structure, that is, the Tg of <polymer block (B)[X]>, is lower than 20° C., and preferably 10° C. or lower, more preferably 0° C. or lower, still more preferably −10° C. or lower, and particularly preferably −20° C. or lower. The lower limit value of the Tg of <polymer block (B)[X]> is not particularly limited, and may be, for example −100° C., −90° C. or −80° C.

When the Tg in the block copolymer (C) is adjusted as described above and the block copolymer (C) has a mercapto group, the polymer block (A) and the polymer block (B) can form a microphase-separated structure, and form a physical crosslink that can form a structure including stress alleviation points. The block copolymer (C) has a microphase-separated structure and forms a physical crosslink, and thus the block copolymer (C) can have excellent stretchability. Self-assembling (aggregation of segments) allows mercapto groups to approach each other. The distribution of mercapto groups can additionally impart a cohesive force and stress alleviation, and impart self-pressure-sensitive adhesiveness to the block copolymer (C) itself.

The temperature difference between the Tg of the polymer block (A) and the Tg of <polymer block (B)[X]> is not particularly limited, and is preferably 75° C. or higher, more preferably 100° C. or higher, still more preferably 125° C. or higher, and particularly preferably 150° C. or higher. When the temperature difference is set to 75° C. or higher, the microphase-separated structure can be enhanced, and an effect of physical crosslinking can be more effectively exhibited.

The number average molecular weight (Mn) in this specification is a value obtained by a method determined in examples to be described below. The Mn of the block copolymer (C) is 5,000 to 500,000. If the Mn is set to be within this range, when the block copolymer (C) is used as, for example, a film, it is possible to achieve both the stretchability and the strength. A preferable range of the Mn is 10,000 to 400,000, and a more preferable range of the Mn is 30,000 to 300,000. The degree of polydispersity (Mw/Mn) is not particularly limited, and is preferably 1 to 2.5, more preferably 1 to 2.0, and still more preferably 1 to 1.8, and in order to enhance formation of a microphase-separated structure, the degree of polydispersity is particularly preferably 1 to 1.5 or 1 to 1.3.

The Mn of the polymer blocks (A) may be different from each other, but are preferably substantially the same in consideration of the stretchability. Similarly, the Mn of the polymer blocks (B) may be different from each other, but are preferably substantially the same in consideration of the stretchability.

Specific examples of the ethylenically unsaturated group in the ethylenically unsaturated monomer include an ethylene group, a propenyl group, a butenyl group, a vinylphenyl group, a (meth)acryloyl group, an allyl ether group, a vinyl ether group, a maleyl group, a maleimide group, a (meth)acrylamide group, an acetyl vinyl group and a vinyl amide group. The "ethylenically unsaturated monomer" is more preferably a (meth)acryloyl group. Here, "(meth)acrylic" includes all of "acrylic," "methacrylic" and a mixture thereof. In addition, "(meth)acrylate" includes all of "acrylate," "methacrylate" and a mixture thereof.

The structural unit derived from the monomer of each polymer block (A) may be composed of the structural unit derived from a monomer different for each block or may be composed of the structural unit derived from the same monomer between blocks. Preferably, the proportion of the structural unit derived from the monomers in common between the polymer blocks (A) is preferably 60 mass % or more, more preferably 70 mass % or more, and still more preferably 80 mass % or more. Similarly, each polymer block (B) may be composed of the structural unit derived from a monomer different for each block or may be composed of the structural unit derived from the same monomer between blocks. Preferably, the proportion of the structural unit derived from the monomers in common between the polymer blocks (B) is preferably 60 mass % or more, more preferably 70 mass % or more, and still more preferably 80 mass % or more. Here, the term "in common" means that components are common regardless of the arrangement of monomers.

In order to more effectively improve the stretchability and the mechanical strength, the binding form of the block copolymer (C) is preferably an A-B-A type triblock structure, a 2-branch structure with q=2 in $[A-B]_q X$, and a 3-branch structure with q=3. The polymer block (A) and the polymer block (B) each independently have a structural unit derived from one monomer alone or two or more monomers.

The content of the structural unit derived from an ethylenically unsaturated monomer based on the total mass of the block copolymer (C) is preferably 80 mass % or more, more preferably 85 mass % or more, still more preferably 90 mass % or more, and particularly preferably 95 mass % or more based on the total mass of the block copolymer (C), and in order to more effectively enhance the microphase-separated structure of the polymer block (A) and the polymer block (B), the block copolymer (C) in which parts except for the initiator residue and/or the coupling agent residue or its derivatives X and the structure of the terminal of the block copolymer (C) are composed of a structural unit derived from an ethylenically unsaturated monomer (100 mass %) is preferable.

The polymer block (A) is a block that satisfies the above Tg, mainly composed of the structural unit derived from an ethylenically unsaturated monomer, and functions as a hard segment. The monomers are used alone or two or more thereof are used in combination. Specific examples of monomers include at least one selected from the group consisting of a methacrylic acid ester, acrylamide, an N-alkylacrylamide, styrene, a styrene derivative, maleimide and acrylonitrile. Examples of methacrylic acid esters include alkyl groups having 1 to 20 carbon atoms, 1 to 16 carbon atoms, 1 to 12 carbon atoms, 1 to 8 carbon atoms or 1 to 4 carbon atoms. In addition, examples of styrene derivatives include α-methylstyrene, t-butylstyrene, p-chlorostyrene, chloromethylstyrene and vinyl toluene. In addition, the monomers exemplified in the polymer block (B) described below can be preferably contained in a part thereof.

The polymer block (B) is a block that satisfies the above Tg, mainly composed of the structural unit derived from an ethylenically unsaturated monomer, and functions as a soft segment. The monomers are used alone or two or more thereof are used in combination. Specific examples of monomers include at least one selected from the group consisting of an acrylic acid ester, an olefin compound, a diene compound and an alkylene oxide. Examples of acrylic acid esters include alkyl acrylates having an alkyl group having 1 to 20 carbon atoms, 1 to 16 carbon atoms, 1 to 12 carbon atoms, 1 to 8 carbon atoms or 1 to 4 carbon atoms. Examples of olefin compounds and diene compounds include olefin compounds and diene compounds having 1 to 20 carbon atoms, 1 to 16 carbon atoms, 1 to 12 carbon atoms, 1 to 8 carbon atoms or 1 to 4 carbon atoms. In addition, examples of alkylene oxides include alkylene oxides having an alkylene group having 1 to 20 carbon atoms, 1 to 16 carbon atoms, 1 to 12 carbon atoms, 1 to 8 carbon atoms or 1 to 4 carbon atoms. In addition, the monomer exemplified in the polymer block (A) described above can be preferably contained in a part thereof.

Preferable examples of the block copolymer (C) include a block copolymer in which the polymer block (A) contains 50 mass % or more of the structural unit derived from a methacrylic acid ester and the polymer block (B) contains 70 mass % or more of the structural unit derived from an acrylic acid ester. The content of the structural unit derived from the methacrylic acid ester in the polymer block (A) is more preferably 60 mass % or more, and still more preferably 70 mass % or more, 80 mass % or more, or 90 mass % or more. In addition, the content of the structural unit derived from the methacrylic acid ester may be 100 mass %.

In addition, the content of the structural unit derived from the acrylic acid ester in the polymer block (B) is more preferably 80 mass % or more, and still more preferably 85 mass % or more, 90 mass % or more, or 95 mass % or more. In addition, the content of the structural unit derived from the acrylic acid ester may be 100 mass %. When the polymer block (A) contains 50 mass % or more of the structural unit derived from the methacrylic acid ester, the polymer block (B) contains 70 mass % or more of the structural unit derived from the acrylic acid ester, and a mercapto group is provided, the stretchability is excellent, and it is possible to effectively prevent the occurrence of cracks. In addition, self-pressure-sensitive adhesiveness can be improved by enhancing microphase separation and functional separation.

Examples of monomers forming the structural unit derived from the methacrylic acid ester in the polymer block (A) include aliphatic, alicyclic, and aromatic alkyl methacrylates such as methyl methacrylate, ethyl methacrylate, propyl methacrylate, isopropyl methacrylate, n-butyl methacrylate, isobutyl methacrylate, tert-butyl methacrylate, isoamyl methacrylate, pentyl methacrylate, n-hexyl methacrylate, isohexyl methacrylate, isoheptyl methacrylate, 2-ethylhexyl methacrylate, isooctyl methacrylate, n-octyl methacrylate, isononyl methacrylate, isodecyl methacrylate, lauryl methacrylate, tetradecyl methacrylate, octadecyl methacrylate, behenyl methacrylate, isostearyl methacrylate, cyclohexyl methacrylate, t-butylcyclohexylmethyl methacrylate, isobornyl methacrylate, trimethylcyclohexyl methacrylate, cyclodecyl methacrylate, cyclodecylmethyl methacrylate, benzyl methacrylate, t-butylbenzotriazolephenylethyl methacrylate, phenyl methacrylate, naphthyl methacrylate, and allyl methacrylate.

In addition, methacrylic acid-based monomers containing hydroxy groups such as hydroxyalkyl methacrylates having 2 to 4 carbon atoms in the hydroxyalkyl group such as 2-hydroxyethyl acrylate and 2-hydroxyethyl methacrylate, glycerin acrylate, and glycerin methacrylate; alkoxyalkyl methacrylates such as alkoxyalkyl methacrylates having 1 to 4 carbon atoms in the alkoxy group and 1 to 4 carbon atoms in the alkyl group such as methoxymethyl methacrylate, methoxyethyl methacrylate, methoxypropyl methacrylate, ethoxymethyl methacrylate, ethoxyethyl methacrylate, and ethoxypropylmethacrylate;

(polyalkylene)glycol monoalkyl, alkylene, alkyne ether or ester monomethacrylates; methacrylic acid-based monomers having an acid group (carboxyl group, sulfonic acid, phosphoric acid) containing an acrylic acid or an acrylic acid dimer; methacrylic acid-based monomers containing oxygen atoms; methacrylic acid-based monomers containing an amino group; methacrylic acid-based monomers containing nitrogen atoms and the like can be used. In addition, monomethacrylates having three or more hydroxy groups, halogen atom-containing methacrylates, silicon atom-containing methacrylic acid-based monomers, methacrylic acid-based monomers having a group that absorbs ultraviolet rays, and α-position hydroxy group methyl-substituted acrylates may be exemplified. In addition, methacrylic acid-based monomers having two or more addition-polymerizable groups such as ethylene glycol dimethacrylate, diethylene glycol dimethacrylate, and methacrylic acid esters of polyalkylene glycol adducts of trimethylolpropane may be used.

Regarding the monomer that forms a structural unit other than the structural unit derived from a methacrylic acid ester in the polymer block (A), another monomer that can polymerize with methacrylic acid ester can be used. Specific examples thereof include styrene and acrylonitrile.

A preferable example of the polymer block (A) includes a form in which the content of the structural unit derived from methyl methacrylate is 50 mass % or more. The content of the structural unit derived from methyl methacrylate is more preferably 60 mass % or more, and still more preferably 80 mass % or more. In addition, the content of the structural unit derived from methyl methacrylate in the polymer block (A) may be 100 mass %.

Examples of monomers forming the structural unit derived from the acrylic acid ester in the polymer block (B) include aliphatic, alicyclic, and aromatic alkyl acrylates such as methyl acrylate, ethyl acrylate, propyl acrylate, isopropyl acrylate, n-butyl acrylate, isobutyl acrylate, tert-butyl acrylate, isoamyl acrylate, pentyl acrylate, n-hexyl acrylate, isohexyl acrylate, isoheptyl acrylate, 2-ethylhexyl acrylate, isooctyl acrylate, n-octyl acrylate, isononyl acrylate, isodecyl acrylate, lauryl acrylate, tetradecyl acrylate, octadecyl acrylate, behenyl acrylate, isostearyl acrylate, cyclohexyl acrylate, t-butylcyclohexylmethyl acrylate, isoboronyl acrylate, trimethylcyclohexyl acrylate, cyclodecyl acrylate, cyclodecylmethyl acrylate, benzyl acrylate, t-butyl benzotriazole phenyl ethyl acrylate, phenyl acrylate, naphthyl acrylate, and allyl acrylate.

In addition, acrylic acid-based monomers containing hydroxy groups; acrylic acid-based monomers having glycol groups; (polyalkylene)glycol monoalkyl, alkylene, alkyne ether or ester monoacrylates; acrylic acid-based monomers having an acid group (carboxyl group, sulfonic acid, phosphoric acid) containing an acrylic acid or an acrylic acid dimer; acrylic acid-based monomers containing oxygen atoms; acrylic acid-based monomers having an amino group; acrylic acid-based monomers containing nitrogen atoms and the like can be used. In addition, monoacrylates having three or more hydroxy groups, halogen atom-containing acrylates, silicon atom-containing acrylic acid-based monomers, acrylic acid-based monomers having a group that absorbs ultraviolet rays, and α-position hydroxy group methyl-substituted acrylates may be exemplified. In addition, acrylic acid-based monomers having two or more addition-polymerizable groups such as ethylene glycol diacrylate, diethylene glycol diacrylate, and acrylic acid esters of polyalkylene glycol adducts of trimethylolpropane may be used.

Regarding the structural unit other than the structural unit derived from an acrylic acid ester in the polymer block (B), another monomer that can polymerize with an acrylic acid ester can be used. For example, maleic acid, itaconic acid, crotonic acid and the like may be exemplified.

A preferable example of the polymer block (B) includes a form in which the content of the structural unit derived from butyl acrylate is 70 mass % or more. The content of the structural unit derived from butyl acrylate is more preferably 80 mass % or more, and still more preferably 90 mass % or more. In addition, the content of the structural unit derived from butyl acrylate in the polymer block (B) may be 100 mass %.

A preferable example of the block copolymer (C) includes a form in which the content of the structural unit derived from methyl methacrylate in the polymer block (A) is 50 mass % or more and the content of the structural unit derived from butyl acrylate in the polymer block (B) is 70 mass % or more. According to such a block copolymer (C), it is possible to provide a film having more effective and excellent shrinkage. The content of the structural unit derived from methyl methacrylate in the polymer block (A) may be 60 mass % or more, 70 mass % or more, 80 mass % or more, 90 mass % or more, or 100 mass %. The content of the structural unit derived from butyl acrylate in the polymer block (B) may be 80 mass % or more, 90 mass % or more, or 100 mass %.

When the block copolymer (C) is used, the polymer block (A) and the polymer block (B) can form a phase-separated structure (microphase-separated structure) at a molecular level such as a sea island structure (body centered cubic), a cylinder (hexagonal), a gyroid, and a lamellar phase. When the microphase-separated structure is formed, it is possible to provide the block copolymer (C) and a resin composition which can impart excellent stretchability and effectively reduce the occurrence of cracks. In order to improve the stretchability more effectively, a sea island structure in which the polymer block (A) has an island structure and the polymer block (B) has a sea structure is more preferable. Here, the microphase-separated structure can be confirmed according to observation using an atomic force microscope (AFM).

The content of the polymer block (A) with respect to the polymer block (A) and the polymer block (B) in the block copolymer (C) is not particularly limited, but in order to easily obtain a microphase-separated structure of the sea island structure, the content is preferably 1 to 50 mass %, and more preferably 15 to 30 mass %. In addition, in order to effectively exhibit pressure-sensitive adhesiveness, the content of the entire polymer block (A) with respect to the polymer block (A) and the polymer block (B) in the block copolymer (C) is preferably 1 to 35 mass %, and more preferably 5 to 30 mass %.

The contents of the polymer block (A) and the polymer block (B) in the block copolymer (C) are not particularly limited, but in order to easily obtain a microphase-separated structure, based on the total mass of the block copolymer (C), the content of the polymer block (A) and the polymer block (B) is preferably 90.0 to 99.9 mass %, and more preferably 98.0 to 99.9 mass %.

When the block copolymer (C) is used as a binder resin having a conductive resin composition to be described below, in order to maintain favorable conductivity, an ethylenically unsaturated monomer in which 90 mass % or more of the ethylenically unsaturated monomer in the block copolymer (C) is hydrophobic is preferable. Here, a "hydrophobic ethylenically unsaturated monomer" is a monomer having a solubility of 6.5 g/100 mL or less in water at 20° C. Examples of hydrophobic ethylenically unsaturated monomers include the above alkyl(meth) acrylates, olefins such as butadiene and isoprene, vinyls such as vinyl acetate and vinyl chloride, and aromatics such as styrene.

(Mercapto Group)

The block copolymer (C) has at least one mercapto group. As described above, the mercapto group is introduced into at least one of the side group directly connected to the main chain of the block copolymer (C), the terminal of the main chain, and the side chain. The mercapto group may be contained in at least one of the polymer block (A) and the polymer block (B). In order to enhance the phase-separated structure of the polymer block (A) and the polymer block (B), the mercapto group is preferably contained in either the polymer block (A) or the polymer block (B). When either the polymer block (A) or the polymer block (B) has a mercapto group, the hydrogen bond between molecules of mercapto groups can effectively enhance the microphase-separated structure. In order to exhibit the self-pressure-sensitive adhesive property of the block copolymer (C) itself, and in order to improve the durability and stretchability in combination with a cross-linking agent, it is preferable to introduce a mercapto group only to the polymer block (A).

When a mercapto group is contained, for example, if a conductive resin composition to which a conductive material is added is formed, a chemical bond between the conductive material and the mercapto group of the block copolymer (C) on the material surface is enhanced or the interaction such as a Van der Waals force between the conductive material and the mercapto group of the block copolymer (C) is enhanced, and it is possible to provide a resin composition having both stretchability and toughness.

The molar concentration of the mercapto group contained in 1 g of the block copolymer (C) is not particularly limited, but in order to form a microphase-separated structure and achieve both the above effects of the mercapto group, the concentration is preferably in a range of 0.00001 to 1.0 mmol/g. A more preferable range is 0.0001 to 0.5 mmol/g, and a still more preferable range is 0.005 to 0.1 mmol/g.

According to the block copolymer (C), it is possible to provide a block copolymer which has excellent stretchability and can effectively reduce the occurrence of cracks during extension.

<Method of Producing Block Copolymer (C)>

Hereinafter, an example of a method of producing the block copolymer (C) of the present embodiment will be described, and the block copolymer of the present invention is not limited to those obtained in the following production method.

The method of producing the block copolymer (C) is not particularly limited, but a production method according to radical polymerization and ionic polymerization is preferable. The ionic polymerization includes anionic polymerization and cationic polymerization. The type of the radical polymerization is not particularly limited, and living radical polymerization is preferable. In addition, after a reactive terminal diblock structure is obtained, the block copolymer (C) can be obtained using a coupling agent.

Examples of anionic polymerization include a polymerization method using an organic rare earth metal complex or an organic alkali metal compound as a polymerization initiator in the presence of an inorganic acid salt and a polymerization method using an organic alkali metal compound as a polymerization initiator in the presence of an organic aluminum compound.

Examples of living radical polymerization include a polymerization/NMP method using a nitroxide-based catalyst, an atom transfer radical polymerization/ATRP method using a transition metal complex-based catalyst, a reversible addition-cleavage chain transfer polymerization/RAFT method using a reversible addition-cleavage chain transfer agent, a polymerization/TERP method using an organotellurium-based catalyst, and an iodine transfer polymerization/RCMP method (reversible coordination-mediated polymerization) or RTCP method (reversible transfer catalyst polymerization) using an iodine compound as a catalyst.

There is provided a method of producing a block copolymer (C) represented by $[A-B]_q X$ including a process in which a polymer block (B) and a polymer block (A) are obtained in this order by sequential polymerization using any polymerization initiator having 2 to 6 polymerization starting points (hereinafter referred to as a method (I)).

As another method, there is provided a method of producing a block copolymer (C) represented by an A-B-A type triblock structure including a process in which a polymer block (A), a polymer block (B), and a polymer block (A) are obtained in this order by sequential polymerization using a polymerization initiator (XI) as a starting point (hereinafter referred to as a method (II)).

In addition, there is provided a method of producing a block copolymer (C) represented by [A-B]$_q$X including a process in which a polymer block (B) and a polymer block (A) are sequentially polymerized in any order to obtain an A-B type diblock structure, a reactive terminal is introduced into the molecular terminal of the A-B type diblock structure as necessary, and a coupling reaction is caused using any coupling agent having 3 to 6 connecting units exhibiting reactivity with the reactive terminal (hereinafter referred to as a method (III)).

Regarding the mercapto group, a method of directly introducing a mercapto group using a monomer having a mercapto group, and a method of introducing a protecting group into a polymer block (A) and/or a polymer block (B) using a monomer having a protecting group for the mercapto group and converting it into a mercapto group at an arbitrary timing may be exemplified. In addition, a method of copolymerizing monomers using a polymerization initiator having a mercapto group or a protecting group for a mercapto group, a method of producing a block copolymer (C) using a coupling agent having a mercapto group or a protecting group for a mercapto group, and a method of introducing a mercapto group by modification (chemical conversion) may be exemplified. The method of introducing a mercapto group by modification will be described below.

[Method (I)]

Regarding the method (I), that is, the method of producing a block copolymer (C) including a process in which a polymer block (B) and a polymer block (A) are sequentially polymerized using a polymerization initiator (XI) as a starting point, various methods can be used, and the RCMP method (or RTCP method), the RAFT method, and the ATRP method are preferable. Among these, the RCMP method (or RTCP method) is more preferable because its cost is low, it enables synthesis to be performed without using a metal, and polymerization to be performed under the same temperature condition as general radical polymerization, and it can be used in existing production facilities.

In the RCMP method (or TCP method), a special material or a metal-based catalyst is not necessary, and an organic iodine-based living radical polymerization initiator is used. The organic iodine-based living radical polymerization initiator is mixed with a catalyst, and heated as necessary to generate radicals generated in carbon directly connected to iodine, and thereby polymerization of polymerizable monomers starts. Then, the progress of radical polymerization can be controlled according to the property in which a persistent iodine radical and a radical chain terminal temporarily form a bond, and the radical chain terminal and the iodine radical are reversibly recombined. The polymerization temperature can be, for example, 60 to 120° C. Hereinafter, the RCMP method (or RTCP method) will be described in detail as an example.

First, various raw materials are prepared. Specifically, raw materials for the polymer block (A) and the polymer block (B), an organic iodine-based living radical polymerization initiator (hereinafter simply referred to as a polymerization initiator (XI)), a catalyst (m), a solvent as necessary, a radical polymerization initiator other than the polymerization initiator (XI), a simple substance iodine and the like are prepared. In addition, the catalyst (m) includes at least a compound that coordinates iodine of the polymerization initiator (XI) and extracts iodine from the polymerization initiator and a compound that generates radicals and extracts iodine from the polymerization initiator (XI). The catalyst (m) may further include a compound that enhances a dormant effect of iodine radicals.

The polymerization initiator (XI) is an organic iodine compound having a carbon-iodine bond, and is a compound that can proceed polymerization in the presence of a catalyst (m) and become dormant species of radical polymerization. Examples of polymerization initiators (XI) include compounds represented by the following General Formulae (5) to (7). The polymerization initiators (XI) are used alone or two or more thereof are used in combination.

[Chem. 5]

General Formula (5)

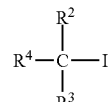

[Chem. 6]

General Formula (6)

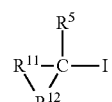

[Chem. 7]

General Formula (7)

File: 106190usf_true translation

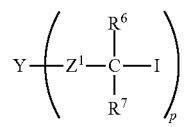

Here, $Z^1$ each independently represents a divalent group selected from the group consisting of an ester group, a ketone group and an amide group, or a direct bond for each branch from Y, Y represents a hydrocarbon group which may have a p-valent substituent, p represents an integer of 2 to 6, $R^2$, $R^5$ and $R^6$ each independently represent a hydrogen atom or a monovalent hydrocarbon group which may have a substituent independently for each branch from Y in the case of General Formula (6), $R^3$ and $R^7$ each independently represent a hydrogen atom, a monovalent hydrocarbon group which may have a substituent or —COR$^8$ independently for each branch from Y in the case of General Formula (6), $R^4$ represents a monovalent hydrocarbon group which may have a substituent, —COR$^8$, a cyano group or a nitro group, $R^2$ and $R^3$, $R^3$ and $R^4$, $R^2$ and $R^4$ and $R^6$ and $R^7$ each independently may be bonded to each other to form a ring independently for each branch from Y in the case of General Formula (6), $R^8$ each independently represents a hydrogen atom, a hydroxy group, an alkoxy group, an amino group or a monovalent hydrocarbon group which may have a substituent, $R^{11}$ represents a divalent hydrocarbon group, which may have a substituent, $R^{12}$ represents a divalent hydrocarbon group selected from the group consisting of an alkylene group, an arylene group and an alkylene oxide group or a direct bond, and the hydrocarbon group may have a heterocycle, and each independently include at least one of a chain hydrocarbon group, an alicyclic hydrocarbon group and an aromatic hydrocarbon group. General Formula (4) and General Formula (5) are examples having one iodine-carbon bond, and General Formula (6) is an example having 2 to 6 iodine-carbon bonds. An appropriate polymerization initiator (XI) may be selected according to a desired structure of the block copolymer (C), and an appropriate polymerization initiator (XI) may be selected according to a desired structure of the block copolymer (C).

Unless otherwise defined, the term "substituent" in this specification means that one or more hydrogen atoms in an organic group are substituted with a heterocyclic group, a linear aliphatic hydrocarbon group having 1 to 12 carbon atoms, a branched aliphatic hydrocarbon group having 1 to 12 carbon atoms, a cyclic aliphatic hydrocarbon group having 1 to 12 carbon atoms, an aryl group having 1 to 12 carbon atoms, an aralkyl group having 1 to 12 carbon atoms, an alkoxy group having 1 to 12 carbon atoms, an amino group having 1 to 12 carbon atoms, an alkenyl group having 1 to 12 carbon atoms, an acyl group having 1 to 12 carbon atoms, an alkoxycarbonyl group having 1 to 12 carbon atoms, an alkyloyloxy group having 1 to 12 carbon atoms, an aryloyloxy group having 1 to 12 carbon atoms or an alkylsilyl group having 1 to 12 carbon atoms. The substituent may have a functional group (for example, a halogen atom, a hydroxy group, a carboxyl group, an amino group, a cyano group, a nitro group, and a mercapto group). The heterocyclic group is not particularly limited, and an aromatic heterocycle having 5 to 18 carbon atom which may have a functional group may be exemplified. Examples of heteroatoms include nitrogen atoms, oxygen atoms, and sulfur atoms. Specific examples of heterocycles include furan, thiophene, pyrrole, and pyridine.

Specific examples of polymerization initiators (XI) include ethylene bis(2-iodoisobutyrate), ethylene bis(2-iodo-2-phenylacetate), p-xylylene diiodide, 1,4-bis(1'-iodoethyl)benzene, 2,5-diiodeadipic acid diethyl, glycerol tris(2-iodoisobutyrate), 1,3,5-tris(1'-iodoethyl)benzene 2-iodo-2-(4'-(2"-iodopropionyloxy)phenyl)methyl acetate, 2-iodoisobutyrate 4-iodobutyl 2-iodo-2-(4'-(2"-iodopropionyloxy)phenyl)methyl acetate, 2-iodoisobutyrate 4-iodobutyl, 2-iodo-2-(4'-(4"-iodobutanoyloxy)phenyl)methyl acetate, 2-iodophenylacetic acid 4-iodobutyl, 2-iodo-2-phenylacetic acid 2-(iodoacetoxy)ethyl, ethyl 2-iodoacetate, ethyl 2-iodopropanoate, ethyl 2-iodobutyrate, ethyl 2-iodovalerate, ethyl 2-iodoisobutyrate, methyl 2-iodoacetate, ethyl 2-iodoisobutyrate, benzyl 2-iodoisobutyrate, 2-iodoacetic acid, 2-iodopropionic acid, 2-iodoisobutyric acid, α-iodo-γ-butyrolactone, 2-iodopropionamide, 2-iodoacetonitrile, 2-iodopropionitrile, 2-iodoisobutyronitrile, 2-iodoacetophenone, benzyl iodide, (1-iodoethyl)benzene, 4-nitrobenzyl iodide, 2-hydroxyethyl 2-iodoisobutyrate, 2-hydroxyethyl 2-iodo-2-phenylacetate, ethyl 2-iodo-2-phenylacetate, ethyl 2-iodo 2-(4'-methylphenyl)acetate, ethyl 2-iodo-2-(4'-nitrophenyl)acetate, 2-iodo-2-phenylacetic acid, iododiphenylmethane, 9-iodo-9H-fluorene, α-iodobenzylcyanide, diethyl 2-iodo-2-methylmalonate, ethyl 2-iodo-2-methylacetacetate, p-xylene diiodide, diethyl 2,5-diiodoadipate, 1,4-bis(1'-iodoethyl)benzene, ethylene glycol bis(2-iodoisobutyrate), ethylene glycol bis(2-iodo-2-phenylacetate) (Glycerol Tris(2-iodoisobutyrate)), 1,3,5-tris (1'-ethyl iodide)benzene, 2-hydroxyethyl-2-iodoisobutyrate, 2-hydroxyethyl-2-iodo-2-phenylacetate, 2-iodo-2-amidinopropane, 4-iodo-4-cyano-pentanoic acid, 2-iodo-2-methyl-propanamide, 2-iodo-2-cyanobutanol, 2-iodo-2-methyl-N-(2-hydroxymethyl)propionamide 4-methylpentane, 2-iodo-2-methyl-N-(1,1-bis(hydroxymethyl)-2-hydroxyethyl) propionamide 4-methylpentane, iodoacetic acid, 2-iodopropanoic acid, and 2-iodopropionamide, but the present invention is not limited to only such examples.

In addition, the organic iodine compound disclosed in Japanese Unexamined Patent Application Publication No. 2018-111806 can be preferably used. Carbon directly connected to iodine of the polymerization initiator is preferably primary carbon directly connected to tertiary carbon, secondary carbon or an electron-withdrawing group.

Regarding the polymerization initiator (XI), raw materials for synthesizing a polymerization initiator (XI) are prepared, the polymerization initiator (XI) is produced in situ during polymerization, that is, in the reaction solution, and this can be used as the polymerization initiator (XI) in the polymerization method. For example, an azo compound and iodine are prepared as raw materials, a polymerization initiator (XI) is produced in situ during polymerization according to a reaction between the two, and this can be used as a polymerization initiator (XI) in the polymerization method. That is, the production method of the present invention may include, for example, a process in which iodine and an azo compound are reacted to produce a polymerization initiator (XI) in this polymerization process.

Examples of azo compounds used for producing the polymerization initiator (XI) include an azo-based radical polymerization initiator. When a polymerization initiator (XI) is produced using another initiator such as an azo-based radical polymerization initiator (for example, AIBN), a method of producing a polymer by adding monomers after the other initiator is consumed and the polymerization initiator (XI) is sufficiently obtained is preferable.

Examples of azo compounds include 2,2'-azobis(isobutyronitrile)), 2,2'-azobis(2,4-dimethylvaleronitrile), 4,4'-azobis(4-cyanopentanoic acid), 2,2'-azobis[2-methyl-N-[1,1-bis(hydroxymethyl)-2-hydroxyethyl]propionamide], 2,2'-azobis[N-(2-hydroxyethyl)-2-methoxypropanamide], 2,2'-azobis(2-methyl-2-propenylpropaneamide), 2,2'-bis(2-imidazolin-2-yl) [2,2'-azobispropane]dihydrochloride, 2,2'-azobis(propane-2-carboamidine)dihydrochloride, 2,2'-azobis[N-(2-carboxyethyl)-2-methylpropionamidine], 2,2'-azobis[2-[1-(2-hydroxyethyl)-2-imidazolin-2-yl]propane dihydrochloride, 2,2'-azobis[2-methyl-N-2-propenylpropaneamide], and 2,2'-azobis[2-(2-imidazolin-2-yl)propane]dihydrochloride.

Regarding the catalyst (m) that coordinates iodine of the organic iodine compound and extracts iodine from the polymerization initiator (XI), an organic amine compound that is generally used in the RCMP method and a non-metal compound having an ionic bond with iodide ions can be used without limitation. A catalyst in which a non-metal atom in the non-metal compound is in a cationic state, and forms an ionic bond with an iodide ion is preferable.

Examples of catalysts (m) composed of an organic amine compound include triethylamine, tributylamine, 1,1,2,2-tetrakis(dimethylamino)ethene, 1,4,8,11-tetramethyl-1,4,8,11-tetraazacyclotetradecane, ethylenediamine, tetramethylethylenediamine, tetramethyldiaminomethane, tris(2-aminoethyl)amine, tris(2-(methylamino)ethyl)amine, and hematoporphyrin (PCT International Publication No. WO2011/016166).

Regarding the catalyst which is a non-metal compound which has an ionic bond with an iodide ion and in which a non-metal atom in the non-metal compound is in a cationic state, and forms an ionic bond with an iodide ion, specifically, ammonium salts, imidazolium salts, pyridinium salts, phosphonium salts, sulfonium salts, iodium salts and the like may be exemplified, and more specifically, tetrabutylammonium iodide, tetrabutylammonium triiodide, tetrabutylammonium bromodiiodide, 1-methyl-3-methyl-imidazolium iodide, 1-ethyl-3-methylimidazolium bromide, 2-chloro-1-methylpyridinium iodide, hexaphenyldiphosphazenium chloride, methyltributylphosphonium iodide, tetraphenylphosphonium iodide, tributylsulfonium iodide, diphenyliodonium iodide and the like may be exemplified (refer to PCT International Publication No. WO WO2013/027419).

When polymerization is performed by the RTCP method (reversible transfer catalyst polymerization), an organic molecule having a chain transfer ability is used as the catalyst. In this case, a catalyst and a radical generating agent (such as an azo compound) are combined, catalyst radicals are produced from the catalyst, and the catalyst radicals are used as an activating agent for dormant species.

Regarding the compound (catalyst) that produces radicals and extracts iodine from the polymerization initiator (XI), for example, a catalyst composed of a compound containing at least one central atom selected from among phosphorus, nitrogen, carbon, oxygen, germanium, tin and antimony and an iodine atom bonded to the central atom used in the RTCP method may be exemplified.

Regarding the catalyst containing a central element selected from among germanium, tin and antimony, for example, a compound containing at least one central element selected from among germanium, tin and antimony and at least one iodine atom bonded to the central element may be exemplified. Specific examples thereof include germanium(II) iodide, germanium(IV) iodide, tin(II) iodide, and tin(IV) iodide (refer to Japanese Unexamined Patent Application Publication No. 2007-92014). These catalysts may be used alone or two or more thereof may be used in combination.

Regarding the catalyst containing nitrogen or phosphorus as a central element, a compound containing at least one central element selected from among nitrogen and phosphorus and at least one iodine atom bonded to the central element may be exemplified, and specific examples thereof include phosphorus halides such as phosphorus iodide; phosphite compounds such as phosphine iodide; phosphinate compounds such as ethyl phenylphosphinate and phenylphenoxyphosphinate; imide iodide derivatives such as nitrogen iodide, phosphorous acid iodide, amine iodide, and iodosuccinimide; and hydantoin compounds (refer to PCT International Publication No. WO2008/139980). These catalysts may be used alone or two or more thereof may be used in combination.

Examples of catalysts having carbon as a central element include iodobenzene, 4-methyl-1-iodobenzene, 2,4,6-trimethyliodobenzene, 3-cyanoiodobenzene, 4-cyanoiodobenzene, 4-iodoanisole, tetraiodomethane, trifluoroiodomethane, difluorodiiodomethane, 1,4-cyclohexadiene, diphenylmethane, dimesitylmethane, xanthene, thioxanthene, diethyl malonate, fluorene; and acetoacetyl compounds such as acetylacetone. These catalysts may be used alone or two or more thereof may be used in combination.

Specific examples of oxygen-based catalysts include, for example, phenolic compounds such as phenol, hydroquinone, and tert-butylphenol; iodooxyphenyl compounds such as thymol diiodide; vitamins such as vitamin E, and N-succinimide. These catalysts may be used alone or two or more thereof may be used in combination.

In order to make the polymerization rate appropriate and reduce the residual amount of unreacted monomers, the amount of the catalyst (m) added is preferably 0.01 to 2,500 mol, more preferably 0.05 to 1,000 mol, and still more preferably 0.1 to 500 mol with respect to 100 mol of the polymerization initiator (XI).

The amount of the polymerization initiator (XI) may vary depending on the block structure of the block copolymer (C), a desired value of Mn, and the like, and may be, for example, 0.01 to 10 parts by mass with respect to 100 parts by mass of all monomers. The molecular weight of the polymerization initiator (XI) is not particularly limited, and a preferable range may vary depending on the Mn of the block copolymer (C), and for example, is preferably 150 to 1,500.

The polymerization conditions may be appropriately set depending on the types of the monomer and the polymerization initiator (XI) used. The polymerization temperature is, for example, room temperature to 200° C., and more preferably 60 to 120° C. In addition, the polymerization atmosphere is preferably in an inert gas such as nitrogen gas and argon gas. The reaction time may be appropriately set using the conversion rate of the monomer as an index, and is, for example, 30 minutes to 120 hours.

The polymerization may be bulk polymerization or solution polymerization. In addition, polymerization may be performed by emulsion polymerization, dispersion polymerization, suspension polymerization or the like. The solvent used for solution polymerization is not particularly limited, and examples thereof include water; alcohol solvents such as methanol, ethanol, isopropanol, n-butanol, and tert-butyl alcohol; halogen atom-containing solvents such as dichloroethane, dichloromethane, and chloroform; aromatic solvents such as benzene, toluene, and xylene; ether solvents such as propylene glycol methyl ether, dipropylene glycol methyl ether, ethyl cellosolve, butyl cellosolve, and diglyme; ester solvents such as ethyl acetate, butyl acetate, and cellosolve acetate; ketone solvents such as acetone, methyl ethyl ketone, methyl isobutyl ketone, and diacetone alcohol; and amide solvents such as dimethylformamide. The solvents are used alone or two or more thereof are used in combination.

The polymerization is completed by generally controlling the polymerization temperature. At the chain terminal of the polymer, a recombination of the radical chain terminal and the iodine radical is formed. It is preferable to inactivate the chain terminal because recracks can occur in the alkyl radical and the iodine radical at the chain terminal. The inactivation treatment is, for example, a method of converting the chain terminal into a non-polymerizable group. In addition, a desired functional group may be introduced into the chain terminal.

For introduction of a mercapto group into the block copolymer (C), as described above, a method using a monomer having a mercapto group among monomers subjected to polymerization, and a method in which a monomer in which a mercapto group is protected by a protecting group is used, and conversion into a mercapto group is performed at an arbitrary timing may be used. In addition, there is a method in which a mercapto group is introduced into a polymerization initiator residue and/or a coupling agent residue using a polymerization initiator and/or a coupling agent having a mercapto group or a protecting group thereof. In addition, there is a method of introducing a mercapto group into a desired part according to a conversion reaction during polymerization or after polymerization. In addition, a method of introducing a mercapto group into the chain terminal of the block copolymer (C) may be exemplified.

As described above, the block copolymer (C) may contain a functional group in at least one of the polymer block (A) and the polymer block (B) in addition to the mercapto group without departing from the spirit of the present invention. Examples of functional groups include a hydroxy group, a carboxyl group, an amino group, an isocyanate group, a glycidyl group, an amino group, an alkoxysilyl group and a vinyl group. The functional group may be used as a chemical cross-linking point.

After the polymer is obtained, as necessary, the iodine radical which is a dormant species is inactivated. If iodine in which the polymer terminal is a dormant species may remain, the process of inactivating the iodine radical can be omitted. In addition, the chain terminal of the polymer block (A) can be subjected to a process of terminal-treating an inactive group, a mercapto group, other functional groups or the like at an arbitrary timing.

When the above polymerization initiators (XI) of General Formulae (5) to (7) are used and only an ethylenically unsaturated monomer is used as the radical polymerizable monomer, a block copolymer (C) having a structure according to any of the following General Formulae (2) to (4) is obtained through the above process.

[Chem. 8]

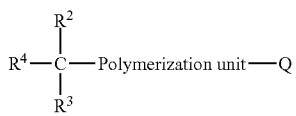

General Formula (2)

[Chem. 9]

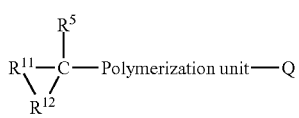

General Formula (3)

[Chem. 10]

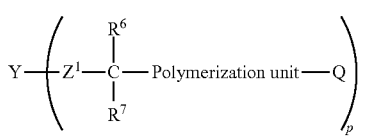

General Formula (4)

Here, the polymerization unit is a polymer unit mainly composed of a monomer derived from an ethylenically unsaturated monomer independently for each branch from Y in the case of General Formula (4), Q represents a monovalent molecular terminal group, and independently for each branch from Y, the molecular terminal group is a functional group or a hydrocarbon group or an iodine group which may have a functional group, and other symbols are as described in General Formulae (5) to (7). Here, the functional group here includes any functional group (for example, a hydroxy group, a carboxyl group, an amino group, an isocyanate group, a glycidyl group, an amino group, an alkoxysilyl group and a vinyl group) other than the mercapto group. The block copolymer (C) is not limited to those having a structural unit derived from an ethylenically unsaturated monomer as the structural unit of the polymer represented by General Formulae (2) to (4), and may contain other radical polymerizable monomers. As a preferable method, the following methods may be exemplified.

When the polymerization initiator (XI) has two carbon-iodine bonds, blocks are polymerized in the order of the polymer block (B) and the polymer block (A), and thereby an [A-B]$_2$X star-shaped block structure is obtained. Similarly, when the polymerization initiator (XI) has three carbon-iodine bonds, blocks are polymerized in the order of the polymer block (B) and the polymer block (A), and thereby an [A-B]$_3$X star-shaped block structure is obtained. When the polymerization initiator (XI) has 4 to 6 carbon-iodine bonds, a star-shaped block structure with q of 4 to 6 is obtained.

[Method (I)]

(Production Example 1: Block Copolymer (C) Having Mercapto Group in Hard Segment)

FIG. 1 shows an example of a method of producing a block copolymer (C) having a mercapto group in a side chain of a hard segment (polymer block (A)) by the method (I). As shown in FIG. 1, first, polymerization is performed by adding a polymerization initiator 3 having two carbon-iodine bonds and a catalyst 4 to a monomer 1 for forming a polymer block (B). One type of the monomer 1 can be used or two or more types thereof can be used (the same applies to the following production examples). According to the polymerization, the polymer block (B) having a structural unit 1* derived from the initiator residue X and the monomer 1 and a polymer 31 having iodine as a dormant species bound at the chain terminal are obtained (process (a)).

After the polymer 31 is obtained, a monomer 2 for forming the polymer block (A) is added. In the drawing, among the monomers 2, a monomer having a non-radical polymerizable alkenyl group is denoted with the reference numeral 22, and the other monomers are denoted with the reference numeral 21. One of the monomers 21 and 22 may be used independently or two or more thereof may be used in combination. In the example in FIG. 1, an example in which allyl methacrylate is used as the monomer 22 will be described. When the monomer 2 is added, living radical polymerization proceeds from the chain terminal of the polymer 31 as a base point, and a polymer 32 having an [A-B]$_2$X star-shaped block structure, having iodine as a dormant species bound at the chain terminal and having structural units 21* and 22* derived from the monomer 2 is obtained. The position of the structural unit 22* derived from the monomer 2 is independently arbitrary in the polymer block A, and each of the polymer blocks A may not include the structural unit 22*.

In the polymer 32, for convenience of explanation, among the structural units derived from the monomer 22 (allyl methacrylate), only the —O—CH$_2$—CH═CH$_2$ group 23 is shown in the actual chemical formula, and the other parts are schematically shown. Here, in the stage in which the conversion rate of the monomer 1 becomes, for example, 60%, if the monomer 2 for forming the polymer block (A) is added, the monomer 1 may be incorporated into the polymer block (A) depending on the reactivity of the monomer 1, but the Tg of the polymer block (A) may be 20° C. or higher, and the monomer 1 may be incorporated. The same applies to production examples to be described below.

Next, the chain terminal of the polymer 32 is converted into an inactive group (not shown). Then, a mercaptization reagent 5 (here, 1,2-ethanedithiol) is added, and according to a thiol-ene reaction, the alkenyl group in the —O—CH$_2$—CH═CH$_2$ group 23 and the mercapto group of the mercaptization reagent 5 are reacted, and thereby a block copolymer (C) in which a mercapto group 24 is introduced into the side chain is obtained.

In the example in FIG. 1, an example in which 1,2-ethanedithiol is used as the mercaptization reagent 5 has been described, but the dithiol compound of the following General Formula (1) can be preferably used as the mercaptization reagent 5.

[Chem. 11]

HS—R¹—SH      General Formula (1)

Here, $R^1$ represents a divalent organic group. Preferable examples include divalent organic groups having at least one of an alkylene group, an arylene group, a heterocyclic group and an alkylene oxide group, which may have a substituent. The number of carbon atoms of the divalent organic group is preferably 2 to 20, and more preferably 2 to 12.

Specific examples of General Formula (1) include aliphatic polythiols such as 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercapto-1-propanol(2-mercaptoacetate), 2,3-dimercapto-1-propanol(3-mercaptopropionate), 2,3-dimercapto-1-propanol(3-mercaptobutyrate), diethylene glycol bis(2-mercaptoacetate), diethylene glycol bis(3-mercaptopropionate), diethylene glycol bis(3-mercaptobutyrate), 1,2-dimercaptopropylmethyl ether, 2,3-dimercaptopropylmethyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), ethylene glycol bis(3-mercaptobutyrate), trimethylolpropane bis(2-mercaptoacetate), trimethylolpropane bis(3-mercaptopropionate), trimethylolpropane bis(3-mercaptobutyrate), pentaerythritol tetrakis(2-mercaptoacetate), pentaerythritol tetrakis(3-mercaptopropionate), pentaerythritol tetrakis(3-mercaptobutyrate), and tetrakis(mercaptomethyl)methane;

aromatic polythiols such as 1,2-dimercapto benzene, 1,3-dimercapto benzene, 1,4-dimercapto benzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercapto benzene, 1,2,4-trimercapto benzene, 1,3,5-trimercapto benzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane;

bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4-mercaptomethyl-3,6-dithia-1,8-octanedithiol, 4,8-dimercaptomethyl-1,11-mercapto-3,6,9-trithia undecane, 4,7-dimercaptomethyl-1,11-mercapto-3,6,9-trithia undecane, 5,7-dimercaptomethyl-1,11-mercapto-3,6,9-trithia undecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-dimercaptomethyl-1,4-dithiane, 2,5-dimercaptomethyl-2,5-dimethyl-1,4-dithiane, bis(mercapto methyl)disulfide, bis(mercapto ethyl)disulfide, bis(mercapto propyl)disulfide, and the like, and esters of these thioglycolic acids, mercapto propionic acids and mercapto butanoic acids;

aliphatic polythiols containing sulfur atoms such as hydroxymethyl sulfide bis(2-mercaptoacetate), hydroxymethyl sulfide bis(3-mercaptopropionate), hydroxymethyl sulfide bis(3-mercaptobutyrate), hydroxyethyl sulfide bis(2-mercaptoacetate), hydroxyethyl sulfide bis(3-mercaptopropionate), hydroxyethyl sulfide bis(3-mercaptobutyrate), hydroxypropyl sulfide bis(2-mercaptoacetate), hydroxypropyl sulfide bis(3-mercaptopropionate), hydroxypropyl sulfide bis(3-mercaptobutyrate), hydroxymethyl disulfide bis(2-mercaptoacetate), hydroxymethyl disulfide bis(3-mercaptopropionate), hydroxymethyl disulfide bis(3-mercaptobutyrate), hydroxyethyl disulfide bis(2-mercaptoacetate), hydroxyethyl disulfide bis(3-mercaptopropionate), hydroxyethyl disulfide bis(3-mercaptobutyrate), hydroxypropyl disulfide bis(2-mercaptoacetate), hydroxypropyl disulfide bis(3-mercaptopropionate), hydroxypropyl disulfide bis(3-mercapto butyrate), 2-mercapto ethyl ether bis(2-mercapto acetate), 2-mercapto ethyl ether bis(3-mercaptopropionate), 2-mercapto ethyl ether bis(3-mercapto butyrate), 1,4-dithiane-2,5-diol bis(2-mercapto acetate), 1,4-dithiane-2,5-diol bis(3-mercaptopropionate), 1,4-dithiane-2,5-diol bis(3-mercaptobutyrate), thiodiglycolic acid bis(2-mercapto ethyl ester), thiodipropionic acid bis(2-mercapto ethyl ester), thiodibutanoic acid bis(2-mercapto ethyl ester), 4,4-thiodibutyl acid bis(2-mercapto ethyl ester), dithiodiglycolic acid bis(2-mercapto ethyl ester), dithiodipropionic acid bis(2-mercapto ethyl ester), dithiodibutanoic acid bis(2-mercapto ethyl ester), 4,4-dithiodibutyl acid bis(2-mercapto ethyl ester), thiodiglycolic acid bis(2,3-dimercapto propyl ester), thiodipropionic acid bis(2,3-dimercapto propyl ester), thiodibutanoic acid bis(2,3-dimercapto propyl ester), dithioglycolic acid bis(2,3-dimercapto propyl ester), dithiodipropionic acid bis(2,3-dimercapto propyl ester), and dithiodibutanoic acid bis(2,3-dimercapto propyl ester); and aromatic polythiols containing sulfur atoms such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris (mercaptoethylthio)benzene, and their alkylated products. These are used alone or two or more thereof are used in combination.

According to the method using the mercaptization reagent of General Formula (1) for the alkenyl group of the precursor of the block copolymer (C), the mercapto group can be easily introduced into the side chain. The method of introducing a mercapto group is an example, and a mercapto group can be introduced into the side chain by various known methods.

Here, in FIG. 1, a block copolymer (C) in which a mercapto group is introduced into all alkenyl groups with respect to the polymer 32 which is a precursor of the block copolymer is shown, but at least one of alkenyl groups may be converted into a mercapto group. The same applies to production examples to be described below.

(Production Example 2: Block Copolymer (C) Having Mercapto Group in Soft Segment)

Figure 2:
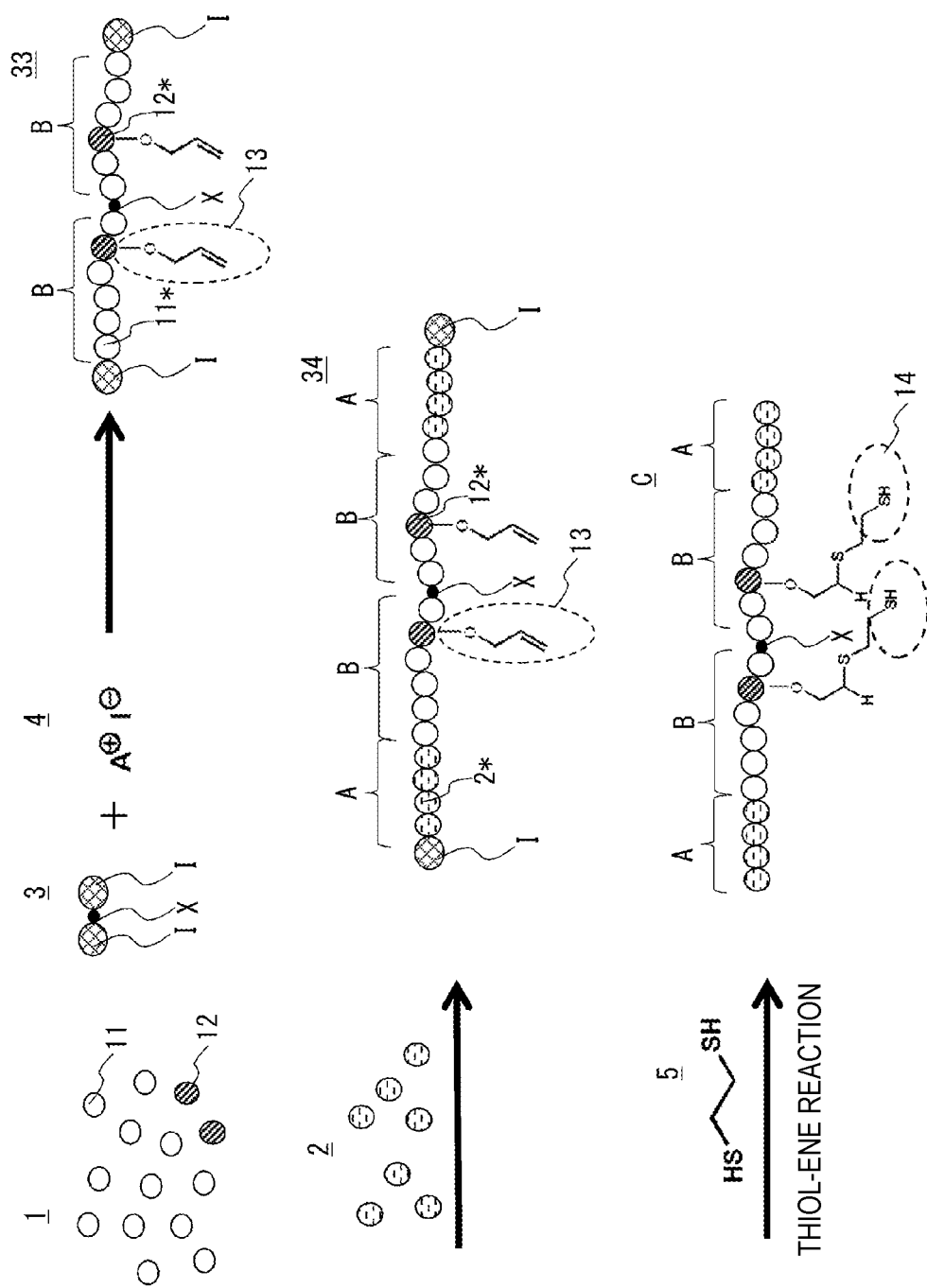
FIG. 2 is a schematic view for explaining a method for producing a block copolymer according to Production Example 2.

An example of a method of producing a block copolymer (C) having a mercapto group in a side chain of a soft segment (polymer block (B)) will be described with reference to the schematic view of FIG. 2. Here, in the following drawings, parts having the same function are denoted with the same reference numerals as those in the above drawings, and descriptions thereof will be appropriately omitted. As shown in FIG. 2, first, polymerization is performed by adding the polymerization initiator 3 having two carbon-iodine bonds and the catalyst 4 to the monomer 1 for forming the polymer block (B). In the drawing, among the monomers 1, a monomer having a non-radical polymerizable alkenyl group is denoted with the reference numeral 12, and the other monomers are denoted with the reference numeral 11. In the example in FIG. 2, an example in which allyl methacrylate is used as the monomer 12 will be described. According to the polymerization, the polymer block (B) having an initiator residue X and a polymer 33 having iodine as a dormant species bound at the chain terminal are obtained. In the polymer 33, for convenience of explanation, among the structural units derived from the monomer 12 (allyl acrylate), only the —O—CH$_2$—CH═CH$_2$ group 13 is shown in the actual chemical formula and the other parts are schematically shown.

After the polymer 33 is obtained, the monomer 2 for forming the polymer block (A) is added. The monomers 2 may be used alone or two or more thereof may be used in combination. When the monomer 2 is added, living radical polymerization proceeds from both terminals of the polymer 33 as base points, and a polymer 34 having an [A-B]$_2$X star-shaped block structure and having iodine as a dormant species bound at the chain terminal is obtained. Here, in the stage in which the conversion rate of the monomer 1 becomes, for example, 60%, if the monomer 2 for forming the polymer block (A) is added, the monomer 1 may be incorporated into the polymer block (A) depending on the reactivity of the monomer 1, but the glass transition temperature of the polymer block (A) may be 20° C. or higher, and some of the monomers 1 may be incorporated into the polymer block (A).

Next, the chain terminal of the polymer 34 is converted into an inactive group (not shown). Then, 1,2-ethanedithiol as the mercaptization reagent 5 is added, and according to a thiol-ene reaction, the alkenyl group in the —O—CH$_2$—CH═CH$_2$ group 13 and the thiol group are reacted, and thereby a block copolymer (C) in which a mercapto group 14 is introduced into the side chain is obtained. Similar to the example in FIG. 1, the dithiol compound of General Formula (1) can be preferably used as the mercaptization reagent 5.

(Production Example 3: Block Copolymer (C) Having Mercapto Group in Hard Segment and Soft Segment)

When the method of introducing a mercapto group into a hard segment and the method of introducing a mercapto group into a soft segment in Production Examples 1 and 2 are used in combination, it is possible to produce a block copolymer (C) having a mercapto group in a hard segment and a soft segment.

(Production Example 4: Block Copolymer (C) Having Mercapto Group in Molecular Terminal)

Figure 3:
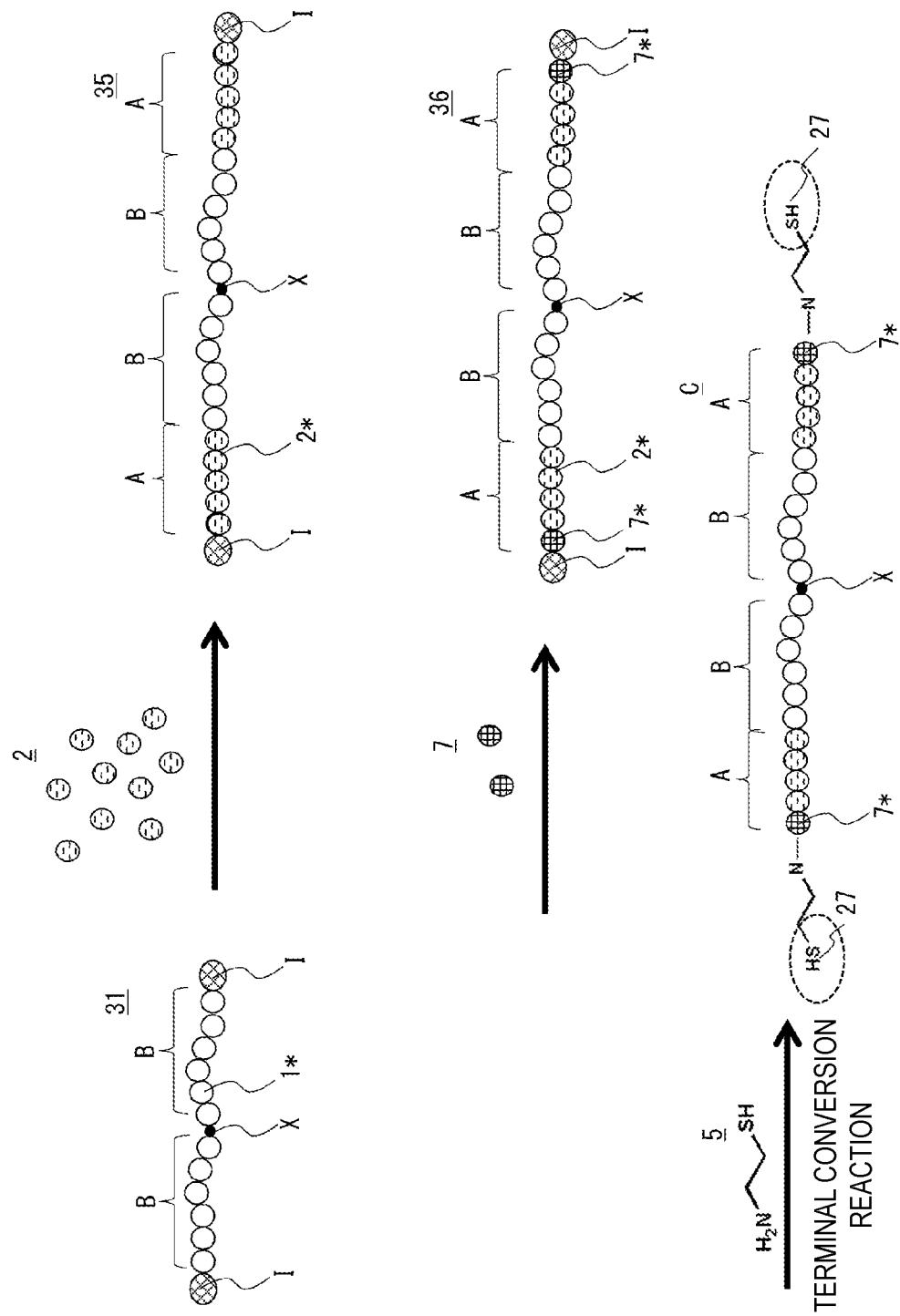
FIG. 3 is a schematic view for explaining a method for producing a block copolymer according to Production Example 4.

Next, an example of a method of producing a block copolymer (C) having a mercapto group at the molecular terminal will be described with reference to the schematic view of FIG. 3. In Production Example 4, the procedure until the process of obtaining the polymer block (B) in Production Example 1 is the same. Next, the monomer 2 is added to polymerize the polymer block (A). Here, an example using only a monomer having no mercapto group will be described. When the monomer 2 is added, living radical polymerization proceeds from the chain terminal of the polymer 31 as a base point, and a polymer 35 having an [A-B]$_2$X star-shaped block structure, having iodine as a dormant species bound at the chain terminal and having a structural unit 2* derived from the monomer 2 is obtained (process (b)).

After the polymer 35 is obtained, when a very small amount of a monomer 7 that allows a functional group such as a mercapto group to be easily introduced into the chain terminal of the polymer block (A), for example, an acrylate monomer, is added, and the monomer 7 is introduced into the chain terminal, a polymer 36 having a structural unit 7* derived from the monomer 7 is obtained (process (b')). It is needless to say that a functional group such as a mercapto group may be introduced into the chain terminal of the polymer 35 after the process (b) without performing the process (b').

Next, a mercapto group 27 is introduced by performing a chain-like terminal conversion reaction on the polymer 36. In the example in FIG. 3, 2-aminoethanethiol is used as the mercaptization reagent 5 for introducing a mercapto group, but the compound of the following General Formula (11) can be preferably used.

[Chem. 12]

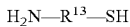

General Formula (11)

Here, R$^{13}$ represents a divalent organic group. Preferable examples include divalent organic groups having at least one of an alkylene group, an arylene group, a heterocyclic group and an alkylene oxide group, which may have a substituent. The number of carbon atoms of the divalent organic group is preferably 2 to 20, and more preferably 2 to 12.

Specific examples of General Formula (11) include 2-(n-octylamino)ethanethiol, 2-(dimethylamino)ethanethiol, 2-(diethylamino)ethanethiol, 2-(diisopropylamino)ethanethiol, 2-aminobenzenethiol, 4-aminobenzenethiol, 2-amino-5-mercapto-1,3,4-thiadiazole, 3-amino-5-mercapto-1,2,4-triazole, 4-(dimethylamino)benzenethiol, 4-amino-3-hydrazino-5-mercapto-1,2,4-triazole, and L-cysteine as well as 2-aminoethanethiol.

In explanation of an example in which butyl acrylate is used as the monomer 7, and the compound of General Formula (11) is used, for example, a mercapto group can be introduced by terminal conversion according to the reaction of General Formula (12) to be shown below. Through these processes, a block copolymer (C) is obtained.

[Chem. 13]

General Formula (12)

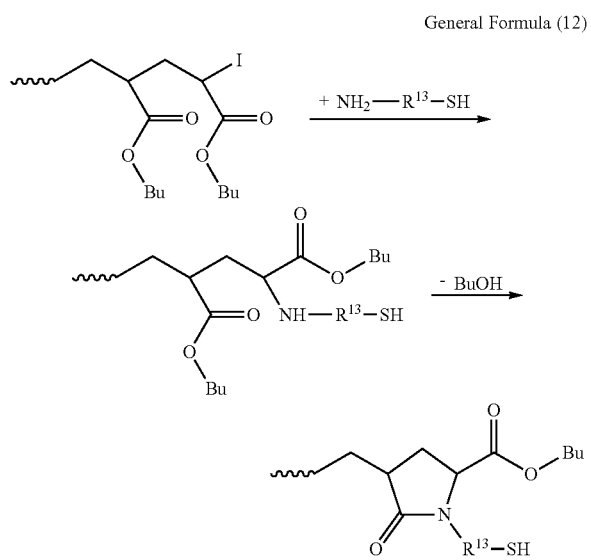

As another method of introducing a mercapto group into at least some of the molecular terminals of at least one polymer block (A), the method described in Japanese Unexamined Patent Application Publication No. 2003-96150 is also preferable. A precursor of the block copolymer (C) having a thiocarbonylthio group at the molecular terminal is polymerized, this thiocarbonylthio group is reacted with at least one compound selected from among a base, an acid, and a hydrogen-nitrogen bond-containing compound, and thus the thiocarbonylthio group can be converted into a mercapto group.

(Production Example 5: Production Example of 3- to 6-Branch Block Copolymer (C))

A 3- to 6-branch block copolymer (C) can be produced by the same method as in Production Examples 1 to 4 except that a polymerization initiator (XI) having 3 to 6 carbon-iodine bonds is used.

According to the RCMP method (or RTCP method), there is an advantage of a block copolymer (C) containing substantially no heavy metal being obtained. Therefore, it is particularly preferable for applications in which it comes into direct contact with a human body, for example, medical applications. In addition, according to the RCMP method (or RTCP method), living radical polymerization can be performed so that a block copolymer (C) having a narrow degree of polydispersity can be obtained.

[Method (II)]

Regarding the method (II), various methods can be used, and a polymerization method according to living radical polymerization or ionic polymerization is preferable. Among these, the RCMP method (or RTCP method), the RAFT method, and the ATRP living radical polymerization are preferable because they make it easy to control the molecular weight and obtain a block copolymer having a narrow degree of polydispersity. In addition, the RCMP method (or RTCP method) is more preferable because its cost is low, it enables synthesis to be performed without using a metal, and polymerization to be performed under the same temperature condition as general radical polymerization, and it can be used in existing production facilities. Hereinafter, a specific example of the method (II) will be described.

(Production Example 6: Block Copolymer (C) Having Triblock Structure in which Initiator Residue X is at Chain Terminal)

Figure 4:
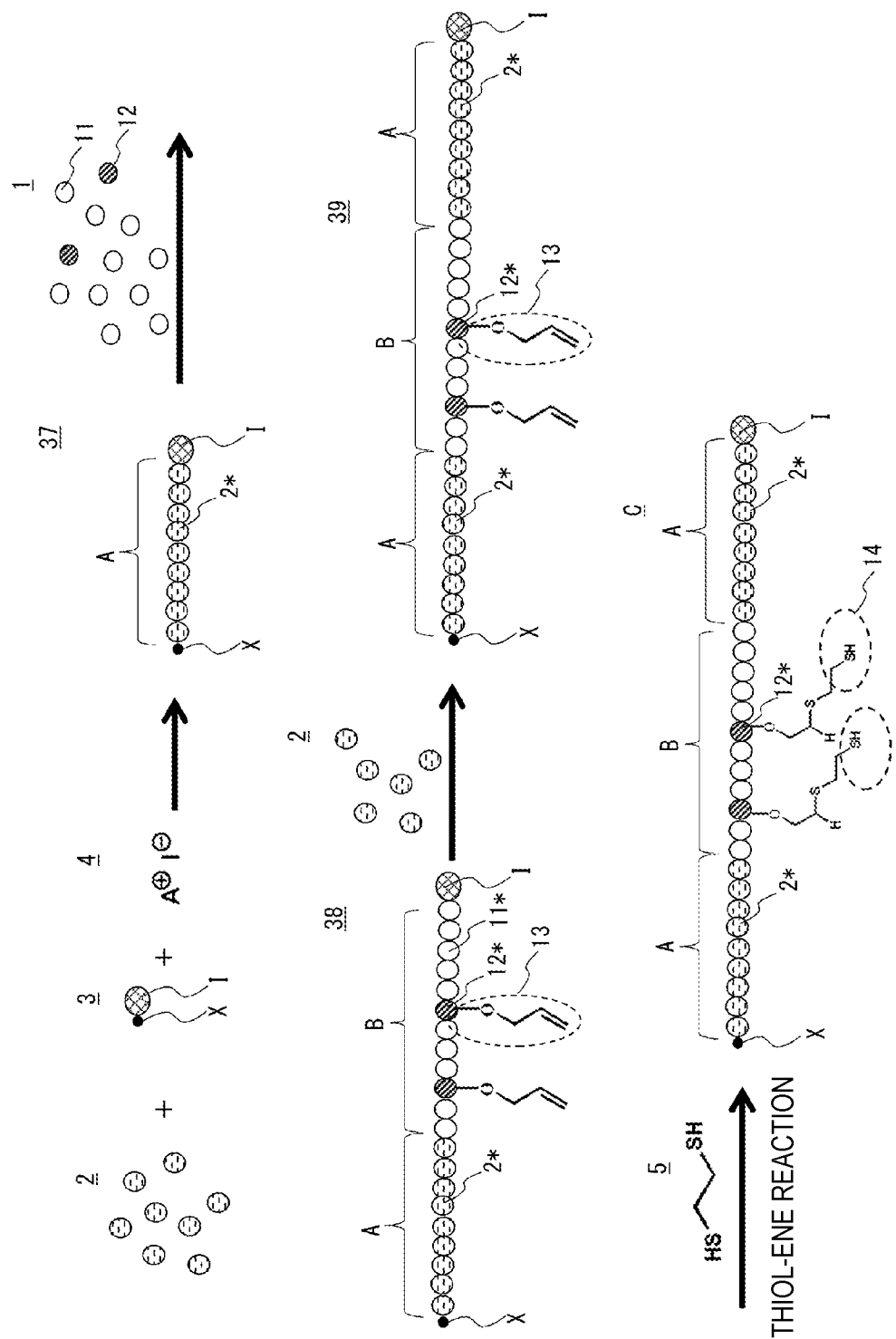
FIG. 4 is a schematic view for explaining a method for producing a block copolymer according to Production Example 6.

First, as shown in FIG. 4, polymerization is performed by adding a polymerization initiator 3 having one carbon-iodine bond and a catalyst 4 to the monomer 2 for forming the polymer block (A). According to the polymerization, the polymer block (A) having an initiator residue X and a polymer 37 having iodine as a dormant species bound at the chain terminal and having a structural unit 2* derived from the monomer 2 are obtained (process (g)).

After the polymer 37 is obtained, the monomer 1 for forming the polymer block (B) is added. In the drawing, among the monomers 1, a monomer having a non-radical polymerizable alkenyl group is denoted with the reference numeral 12, and the other monomers are denoted with the reference numeral 11. One of the monomers 11 and 12 may be used independently or two or more thereof may be used in combination. In the example in FIG. 4, an example in which allyl methacrylate is used as the monomer 12 will be described. When the monomer 1 is added, living radical polymerization proceeds from the chain terminal of the polymer 37 as a base point, and a polymer 38 having iodine as a dormant species bound at the chain terminal and having structural units 11* and 12* derived from the monomer 1 is obtained (process (h)).

After the polymer 38 is obtained, the monomer 2 for forming the polymer block (A) is added. When the monomer 2 is added, living radical polymerization proceeds from the terminal of the polymer 38 as a base point, and an A-B-A type polymer 39 having an initiator residue and iodine as a dormant species bound at the chain terminal is obtained (process (i)).

Next, the polymerizable group at the chain terminal of the polymer 39 is converted into an inactive group (non-polymerizable group) (not shown). Here, if iodine as a dormant species may be bound at the chain terminal, this process can be omitted.

Then, the mercaptization reagent 5 (here. 1,2-ethanedithiol) is added, and according to a thiol-ene reaction, the alkenyl group in the —O—CH$_2$—CH=CH$_2$ group 13 and the mercapto group are reacted, and thereby a block copolymer (C) in which the mercapto group 14 is introduced into the side chain is obtained (process (c)). In the example in FIG. 4, an example in which 1,2-ethanedithiol is used as the mercaptization reagent 5 has been described, but the dithiol compound of General Formula (1) can be preferably used as the mercaptization reagent 5.

In Production Example 6, the method of polymerization by the RCMP method has been described, but production may be performed by a living radical polymerization or ionic polymerization method such as the RAFT method and the ATRP method. According to the method (II), there is an advantage that the molecular weights of two polymer blocks (A) can be easily changed. In addition, since the configurations of the monomer components of two polymer blocks (A) can be changed, there is advantage of a high degree of freedom in design.

Here, in Production Example 6, an example in which a mercapto group is introduced into the polymer block (B) has been described, but a mercapto group may be introduced into only the polymer block (A) or both the polymer blocks (A) and (B). In addition, in addition to the above aspects, a mercapto group may be introduced into the chain terminal. In addition, in place of the above aspects, a mercapto group may be introduced into only the chain terminal.

[Method (III)]

Regarding the method (III), various methods can be used. For synthesis of a diblock structure, a polymerization method according to living radical polymerization or ionic polymerization is preferable. Among these, the RCMP method (or RTCP method), the RAFT method, and the ATRP living radical polymerization are preferable because they make it easy to control the molecular weight and obtain a block copolymer having a narrow degree of polydispersity. In addition, the RCMP method (or RTCP method) is more preferable because its cost is low, it enables synthesis to be performed without using a metal, and polymerization to be performed under the same temperature condition as general radical polymerization, and it can be used in existing production facilities.

First, an A-B type diblock structure is synthesized. Regarding a method of synthesizing an A-B type diblock structure, various known methods can be used. Hereinafter, a method of obtaining a diblock structure by the RAFT method will be exemplified.

As described above, the RAFT method is a type of living radical polymerization, and is preferable as a method of obtaining a block copolymer having a controlled molecular weight. The RAFT method is performed in the presence of an appropriate chain transfer agent (RAFT agent, CTA: charge transfer agent). As the RAFT agent, a thiocarbonylthio compound such as dithioester, dithiocarbonate, trithiocarbonate, and xanthate is used, and the polymerization reaction proceeds according to a reversible chain transfer reaction using a thiocarbonylthio group. Hereinafter, regarding specific examples of the method (III), the RAFT method and the RCMP method will be exemplified.

(Production Example 7: 4-Branch Block Copolymer (C) Having Mercapto Group in Hard Segment)

Figure 5:
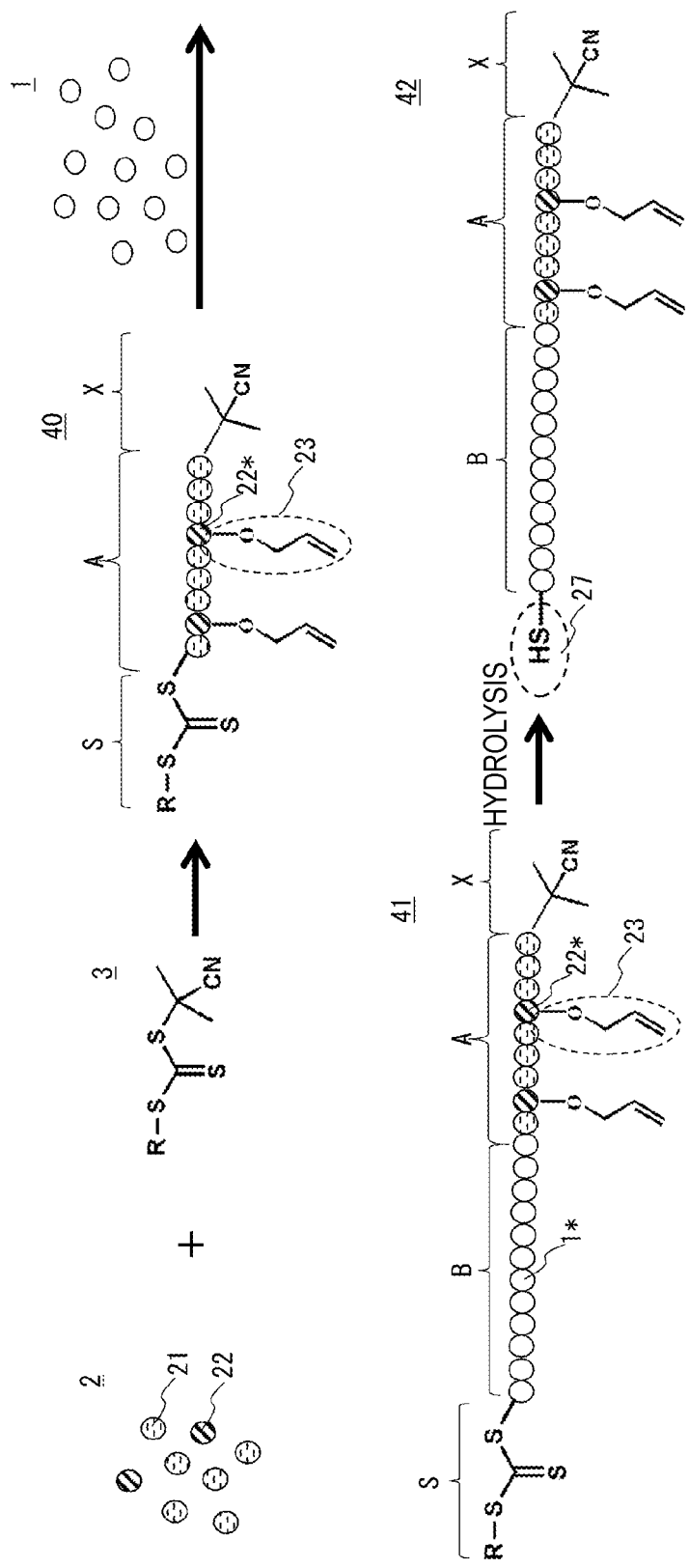
FIG. 5 is a schematic view for explaining a method for producing a block copolymer according to Production Example 7.
Figure 6:
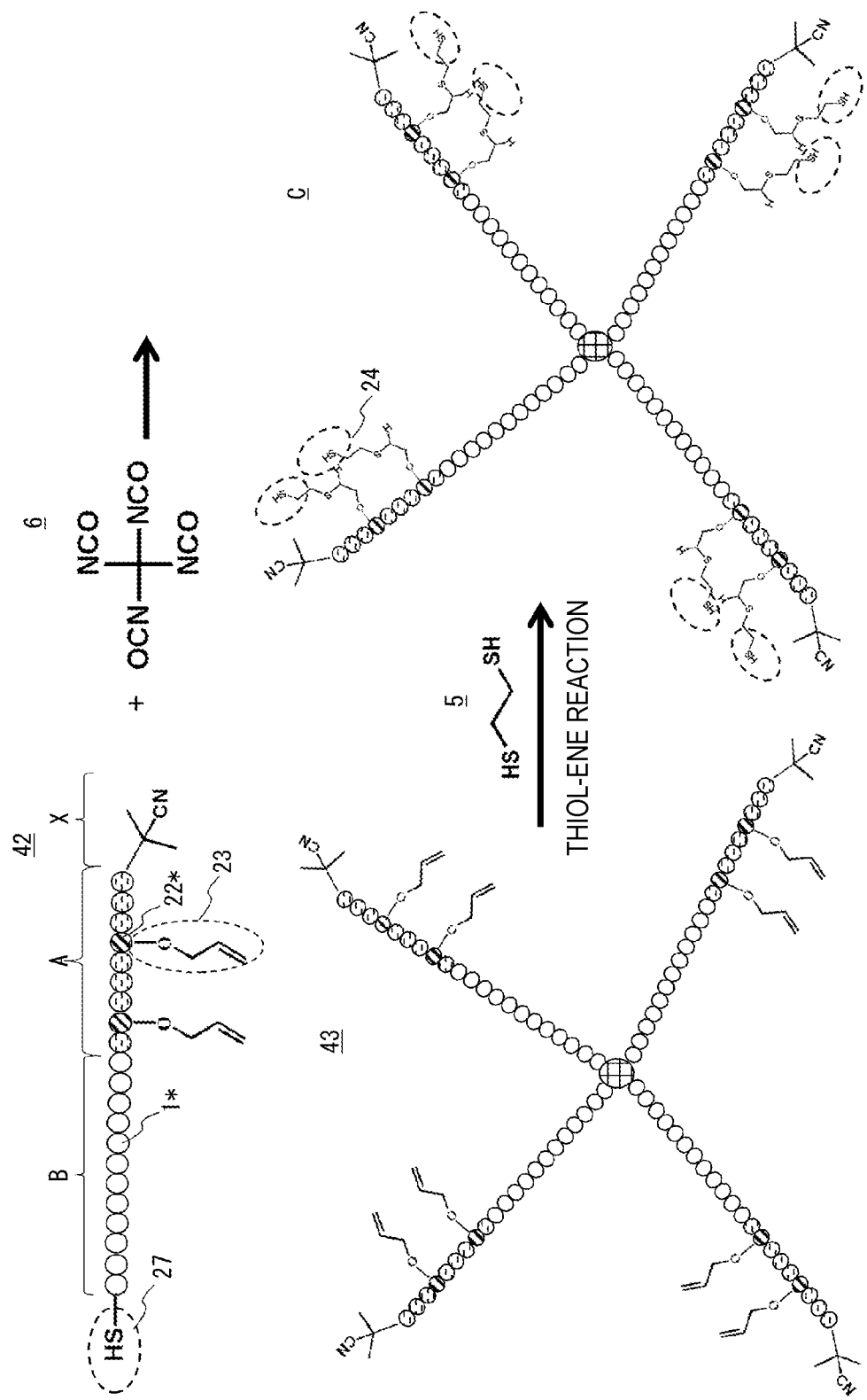
FIG. 6 is a schematic view for explaining a method for producing a block copolymer according to Production Example 7.

FIGS. 5 and 6 show an example of a method of producing a 4-branch block copolymer (C) having a mercapto group in the side chain of the hard segment (polymer block (A)). As shown in FIG. 5, first, polymerization is performed by adding a polymerization initiator 3 having a thiocarbonylthio group and a catalyst (not shown) as necessary to the monomer 2 for forming the polymer block (A).

In the example in FIG. 5, an example in which one trithiocarbonate-containing compound is used as the polymerization initiator 3 is shown, but in addition to trithiocarbonate-containing compounds, a dithiobenzoate-containing compound, a dithiobenzoate-containing compound and a xanthate-containing compound are also preferable. In the drawing, among the monomers 2, a monomer having a non-radical polymerizable alkenyl group is denoted with the reference numeral 22, and the other monomers are denoted with the reference numeral 21. One of the monomers 21 and 22 may be used independently or two or more thereof may be used in combination. In the monomer 22 in FIG. 5, an example using allyl methacrylate will be described. According to the polymerization, the polymer block (A) having an initiator residue X and a polymer 40 in which a thiocarbonylthio group derivative S is bonded to the chain terminal are obtained. In the polymer 40, for convenience of explanation, among the structural units derived from the monomer 22 (allyl methacrylate), only the —O—CH$_2$—CH=CH$_2$ group 23 is shown in the actual chemical formula and the other parts are schematically shown.

In the stage in which the conversion rate of the monomer 2 becomes, for example, 60 to 100%, the monomer 1 for forming the polymer block (B) is added. When the monomer 1 is added, living radical polymerization proceeds from the chain terminal of the polymer 40 as a base point, and a polymer 41 having an A-B type diblock structure and having a thiocarbonylthio group derivative S bound at the chain terminal is obtained. Then, this is hydrolyzed (treated with at least one compound selected from among a base, an acid, and a hydrogen-nitrogen bond-containing compound), and thereby an A-B type diblock structure 42 having a mercapto group and X at the chain terminal is obtained.

Subsequently, as shown in FIG. 6, a tetrafunctional tetraisocyanate compound 6 as a coupling agent is added to the A-B type diblock structure 42 having a mercapto group and X at the chain terminal to cause a coupling reaction. As a result, a structure 43 having an initiator residue X at the molecular terminal of the polymer block (A) and having a 4-branch [A-B]$_4$X is obtained. Here, in [A-B]$_4$X, X represents a derivative of a coupling agent residue and has a structure different from the initiator residue X derived from the initiator bound at the molecular terminal of the polymer block (A). 1,2-ethanedithiol as the mercaptization reagent 5 is added to the structure 43, a thiol-ene reaction is performed, and thereby a block copolymer (C) having a mercapto group as a part of the alkenyl group of the polymer block (A) is obtained. Regarding the mercaptization reagent 5, the compound of General Formula (1) or the like can be preferably used.

Regarding the coupling agent, in the above examples, a compound having two or more functional groups exhibiting reactivity with respect to a mercapto group or a mercaptide group in one molecule is used. In Production Example 7, a compound having four isocyanate groups is used. Examples of preferable coupling agents include a polyisocyanate compound and a polyfunctional acrylate compound. In addition, another functional group may be introduced into a part of the mercapto group or the mercaptide group, and a coupling reaction may be performed according to a reaction using this functional group.

In Production Example 7, regarding the coupling agent, a tetrafunctional coupling agent may be exemplified, and a bi- to hexa-functional coupling agent can be arbitrarily used. Examples of coupling agents include diisocyanate monomers such as toluene diisocyanate, hexamethylene diisocyanate, diphenylmethane diisocyanate, and isophorone diisocyanate, adduct components in which each diisocyanate monomer is added to a tri- to hexa-functional multivalent alcohol, an isocyanatenurate component (trimer), and a biuret component.

(Production Example 8: 4-Branch Block Copolymer (C) Having Mercapto Group in Hard Segment)

Figure 7:
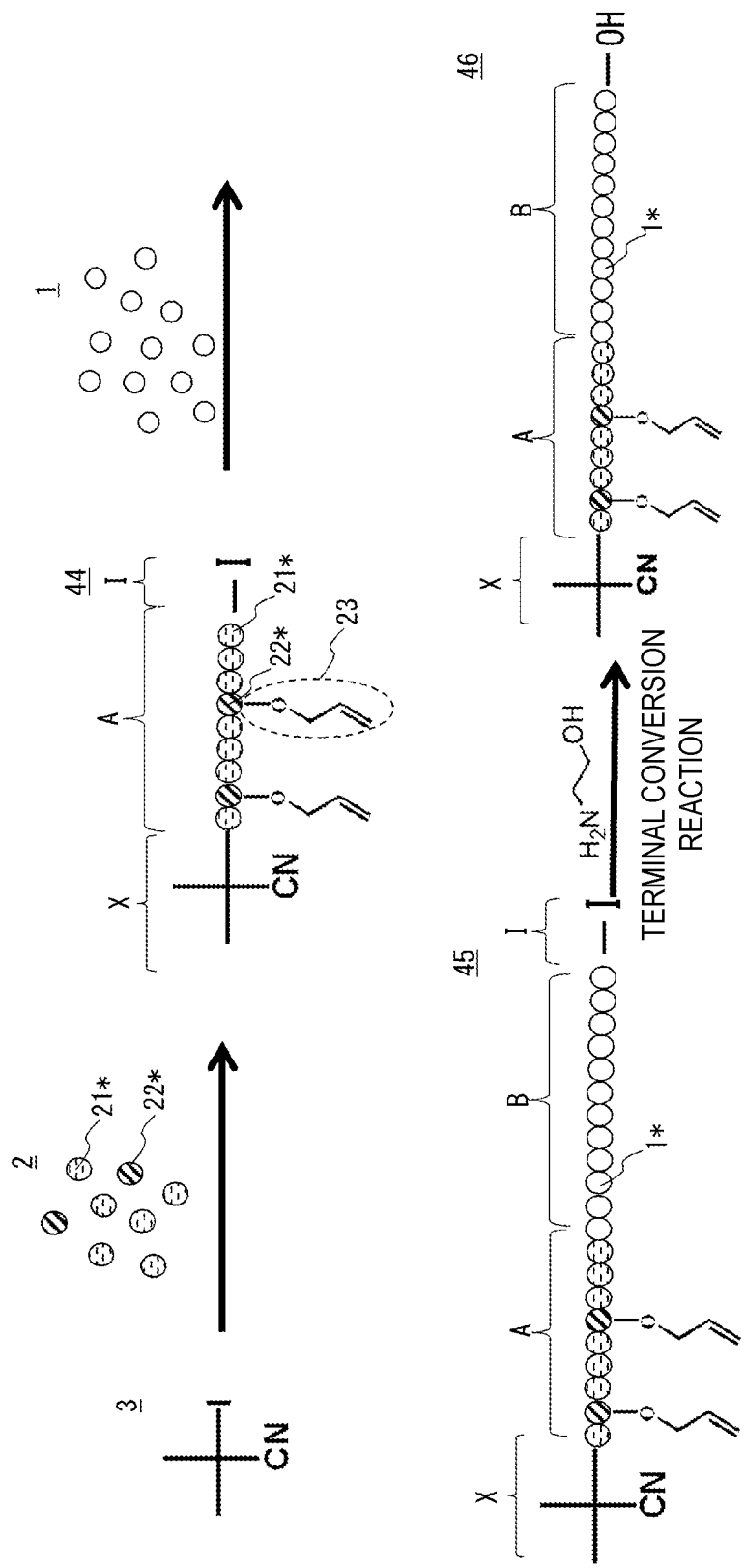
FIG. 7 is a schematic view for explaining a method for producing a block copolymer according to Production Example 8.

FIG. 7 shows an example of another method of producing a 4-branch block copolymer (C) having a mercapto group in the side chain of the hard segment (polymer block (A)). As shown in FIG. 7, first, polymerization is performed by adding a polymerization initiator 3 having one carbon-iodine bond and a catalyst (not shown) as necessary to the monomer 2 for forming the polymer block (A).

In the example in FIG. 7, an example in which 2-iodo-2-methylpropionitrile is used as the polymerization initiator 3 is shown, but, for example, the above iodine-based polymerization initiator having one iodine-carbon bond can be preferably used. In the drawing, among the monomers 2, a monomer having a non-radical polymerizable alkenyl group is denoted with the reference numeral 22, and the other monomers are denoted with the reference numeral 21. In the monomer 22 in FIG. 7, an example using allyl methacrylate will be described. According to the polymerization, the polymer block (A) having an initiator residue X and a polymer 44 in which iodine I is bonded to the chain terminal are obtained (process (d)). In the polymer 44, for convenience of explanation, among the structural units derived from the monomer 22 (allyl methacrylate), only the —O—CH$_2$—CH=CH$_2$ group 23 is shown in the actual chemical formula and the other parts are schematically shown.

After the polymer 44 is obtained, the monomer 1 for forming the polymer block (B) is added. When the monomer 1 is added, living radical polymerization proceeds from the chain terminal of the polymer 44 as a base point, and a polymer 45 having an A-B type diblock structure and having iodine I bound to the chain terminal is obtained (process (e)). Then, this is reacted with 2-aminoethanol, and an A-B type diblock structure 46 having a hydroxy group at one end of the chain terminal and X at the other end thereof is obtained (process (d')). The process (d') may be performed according to the type of the coupling agent used, and can be performed arbitrarily.

Figure 8:
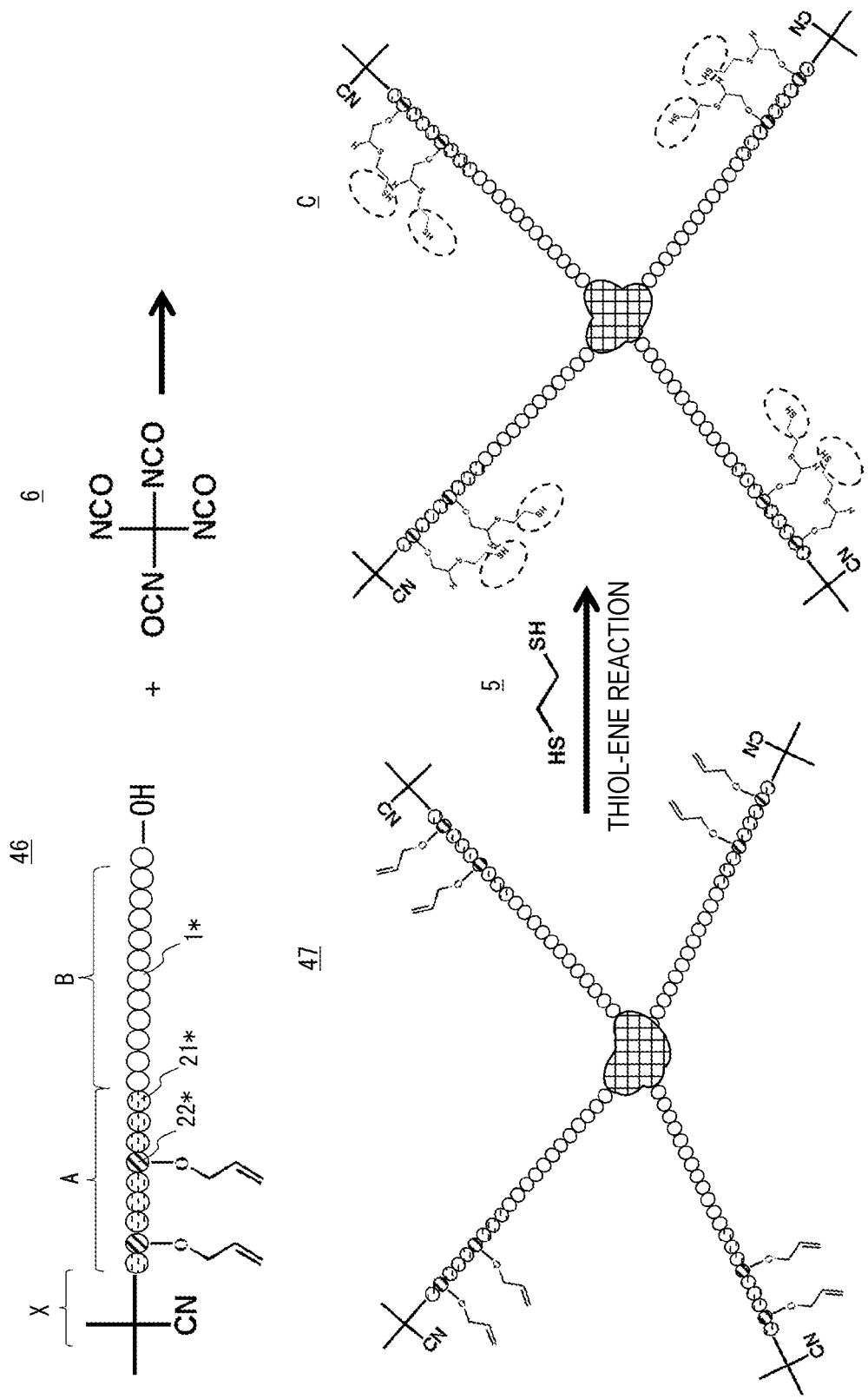
FIG. 8 is a schematic view for explaining a method for producing a block copolymer according to Production Example 8.

Subsequently, as shown in FIG. 8, the A-B type diblock structure 46 is coupled with a coupling agent to obtain a star-shaped block structure (process (f)). In Production Example 8, an example in which the tetrafunctional tetraisocyanate compound 6 is used as the coupling agent will be described. According to a coupling reaction, as shown in FIG. 8, a structure 47 having an initiator residue X at the molecular terminal of the polymer block (A) and having a 4-branch [A-B]$_4$X is obtained. Here, as in Production Example 7, in [A-B]$_4$X, X represents a derivative of a coupling agent residue and has a structure different from the initiator residue X derived from the initiator bound at the molecular terminal of the polymer block (A).

1,2-ethanedithiol as the mercaptization reagent 5 is added to the structure 47, a thiol-ene reaction is performed, and thereby a block copolymer (C) having a mercapto group in at least one of the alkenyl groups of the polymer block (A) is obtained. Regarding the mercaptization reagent 5, the compound of General Formula (1) or the like can be preferably used. Here, it is needless to say that introduction of a mercapto group may be performed using a monomer having a mercapto group.

In Production Examples 7 and 8, the synthesis method according to the RAFT method and the RCMP method has been described, but living radical polymerization methods such as the ATRP method, the TERP method, and the NMP method and general radical polymerization methods may be used as the method of obtaining a diblock structure. In addition, a diblock structure may be obtained by anionic polymerization or cationic polymerization. According to the production method in the method (III), since the degree of freedom in design of the diblock structure significantly increases, there is an advantage that it is easy to design molecules depending on applications and needs.

<Resin Composition>

The resin composition (D) of the present embodiment is a resin composition containing at least a block copolymer (C) and iodine, and can contain other compounds without departing from the spirit of the present invention. The resin composition (D) may contain a solvent or may be solvent-free.

The resin composition (D) is a liquid, paste, film or molded product. The resin composition (D) includes various pastes such as an adhesive, a paint, and a conductive paste, and products before final products or applications such as a protective film, a molding material, a resin modifying agent, and an additive. In addition, the resin composition (D) may be a member itself such as a layer, a film or a molded product.

The block copolymers (C) may be used alone or two or more thereof may be used in combination. For example, a block copolymer (C) having a triblock structure and a block copolymer (C) having a 3-branch star-shaped block structure can be used in combination.

Examples of other optional components contained in the resin composition (D) include resins other than the block copolymer (C), solvents, additives, cross-linking agents, fillers, conductive materials, magnetic materials, and thermally conductive materials.

Regarding resins other than the block copolymer (C), a block copolymer that does not correspond to the present invention, for example, a block copolymer (e) having no mercapto group, a block copolymer (e) having a molecular weight outside the range of 5,000 to 500,000, and other acrylic resins may be exemplified. In addition, resins such as urethane resins, silicone resins, polyamide, polyester, polyester amide, polybutadiene, cellulose, polyurethane polyurea, and adhesive-imparting resins may be exemplified.

The solvent can be used, for example, when the resin composition (D) is formed into a liquid or a paste or for improving the processability. In consideration of the block copolymer (C) and other components, the solvents are used alone or two or more thereof are used in combination. Specific examples thereof include hydrocarbon solvents such as toluene, xylene, hexane, and heptane; ester solvents such as ethyl acetate and butyl acetate; ketone solvents such as acetone and methyl ethyl ketone; halogenated hydrocarbon solvents such as dichloromethane and chloroform; ether solvents such as diethyl ether, methoxytoluene, and dioxane, and organic solvents such as other hydrocarbon solvents.

Preferable examples of coating methods of the resin composition (D) include a gravure coating method, a kiss coating method, a die coating method, a lip coating method, a comma coating method, a blade coating method, a roll coating method, a knife coating method, a spray coating method, a bar coating method, a spin coating method, and a dip coating method. In addition, after coating, drying is performed as necessary. For the drying, a known dryer such as a hot air oven and an infrared heater can be used.

The printing method is not particularly limited, and examples thereof include printing methods such as screen printing, offset printing, inkjet printing, flexographic printing, gravure printing, and coating methods.

Regarding the additives, various additives can be used without limitation according to applications without departing from the spirit of the present invention. For example, a UV inhibitor, an antistatic agent, a tackifier, a silane coupling agent, an antioxidant, a polymerization inhibitor, a pigment, a colorant, a plasticizer, a softener, a processing aid, a defoamer, a filling agent, a viscosity adjusting agent, a dispersant, a leveling adjusting agent, an antireflection agent, a fluorescent agent, a light diffusing agent, a light stabilizer, a refractive index adjusting agent, a matting agent, a filler, and a surfactant may be exemplified. Preferable examples of cross-linking agents include cross-linking agents to be described below. Preferable examples of conductive materials, magnetic materials, and thermally conductive materials include conductive materials, magnetic materials, and thermally conductive materials to be described below.

In order to restrict iodine-derived coloring, the content of iodine with respect to the block copolymer (C) is set to 0.0001 ppm (by mass) or more and 10,000 ppm (by mass) or less. In order to improve the cohesive force, the lower limit is set to 0.0001 ppm (by mass) (hereinafter simply referred to as ppm). The lower limit value of the content of iodine is preferably 0.01 ppm, more preferably 0.1 ppm, still more preferably 1 ppm, and particularly preferably 10 ppm or 100 ppm. In addition, the upper limit of the content of iodine is preferably 5,000 ppm, more preferably 2,000 ppm, and particularly preferably 1,000 ppm or less.

In addition, in viewpoints other than improvement of a cohesive force, when the content of iodine in the resin composition is 0.0001 to 10,000 ppm (by mass), an effect of improving the antibacterial property is obtained. In addition, when used as a binder resin for a conductive resin composition to be described below, an effect of maintaining favorable conductivity can also be expected.

In this specification, for the content of iodine with respect to the block copolymer (C), the content of iodine is determined by a method of detecting a very small amount of iodine using a fluorescent X-ray analyzer. If iodine is not detected by the measurement method, the content of iodine is determined using a device in which the detection limit value is less than 0.0001 ppm (at least 0.0001 ppm of iodine can be detected). In the present invention, if iodine is not detected using a fluorescent X-ray analyzer, it is determined by ICP-MS or ICP-MS/MS measurement device in examples to be described below.

Since the resin composition (D) contains a block copolymer (C) which has excellent stretchability and can effectively reduce the occurrence of cracks during extension, it is preferable for applications in which it is required to conform with a curved surface shape during production and/or during use. In addition, it is preferable for applications in which stretchability is required, for example, stretchable materials, wearable materials, and movable parts in the medical fields and robotics fields (for example, artificial muscles, artificial skin, and various actuators). In addition, it is preferably used for members in which bendability and flexibility are required and applications in which it is required to conform with a curved surface shape. In addition, it is also preferable for applications in which it is required to cover a complex-shaped adherend with a stepped structure.

In addition, since the block copolymer (C) contained in the resin composition (D) has pressure-sensitive adhesiveness to the resin itself, it is also preferable for an adhesive and an adhesive layer. The adhesive may be either a solvent type or a solvent-free type, and may be either a crosslinked type or a non-crosslinked type. When used as a pressure-sensitive adhesive material application, a resin composition (a resin composition (D1) to be described below) containing a block copolymer (C) and a cross-linking agent is preferable.

In addition, the resin composition (D) can be used for various applications by taking advantage of an excellent stretchability property of the block copolymer (C). For example, it is useful as a raw material for optical member adhesives, various plastic sheets, general labels/seals, paints, elastic wall materials, coating film waterproof materials, flooring materials, adhesives, laminated structure adhesives, hot melt adhesives, sealing agents, molding materials, surface modification coating agents, binders (magnetic recording media, ink binders, casting binders, fired brick binders, graft materials, microcapsules, glass fiber sizing, etc.), urethane foams (hard, semi-hard, soft), urethane RIM, UV/EB curable resins, high solid paints, thermoplastic elastomers, thermosetting elastomers, microcellulars, fiber processing agents, plasticizers, sound absorbing materials, damping materials, surfactants, gel coating agents, artificial marble resins, artificial marble impact resistance imparting agents, ink resins, quantum dot resins, films (laminate adhesives, protective films, etc.), laminated glass resins, reactive diluents, various molding materials, elastic fibers, artificial leathers, and synthetic leather, as well as various resin additives and raw materials thereof.

Hereinafter, the resin composition (D1) containing a cross-linking agent, the resin composition (D2) containing a conductive material, the resin composition (D3) containing a magnetic material, and the resin composition (D4) containing a thermally conductive material will be described. Unless otherwise specified, these resin compositions may contain other optional components. Preferable examples include the above resins, solvents and additives. In addition, the resin composition (D1) to the resin composition (D4) may be used in combination. Here, the resin composition (D) is a resin composition including the resin composition (D1) to the resin composition (D4).

[Resin Composition (D1)]

The resin composition (D1) is a resin composition containing at least a block copolymer (C) and a cross-linking agent that can crosslink the block copolymer (C). The crosslinking reaction between the block copolymer (C) and the cross-linking agent can be enhanced by emitting active energy rays such as heat and/or ultraviolet rays. Examples of active energy rays include electron beams, α rays, β rays, and γ rays in addition to ultraviolet rays. In the stage of the resin composition (D1), the cross-linking agent and a part of the block copolymer (C) may be crosslinked in advance.

When a crosslinked structure is constructed while maintaining stretchability using a resin composition (D1) in which a cross-linking agent and a block copolymer (C) are used in combination, it is possible to enhance the cohesive force, improve the pressure-sensitive adhesiveness, and provide a member having better solvent resistance and heat resistance. The application of the resin composition (D1) is not limited, and it is preferable for an adhesive for forming a pressure-sensitive adhesive film or a pressure-sensitive adhesive member, and an adhesive particularly for stretchables because it has excellent pressure-sensitive adhesiveness.

The cross-linking agent has a functional group that can crosslink with a mercapto group of the block copolymer (C). Specific examples of cross-linking agents include isocyanate compounds, epoxy compounds, metal chelate compounds, and polyfunctional acrylate-based monomers.

The isocyanate compound is preferably a compound having two or more isocyanate groups, and examples thereof include isocyanate monomers such as aromatic polyisocyanates, aliphatic polyisocyanates, aromatic aliphatic polyisocyanates, and alicyclic polyisocyanates, biuret components, nurate components and adduct components.

Specific examples of isocyanate compounds include aromatic polyisocyanates such as 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6,-triisocyanatetoluene, 1,3,5-triisocyanatebenzene, dianisidine diisocyanate, 4,4'-diphenyl etherdiisocyanate, and 4,4',4"-triphenylmethane triisocyanate; aliphatic polyisocyanates such as trimethylene diisocyanate, tetramethylene diisocyanate, hexamethylene diisocyanate (also known as HMDI), pentamethylene diisocyanate, 1,2-propylene diisocyanate, 2,3-butylene diisocyanate, 1,3-butylene diisocyanate, dodecamethylene diisocyanate, and 2,4,4-trimethylhexamethylene diisocyanate; aromatic aliphatic polyisocyanates such as ω,ω'-diisocyanate-1,3-dimethylbenzene, ω,ω'-diisocyanate-1,4-dimethyl benzene, ω,ω'-diisocyanate-1,4-diethylbenzene, 1,4-tetramethyl xylylene diisocyanate, and 1,3-tetramethyl xylylene diisocyanate; and alicyclic polyisocyanates such as 3-isocyanate methyl-3,5,5-trimethylcyclohexyl isocyanate (also known as IPDI, isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexylisocyanate), and 1,4-bis(isocyanatemethyl)cyclohexane.

The biuret component is a self-condensate having a biuret bond in which isocyanate monomers are self-condensed. Specific examples thereof include a biuret component of hexamethylene diisocyanate.

The nurate component is a trimer of isocyanate monomers, and examples thereof include a trimer of hexamethylene diisocyanate, a trimer of isophorone diisocyanate, and a trimer of tolylene diisocyanate.

The adduct component is a bi- or higher functional isocyanate compound obtained by reacting an isocyanate monomer with a bi- or higher-functional low-molecular-weight compound containing active hydrogen, and examples thereof include a compound obtained by reacting trimethylolpropane with hexamethylene diisocyanate, a compound obtained by reacting trimethylolpropane with tolylene diisocyanate, a compound obtained by reacting trimethylolpropane with xylylene diisocyanate, a compound obtained by reacting trimethylolpropane with isophorone diisocyanate, and a compound obtained by reacting 1,6-hexanediol with hexamethylene diisocyanate.

The epoxy compound is preferably a compound having two or more epoxy groups. Examples thereof include compounds having a glycidyl group, bisphenol type epoxy resins, and novolac type epoxy resins.

Specific examples thereof include bisphenol type epoxy resins such as bisphenol A type epoxy resins, bisphenol F type epoxy resins, and bisphenol A/bisphenol F copolymerized type epoxy resins; novolac type epoxy resins such as cresol novolac type epoxy resins and phenolnovolac type epoxy resins; and compounds having a glycidyl group such as ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, diglycidyl aniline, N,N,N',N'-tetraglycidyl-m-xylylenediamine, 1,3-bis(N,N'-diglycidylaminomethyl)cyclohexane, N,N,N',N'-tetraglycidylaminophenylmethane, triglycidylaminophenol, biphenyl diglycidyl ether, triglycidyl isocyanurate, polyglycidyl(meth)acrylate, glycidyl(meth)acrylate, and copolymers such as a vinyl monomer copolymerizable therewith.

Examples of metal chelate compounds include coordination compounds of polyvalent metals such as aluminum, iron, copper, zinc, tin, titanium, nickel, antimony, magnesium, vanadium, chrome and zirconium, and acetylacetone or ethyl acetoacetate. Specific examples thereof include aluminum ethyl acetoacetate/diisopropylate, aluminum trisacetylacetonate, aluminum bisethylacetate/monoacetylacetonate, and aluminum alkyl acetoacetate/diisopropylate.

Regarding the polyfunctional acrylate-based monomer, examples of polyfunctional acrylate-based monomers include, for example, bifunctional monomers such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol di(meth)acrylate hydroxypivalate, dicyclopentanyldi(meth)acrylate, caprolactone-modified dicyclopentenyldi(meth)acrylate, ethylene oxide modified phosphate di(meth)acrylate, di(acryloxyethyl)isocyanurate, allylated cyclohexyl di(meth)acrylate, ethoxylated bisphenol A diacrylate, and 9,9-bis [4-(2-acryloyloxyethoxy)phenyl]fluorene, trifunctional monomers such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris (acryloxyethyl)isocyanurate, and ε-caprolactone-modified tris-(2-(meth)acryloxyethyl)isocyanurate; tetrafunctional monomers such as diglycerin tetra(meth)acrylate and pentaerythritol tetra(meth)acrylate; pentafunctional monomers such as propionic acid-modified dipentaerythritol penta(meth)acrylate; and hexafunctional monomers such as dipentaerythritol hexa(meth)acrylate and caprolactone-modified dipentaerythritolhexa(meth)acrylate.

The polyfunctional acrylate-based monomer compound and the mercapto group of the block copolymer (C) can be crosslinked through an enthiol reaction.

Among the cross-linking agents, an isocyanate compound is more preferable in consideration of storage stability and curability.

The molar ratio (SH group/functional group) of the mercapto group and the functional group that can react with the mercapto group in the cross-linking agent is preferably 0.01 to 10.0 and more preferably 0.5 to 2.0 in consideration of microphase-separated structure enhancement.

The content of the cross-linking agent may be, for example, 0.01 to 50.0 parts by mass with respect to 100 parts by mass of the block copolymer (C), and is more preferably 0.1 to 10.0 parts by mass, and still more preferably 0.5 to 1.5 parts by mass with respect to 100 parts by mass of the block copolymer (C).

In order to more effectively exhibit the stretchability and pressure-sensitive adhesiveness of the block copolymer (C), it is more preferable that the cross-linking agent have a high affinity with the polymer block (A) or the polymer block (B) in which the mercapto group may be present. For example, it is possible to select the affinity (compatibility) with reference to the solubility parameter value.

In order to enhance the crosslinking reaction, a crosslinking accelerator may be added. Examples of crosslinking accelerators include organic tin catalysts, inorganic metal catalysts, inorganic tin compounds, acid catalysts, organic base catalysts, and acid anhydride catalysts.

The resin composition (D1) is a composition composed of only a block copolymer (C) and a cross-linking agent, and may be used as, for example, a hot melt adhesive. In addition, a composition obtained by adding a solvent to the resin composition (D1) may be used as, for example, an adhesive having an adjusted viscosity. In addition, a composition containing other components may be used. Preferable examples of resins other than the block copolymer (C), and preferable examples of solvents and additives include exemplary compounds in the description of the resin composition (D).

The content of the block copolymer (C) with respect to the total solid content of the resin composition (D1) is preferably in a range of 10.0 to 99.99 mass %, more preferably in a range of 50.0 to 99.99 mass %, and still more preferably in a range of 90.0 to 99.99 mass %.

[Resin Composition (D2)]

The resin composition (D2) is a resin composition containing at least a block copolymer (C) and a conductive material (E). In one aspect, the resin composition (D2) may have conductivity by itself, and in another aspect, it may have not conductivity. For example, there is an aspect in which the composition is non-conductive at the stage of a liquid or paste, but it exhibits conductivity at the stage of a film or a molded product.

When the resin composition (D2) in which a conductive material (E) and a block copolymer (C) are used in combination is used, it is possible to provide a member having excellent stretchability and excellent conductivity. The application of the resin composition (D2) is not limited, and it is preferable for a stretch conductor such as a wiring and an electrode, an electromagnetic wave shielding film, and a thermally conductive film because it can impart conductivity.

As the conductive material (E), at least one conductive material selected from the group consisting of conductive fine particles and conductive nanowires is used. Examples of types of conductive materials include metals (including alloys), carbon, doped semiconductor materials, conductive polymers, and conductive ceramics. Specific examples include metals such as silver, gold, platinum, copper, palladium, cobalt, nickel, aluminum, zinc, lead, and tin, alloys such as brass, bronze, cupronickel, and solder, two or more hybrid materials such as silver-coated copper powder, materials obtained by plating metals or the like (gold plating, etc.), carbon particles, carbon nanotubes (CNT), carbon black, and conductive ceramic fillers such as ITO and IZO. Examples of conductive polymers include polyacetylene, polythiophene, and polyaniline.

In order to more effectively reduce the occurrence of cracks during extension, the conductive material (E) is preferably a material containing copper or silver. When a material containing copper or silver is used, bonding with a mercapto group of the block copolymer (C) is more effectively enhanced. In consideration of bonding with a mercapto group and conductivity, a silver-containing material such as silver or silver-coated copper is particularly preferable. The conductive materials (E) are used alone or two or more thereof are used in combination.

The conductive fine particles are particulate fillers. In addition to the above materials, metal-plated polymer particles, metal-plated glass particles, and metal-coated ceramic particles may be used. For the shape of conductive fine particles, spherical, chain/spherical, flake, dendrite, and coil (including a helix shape and a spiral shape) particles may be exemplified. The dendrite shape is a shape in which a bifurcated branch extends in a two-dimensional or three-dimensional direction from a rod-shaped main branch. For the shape of the conductive fine particles, flake and/or chain/spherical particles are preferable in consideration of ease of contact between conductive fillers. In addition, coil particles are preferable because an increase in the resistance value when extended is minimized.

The average particle size D50 of the conductive fine particles may be, for example, about 0.5 to 50 μm. The average particle size D50 is preferably 1 to 12 μm in consideration of ease of contact between conductive fillers, and preferably 1 to 6 μm in consideration of reducing the film thickness.

The conductive nanowire is a conductive structure having a diameter of nanometer sizes and having a linear shape. Examples of materials include metals, semiconductors, conductive polymers, and CNTs exemplified for the above conductive fine particles. The conductive nanowire can form a favorable electrical conduction path by forming gaps between conductive nanowires to form a mesh. In addition, when the conductive nanowire is formed in a mesh shape, it is possible to form openings in mesh gaps so that it is possible to form a conductive layer having high light transmittance.

The ratio (aspect ratio: L/d) of the diameter (thickness) d and the length L of the conductive nanowire is preferably 10 to 100,000, more preferably 50 to 100,000, and particularly preferably 100 to 10,000. When conductive nanowires having a large aspect ratio are used, it is possible to construct a network of conductive nanowires in a mesh shape, and it is possible to exhibit high conductivity with a small amount of conductive nanowires. In addition, it is possible to effectively reduce the occurrence of cracks while improving the stretchability and extensibility. Here, the diameter is the major axis when the cross section of the conductive nanowire is elliptical, and the longest diagonal line when the cross section thereof is polygonal. The diameter and the length of the conductive nanowire can be measured using a scanning electron microscope or a transmission electron microscope.

The diameter of the conductive nanowire is preferably less than 500 nm, more preferably less than 200 nm, and still more preferably 10 to 100 nm. The length of the conductive nanowire is preferably 2.5 μm to 1,000 μm, more preferably 10 μm to 500 μm, and particularly preferably 20 μm to 100 μm. Thereby, it is possible to increase the conductivity of the transparent conductive layer.

In order to further improve the dispersity and conductive stability, in the conductive material (E), a functional group such as a mercapto group, an amino group or a nitrile group may be introduced into the surface of the conductive material to perform a surface treatment.

In order to more effectively exhibit the stretchability and conductivity of the block copolymer (C), the conductive material (E) is preferably silver, and examples of more preferable shapes include known flake (phosphorus piece), spherical, and aggregate (shape in which spherical primary particles are three-dimensionally aggregated) shapes.

Examples of commercially available silver products used for the conductive material (E) include Silcoat AgC-G (aggregate), AgC-A (flake), and Ag-XF301S (flake) (commercially available from Fukuda Metal Foil & Powder Co., Ltd.).

The content of the block copolymer (C) with respect to the total mass of the resin composition (D2) is preferably in a range of 0.01 to 99 mass %, more preferably in a range of 1 to 95 mass %, and still more preferably in a range of 5 to 80 mass %.

The content of the conductive material (E) with respect to the total mass of the conductive resin composition (D2) is preferably in a range of 1 to 99.99 mass %, more preferably in a range of 5 to 99 mass %, and still more preferably in a range of 20 to 95 mass %.

When the resin composition (D2) is made into a film and used in close contact with an adherend, it may contain a compound for improving adhesion, adhesiveness or pressure-sensitive adhesiveness. Examples thereof include silane coupling agents, silyl compounds, phosphoric acid, and bisphenol S type epoxy resins.

The resin composition (D2) may further contain a cross-linking agent. When a cross-linking agent is contained, it is possible to enhance the cohesive force, improve the pressure-sensitive adhesiveness, and further improve the solvent resistance and heat resistance. Therefore, the resin composition (D2) is also preferable for a conductive pressure-sensitive adhesive. Regarding the cross-linking agent, a cross-linking agent that can react with a mercapto group introduced into a side chain, a side group or a terminal of the block copolymer (C) or other introduced functional groups can be preferably used. Regarding the cross-linking agent that reacts with a mercapto group of the block copolymer (C), cross-linking agents exemplified in the resin composition (D1) may be exemplified.

The resin composition (D2) may further contain a sulfur compound in addition to sulfur atoms of the mercapto group of the block copolymer (C). When a small amount of a sulfur component is contained, an effect of improving adhesion with respect to a stretchable base material and flexibility can be expected. Regarding the sulfur compound, known and commonly used substances can be used, and examples thereof include thioglycolic acid.

When a cross-linking agent is contained, the content of the cross-linking agent used with respect to 100 parts by mass of the block copolymer (C) of the conductive resin composition (D2) is preferably 0.01 to 30 mass %, more preferably 0.1 to 10 mass %, and still more preferably 0.5 to 2 mass %.

The viscosity of the resin composition (D2) can be adjusted by adding a solvent. In addition, the resin composition (D2) can be used as a conductive paste or a conductive film. In addition, additives can be added according to applications without departing from the spirit of the present invention. Preferable examples of solvents and other additives may include the compounds in the description of the resin composition (D). Stretch conductors to be described below and the like can be formed using the resin composition (D2).

For the resin composition (D2), a conductive resin film can be formed on, for example, a releasable sheet, by application, printing or the like. Here, in this specification, the term "film" may refer to a sheet, a tape or the like.

The thickness of the conductive resin film is not particularly limited, and can be appropriately designed according to applications. In the case of stretchable conductive material applications, the thickness can be, for example, about 1 to 300 μm. When a cross-linking agent is added to the resin composition (D2), a crosslinking treatment can be performed as necessary. Through these processes, a conductive film is obtained. In addition, it is also possible to obtain a molded product having a desired shape.

The resin composition (D2) is particularly preferably used for films, molded products and the like in which stretchability is required during production or after production, and conductivity is required in the obtained products. It is particularly preferable for stretchable materials having conductivity. In particular, since the block copolymer (C) has a mercapto group, it is possible to effectively reduce the occurrence of cracks even if it contains a conductive filler such as a metal filler. In addition, when a cross-linking agent is added, it is possible to obtain films or structures having both the stretchability and strength.

In the technical fields such as healthcare devices, wearable devices, and robotics, instruments are required to operate even in a harsh environment such as a high temperature and high humidity environment, but in a high temperature and high humidity environment, for example, there is a problem of the conductivity being lowered and properties being easily changed.

The resin composition (D2) of the present embodiment exhibits excellent conductivity even after being left in a high temperature and high humidity environment (for example, 85° C., a relative humidity of 85%×10 days). Therefore, for example, the composition is preferable for a conductive paste or a conductive film. In addition, according to the resin composition (D2) of the present embodiment, the stretchability is excellent and it is possible to effectively reduce the occurrence of cracks during extension. Therefore, the composition is preferable for, for example, a conductive film or a molded product.

[Resin Composition (D3)]

The resin composition (D3) is a resin composition containing at least a block copolymer (C) and a magnetic material. In one aspect, the resin composition (D3) may have magnetism by itself, and in another aspect, it may have no magnetism. For example, there is an aspect in which the composition is non-magnetic at the stage of a liquid or paste, but it exhibits magnetism at the stage of a film or a molded product.

When the resin composition (D3) in which a magnetic material and a block copolymer (C) are used in combination is used, it is possible to provide a member having excellent stretchability and magnetic properties. The application of the resin composition (D3) is not limited, and it is preferable for an electromagnetic wave blocking film or an electromagnetic wave shielding film because it can impart magnetism. The resin composition (D3) may further contain a cross-linking agent. When a cross-linking agent is contained, it is possible to enhance the cohesive force, improve the pressure-sensitive adhesiveness, and further improve the solvent resistance and heat resistance.

Regarding the magnetic material, at least one magnetic material selected from the group consisting of magnetic fine particles and magnetic nanowires is used. The type of magnetic materials includes at least one metal of iron, cobalt, and nickel. A FeCo alloy, a FeNi alloy, a CoNi alloy, or a FeCoNi alloy may be used. In addition, a FeSi alloy or FeSiCr alloy containing other elements in the above metal or alloy may be used. In addition, as optional additive elements or inevitable impurities, for example, Cr, Mo, Mn, Cu, Sn, Zn, Al, P, B, V and the like may be contained.

The magnetic fine particles are particulate fillers. In addition to the above materials, metal-plated polymer particles, metal-plated glass particles, and metal-coated ceramic particles may be used. For shapes of magnetic fine particles, particles exemplified in the shapes of the conductive fine particles of the resin composition (D2) may be exemplified. A preferable range of the average particle size D50 of the magnetic fine particles is the same as that of the conductive fine particles.

The magnetic nanowire is a magnetic structure having a diameter of nanometer sizes and having a linear shape. The magnetic nanowire can exhibit favorable magnetic properties by forming gaps between magnetic nanowires to form a mesh. In addition, when the magnetic nanowire is formed in a mesh shape, it is possible to form openings in mesh gaps so that it is possible to form a conductive layer having high light transmittance.

A preferable range of the ratio (aspect ratio: L/d) of the diameter (thickness) d and the length L of the magnetic nanowire and the diameter are the same as those of the conductive nanowire.

Preferable examples of the content of the block copolymer (C) and the content of the magnetic material with respect to the total mass of the resin composition (D3) are ranges in which the conductive material of the resin composition (D2) is read as a magnetic material. In addition, when the resin composition (D3) is made into a film and used in close contact with an adherend, examples of compounds for improving adhesion, adhesiveness or pressure-sensitive adhesiveness are the same as those of the resin composition (D2).

Similar to the resin composition (D2), a cross-linking agent can be additionally added to the resin composition (D3). When a cross-linking agent is added, it is possible to more effectively achieve both the strength and stretchability. Parts into which the cross-linking agent is introduced, preferable examples, and preferable contents are the same as those of the resin composition (D2).

The resin composition (D3) can form a magnetic resin film by the method exemplified in the resin composition (D2). Regarding specific examples of coating methods, the same methods as in the resin composition (D2) may be exemplified.

The thickness of the magnetic resin film is not particularly limited, and can be appropriately designed according to applications. In the case of stretchable magnetic material applications, the thickness can be, for example, about 1 to 300 μm. When a cross-linking agent is added to the resin composition (D3), a crosslinking treatment can be performed as necessary. Through these processes, a magnetic film is obtained. In addition, it is also possible to obtain a molded product having a desired shape.

The resin composition (D3) is particularly preferably used for films, molded products and the like in which stretchability is required during production or after production and magnetism is required in the obtained products. It is particularly preferable for stretchable materials having magnetism. In particular, since the block copolymer (C) has a mercapto group, it is possible to effectively reduce the occurrence of cracks even if it contains a magnetic filler such as a metal filler. In addition, when a cross-linking agent is added, it is possible to obtain films or structures having both the stretchability and strength.

[Resin Composition (D4)]

The resin composition (D4) is a resin composition containing at least a block copolymer (C) and a thermally conductive material. In one aspect, the resin composition (D4) may have thermal conductivity by itself, and in another aspect, it may have no thermal conductivity. For example, there is an aspect in which the composition has no thermal conductivity at the stage of a liquid or paste, but it exhibits thermal conductivity at the stage of a film or a molded product.

When the resin composition (D4) in which a thermally conductive material and a block copolymer (C) are used in combination is used, it is possible to provide a member having excellent stretchability and thermal conductivity. The application of the resin composition (D4) is not limited, and it is preferable for a heat dissipation film or a heat dissipation member because it can impart thermal conductivity. The resin composition (D4) may further contain a cross-linking agent. When a cross-linking agent is contained, it is possible to enhance the cohesive force, improve the pressure-sensitive adhesiveness, and further improve the solvent resistance and heat resistance.

Regarding the thermal conductivity, the thermal conductivity of the thermally conductive material is preferably 10 W/m·K or more, more preferably 15 W/m·K or more, and still more preferably 20 W/m·K or more. As the thermally conductive filler, a thermally conductive inorganic filler and a thermally conductive organic inorganic hybrid filler can be used.

Specific examples of thermally conductive inorganic fillers include metal oxides and metal nitrides such as alumina, aluminum hydroxide, magnesium hydroxide, calcium carbonate, magnesium carbonate, calcium silicate, calcium oxide, magnesium oxide, zinc oxide, beryllium, aluminum oxide, aluminum nitride, and boron nitride; hydrated metal compounds; silicas such as fused silica, crystalline silica, and amorphous silica; and nitriding and carbon fillers such as silicon carbide, silicon nitride, titanium carbide, diamond, graphite, graphene, and carbon nanotubes. Among these, alumina, aluminum oxide, aluminum nitride, and boron nitride are more preferable, and alumina and boron nitride are particularly preferable in consideration of the heat resistance, thermal conductivity, and low dielectric constant. It is preferable to use alumina and boron nitride in combination. The thermally conductive fillers are used alone or a plurality thereof are used in combination.

Specific examples of thermally conductive organic inorganic hybrid fillers include fillers in which the surface of the above inorganic filler is coated with a resin or a dispersant. As a method of coating the surface of the thermally conductive inorganic filler with a resin or a dispersant, known methods can be applied. In this case, it is preferable to expose an inorganic filler in order to effectively exhibit the heat conduction property of the thermally conductive inorganic filler. The surface of the thermally conductive inorganic filler can be treated with, for example, a silane-based, titanate-based or aluminate-based coupling agent. According to the surface treatment, it is possible to increase the dispersity of the thermally conductive filler with respect to the block copolymer (C). In addition, it is possible to increase the interfacial adhesive strength between the block copolymer (C) and the thermally conductive filler.

Examples of silane coupling agents include aminosilanes such as γ-aminopropyltriethoxysilane, N-β(aminoethyl) γ-aminopropyltrimethoxysilane, N-β(aminoethyl) γ-aminopropylmethyldimethoxysilane, γ-aminopropyltrimethoxysilane, and γ-ureidopropyltriethoxysilane; epoxysilanes such as γ-glycidoxypropyltrimethoxysilane, γ-glycidoxypropyltriethoxysilane, and β-(3,4-epoxycyclohexyl)ethyltrimethoxysilane; mercaptosilanes such as 3-mercaptopropyltrimethoxysilane; and vinylsilanes such as p-styryltrimethoxysilane, vinyl trichlorosilane, vinyl tris(β-methoxyethoxy)silane, vinyltrimethoxysilane, vinyltriethoxysilane, and γ-methacryloxypropyltrimethoxysilane.

Examples of titanate coupling agents include isopropyltriisostearoyl titanate, isopropyltri(N-aminoethyl/aminoethyl)titanate, tetra(2,2-diallyloxymethyl-1-butyl)bis(ditridecyl)phosphite titanate, bis(dioctylpyrophosphate) oxyacetate titanate, bis(dioctylpyrophosphate)ethylene titanate, diisopropylbis(dioctylphosphate)titanate, tetraisopropylbis(dioctylphosphite)titanate, and tetraoctylbis(ditridecylphosphite)titanate.

In addition, an aspect in which the surface of the thermally conductive inorganic filler is coated with a fluorine resin is also preferable. In order to maintain favorable thermal conductivity, it is preferable that thermally conductive inorganic fillers be exposed at the part in which thermally conductive inorganic fillers come into contact with each other.

The thermally conductive particles are particulate fillers. The preferable range of the average particle size D50 of the thermally conductive particles is the same as that of the conductive fine particles exemplified in the resin composition (D2). In addition, preferable examples of compounds for improving adhesion, adhesiveness or pressure-sensitive adhesiveness include compounds exemplified in the resin composition (D2).

A cross-linking agent can be additionally added to the resin composition (D4). When a cross-linking agent is added, it is possible to more effectively achieve both the strength and stretchability. The position at which the cross-linking agent is introduced, preferable specific examples, and preferable contents are the same as those of the resin composition (D2).

The resin composition (D4) can form a thermally conductive resin film by the method exemplified in the resin composition (D2). Regarding specific examples of coating methods, the same methods as in the resin composition (D4) may be exemplified.

The thickness of the thermally conductive resin film is not particularly limited, and can be appropriately designed according to applications. In addition, a molded product having a desired shape may be used. When a cross-linking agent is added to the resin composition (D4), a crosslinking treatment can be performed as necessary. Through these processes, it is possible to obtain a film or molded product having thermal conductivity.

The resin composition (D4) is particularly preferably used for films, molded products and the like in which stretchability is required during production or after production, and thermal conductivity is required in the obtained products. In particular, since the block copolymer (C) contains a mercapto group, it is possible to effectively reduce the occurrence of cracks even if it contains a filler. In addition, when a cross-linking agent is added, it is possible to obtain films or structures having both the stretchability and strength.

<Pressure-Sensitive Adhesive Film>

The pressure-sensitive adhesive film of the present embodiment is a pressure-sensitive adhesive film (F) containing at least an adhesive layer formed of the resin composition (D) according to the present embodiment. According to the pressure-sensitive adhesive film (F), since a block copolymer (C) having a mercapto group is contained, it is possible to provide a pressure-sensitive adhesive film (F) having excellent pressure-sensitive adhesiveness and stretchability.

As the resin composition (D), a resin composition having an iodine content in a range of 0.0001 to 10,000 ppm can be used. In addition, as the resin composition (D), a resin composition (D1) containing a cross-linking agent that can crosslink with a block copolymer can be used. In addition, as the resin composition (D), a resin composition (D2) containing at least one conductive material selected from the group consisting of conductive fine particles and conductive nanowires may be used. In addition, the resin composition (D3) and the resin composition (D4) may be used. In addition, in the block copolymer (C), the above components can be preferably used in any combination.

When the resin composition (D) contains a cross-linking agent, the adhesive layer is a layer having a crosslinked structure formed by the block copolymer (C) and the cross-linking agent. When the crosslink structure is provided, it is possible to enhance the cohesive force of the block copolymer (C), increase the pressure-sensitive adhesive force, and improve the heat resistance and solvent resistance.

The pressure-sensitive adhesive film (F) may be composed of a laminate in which a base material and an adhesive layer are laminated. In addition, it may be a laminate of any one or more layers such as an antistatic layer and a protective layer. The adhesive layer may be a single-layer or a laminate of two or more layers.

Examples of base materials include thermoplastic elastomers, plastics, fibers, non-woven fabrics, silicone rubber, fluororubber, nitrile rubber, acrylic rubber, styrene rubber, styrene/butadiene rubber, chloropyrene rubber, urethane rubber, butyl rubber, ethylene rubber, propylene rubber, ethylene propylene rubber, epoxy rubber, butadiene rubber, and natural rubber. For the base material, any member such as a plate-shaped or film-shaped member can be selected. The shape of the base material may be a curved surface shape or a complex shape as well as a planar shape. As the base material, a single material or a laminate of two or more types can be used. The base material is preferably a material having excellent stretchability.

The thickness of the base material is not particularly limited, and may be, for example, 1 to 500 µm. In addition, the thickness may be 10 to 100 µm or 20 to 50 µm. When the thickness of the base film is within the above range, the film has excellent winding property and processability. On the other hand, if the base film is thin, the strength tends to be insufficient. In addition, if the base film is too thick, flexibility is poor, and the base film may not conform with the shape of the adherend.

Examples of thermoplastic elastomers include polyurethane, polyester, polyolefin, polyamide, polyimide, polyester, vinyl chloride, styrene block polymers and acrylic block polymers.

Examples of plastics includes polyolefins such as polyvinyl alcohol, triacetyl cellulose, polypropylene, polyethylene, polycycloolefin, and ethylene-vinyl acetate copolymers; polyesters such as polyethylene terephthalate, polybutylene terephthalate, and polyethylene naphthalate; and polycarbonate, polynorbornene, polyarylate, polyacrylic, polyphenylene sulfide, polystyrene, epoxy resin, polyamide, and polyimide.

The method of forming an adhesive layer is not particularly limited, and the resin composition (D) whose viscosity is adjusted with a solvent can be applied to, for example, a base material or a release sheet using, for example, a Mayer bar, an applicator, a brush, a spray, a roller, a gravure coater, a die coater, a lip coater, a comma coater, a knife coater, a reverse coater, or a spin coater. When the base material is coated, the base material may be subjected to an antistatic treatment, a plasma treatment, an adhesion-imparting primer treatment, a corona treatment or the like. It is preferable to perform a drying process during coating. The drying device is not particularly limited, and examples thereof include a hot air dryer, an infrared heater, and a decompression method. The drying temperature is generally about 60 to 160° C. The film thickness of the adhesive layer in the pressure-sensitive adhesive film (F) of the present embodiment after drying is preferably 5 to 30 µm.

The crosslinking reaction of the adhesive layer may be performed by performing heating during the drying process, or separately, an aging treatment or thermocompression bonding may be performed. In addition, crosslinking may be performed by emitting active rays.

In one aspect, the adhesive layer is formed on one surface of the base material or it can be formed on both surfaces. It is preferable to laminate a releasable sheet on the adhesive layer immediately before attachment to the adherend. As the releasable sheet, for example, a known release paper or release film obtained by coating paper such as woodfree paper or a plastic film with a release agent can be used.

The adherend is not particularly limited, and examples thereof include human bodies, SUS (stainless steel), glass, and plastic films. Examples of plastic films include polymethylmethacrylate (PMMA) and polycarbonate. In addition, olefins such as polypropylene and polyethylene are also preferable.

The pressure-sensitive adhesive film (F) is preferable as a stretchable or wearable pressure-sensitive adhesive in which conformability to a movable part or a curved part of a human body or robot is required. Examples of applications of the pressure-sensitive adhesive film (F) include pressure-sensitive adhesive optical films and general labels/seals.

When the pressure-sensitive adhesive film is used for an electronic device application, it is preferable to add an antistatic agent. Examples of antistatic agents include PR-IL1 general-purpose antistatic agent (ionic liquid) (commercially available from Kaken Sangyo Corporation).

Since the pressure-sensitive adhesive film (F) has an adhesive layer formed of the resin composition (D) containing the block copolymer (C), it has excellent stretchability during production and/or in the product. When the resin composition (D1) to which a cross-linking agent is additionally added is used as the resin composition (D), it is possible to improve the solvent resistance and heat resistance of the pressure-sensitive adhesive film (F), and further improve the pressure-sensitive adhesiveness. Since the pressure-sensitive adhesive film (F) has stretchability, can reduce the occurrence of cracks during extension, and also has excellent adhesion to the adherend, it is particularly preferable as a pressure-sensitive adhesive film (F) for an adherend having a curved surface shape and a movable part.

Here, an example in which the resin composition (D) is used for the adhesive layer of the pressure-sensitive adhesive film (F) has been described above, but the block copolymer (C) itself can be used for the adhesive layer.

<Stretch Conductor (G)>

The stretch conductor (G) of the present embodiment is formed of the resin composition (D2). The stretch conductor (G) is an electrically conducting material, and when the resin composition (D2) containing a block copolymer (C) is used, both stretchability and conductivity are provided during production and/or in the product. The stretch conductor (G) itself may be a product or the stretch conductor (G) may be used as a member. The stretch conductor (G) is preferable as, for example, a stretchable wiring or a stretchable electrode. In addition, the stretch conductor (G) can be used as a film such as a stretchable electromagnetic wave shield layer or a stretchable heat dissipation layer. In addition, it can be used as a molded product having a desired shape and conductivity.

The stretch conductor (G) may be laminated on a support and used as a laminate. The support is not particularly limited, and examples thereof include thermoplastic elastomers, plastics, fibers, non-woven fabrics, silicone rubber, fluororubber, nitrile rubber, acrylic rubber, styrene rubber, styrene/butadiene rubber, chloropyrene rubber, urethane rubber, butyl rubber, ethylene rubber, propylene rubber, ethylene propylene rubber, epoxy rubber, butadiene rubber, and natural rubber. Stretchable fibers are preferable as fibers. The stretchable fiber may be textile fabric. In addition, a recess may be provided in the support, and the recess may be embedded with a stretch conductor. The support is preferably made of a stretchable material in order to take advantage of the stretchability of the stretch conductor (G).

Regarding the thermoplastic elastomers, the thermoplastic elastomers exemplified in the above <Pressure-sensitive adhesive film> can be preferably used. Similarly, regarding the plastics, the plastics exemplified in the above <Pressure-sensitive adhesive film> can be preferably used.

The stretch conductor (G) and the support may be bonded using the pressure-sensitive adhesiveness of the stretch conductor (G), or bonded by laminating. In addition, they can be bonded with an adhesive layer or an easy-adhesive layer therebetween.

When the resin composition (D2) in which a block copolymer (C) is filled with a conductive material is used for the stretch conductor (G), excellent conductivity is exhibited even when stretching is performed.

<Electronic Device (H)>

The electronic device (H) of the present embodiment has a stretch conductor (G). When the stretch conductor (G) is used, it is possible to impart the bendability, flexibility, and stretchability to the conduction part. Therefore, the stretch conductor (G) is preferably used for any electronic device that requires bendability, flexibility and/or stretchability in the conduction part. For example, it is preferable for sensors attached to a body or robot, wearable sensors installed in clothes, and a biometric information acquisition device.

In addition, in the field of electronics, it is preferable for use in flexible displays, flexible wiring boards, flexible transducers, and bendable mobile devices. In addition, it can also be applied to motors and actuator driven by electromagnetics, speakers using a piezoelectric effect, vibrators, ultrasonic wave generating devices and the like.

The stretch conductor (G) in the electronic device (H) can be used without limitation for members in which conductivity is required. The stretch conductor (G) is used for, for example, wirings, electrodes, conductive adhesives, vias, electromagnetic wave shielding films, thermally conductive films.

When an electrode is composed of a metal layer, its conductivity is excellent, but its use is limited because it has no stretchability. On the other hand, when the stretch conductor (G) is used as the conductor, the stretchability can be significantly improved. In addition, it has an advantage of being flexible and being easily fitted to a human body.

Here, in the electronic device (H), in an adhesive layer, a protective layer and the like in which stretchability, bendability and/or flexibility is required, the resin composition (D) such as the resin composition (D1) containing no conductive material can be preferably used.

[Actuator (J)]

The actuator (J) of the present embodiment is an aspect of the electronic device (H) and has a stretch conductor (G). The actuator (J) is a mechanical element constituting a mechanical/electric circuit that converts input energy into a physical motion. The stretch conductor (G) is used for an electrode layer or wiring of the actuator (J). Since the actuator (J) can perform conversion into a physical motion according to application of a voltage, it is preferable for assisting with operations or functions by being attached to a human body or robot. In addition, it is also preferable as a tactile feedback actuator that can reproduce a tactile sensation according to a user input such as a touch panels or a braille block device, and artificial muscles. In addition, it can also be used for precise control of sound and flow rates of buzzers, pumps, and valves, micro positioning devices for semiconductor production, power generation systems and the like.

As an example of the actuator (J), a structure in which a stretchable resin layer is interposed between a pair of stretchable electrodes composed of a stretch conductor (G) may be exemplified. When a voltage is applied to the pair of stretchable electrodes, the stretchable resin layer interposed between the pair of stretchable electrodes can be deformed due to the Coulomb force. An electrostrain stretchable polymer is preferable for the stretchable resin layer, and polyurethane, acrylic resins, and silicone rubber may be exemplified. When the stretch conductor (G) is used as the stretchable electrode, the conductivity can be maintained even if it is stretched, and repeated shrinkage is also excellent so that it is preferable for artificial muscles and the like.

EXAMPLES

Hereinafter, the present invention will be described in detail with reference to examples, but the present invention is not limited thereto. Here, in the examples, "parts" refers to "parts by mass," and "%" refers to "mass %." In addition, this value is a non-volatile component conversion value excluding the solvent.

[Measurement of Weight Average Molecular Weight (Mw), Number Average Molecular Weight (Mn) and Mw/Mn]

Using GPC (product name: GPCV-2000, commercially available from Nihon Waters K.K., column: TSKgel, α-3000, mobile phase: 10 mM triethylamine/dimethylformamide solution), a calibration curve was created using a polystyrene (molecular weight of 427,000, 190,000, 96,400, 37,400, 10,200, 2,630, 440,92) as a standard substance, and the weight average molecular weight (Mw) and the number average molecular weight (Mn) were measured. The degree of polydispersity (PDI=Mw/Mn) was calculated from the measured values.

[Measurement of Glass Transition Temperature]

The glass transition temperature was measured according to a plastic transition temperature measurement method in JIS K 7121(2012), and the glass transition temperature was determined at the temperature determined from the extrapolation glass transition start temperature (Tig) described in JIS 9.3. For the measurement, a differential scanning calorimeter (DSC Q2000 commercially available from TA Instruments) was used.

According to the above method, Tg of <polymer block (A)>$_{Total}$, Tg of the polymer block (B) in the case of the triblock structure, and Tg of [polymer block (B)]$_q$X in the case of the star-shaped block structure were obtained.

[Measurement of Mercapto Group Concentration]

About 1 g of a dried and solidified resin was accurately weighed out in advance, a mixture solution containing 100 ml of a 1.2 wt %-potassium iodide aqueous solution in which the resin was dissolved, 400 ml of toluene, and 600 ml of pyridine was titrated with a toluene solution containing 0.05 N iodine. The mercapto group concentration was determined by the following computation formula using the time at which the solution turned yellow as an end point.

Mercapto group concentration (mmol/g)=0.05×(titration amount)×(factor of toluene solution of iodine)/sample weight (g)

In addition, when the mercapto group concentration of the block copolymer (C) containing iodine was measured, titration was performed using the block copolymer (C) that has been purified again so that the amount of iodine contained was 0 ppm, and the amount of mercaptan was calculated.

[Measurement of Content of Iodine]

The resin compositions obtained in the examples and the comparative examples were dissolved in methyl ethyl ketone to prepare solutions having a resin composition concentration of 2.5 mass %. The obtained solutions were measured using a fluorescent X-ray analyzer (product number: PW2404 commercially available from Philips), and the content of iodine (ppm (by mass)) with respect to the mass of the block copolymer (C) obtained in the examples and the comparative examples was obtained.

In addition, the sample in which iodine was not detected by the fluorescent X-ray analyzer was measured using an inductively coupled plasma mass spectrometry (ICP-MS) device (Agilent 7900 commercially available from Agilent Technologies), and the content of iodine (ppm (by mass)) with respect to the mass of the block copolymer (C) was obtained.

In addition, also, the sample in which iodine was not detected by the ICP-MS device was measured using the ICP-MS/MS device (Agilent 8900 ICP-QQQ used in MS/MS mode, commercially available from Agilent Technologies), and the content of iodine (ppm) with respect to the mass of the block copolymer (C) was obtained. For measurement conditions for ICP-MS and ICP-MS/MS, about 0.25 g of the block copolymer (C) was accurately weighed, and treated by an acid decomposition method using a microwave wet decomposition device, and then subjected to ICP measurement with a constant solution of 50 mL in distilled water.

The abbreviations for the raw materials of the block copolymers are as follows.

(Monomers)
MMA: methyl methacrylate (commercially available from Sumitomo Chemical Co., Ltd.)
BMA: butyl methacrylate (commercially available from Mitsubishi Chemical Corporation)
SHMA: 2-mercaptoethyl methacrylate (Synthesis 5)
AMA: allyl methacrylate (commercially available from Tokyo Chemical Industry Co., Ltd.)
AMA modified component: modified component obtained by converting allyl methacrylate to 1,2-ethanedithiol
HEMA: 2-hydroxyethyl methacrylate (commercially available from Nippon Shokubai Co., Ltd.)
BA: butyl acrylate (commercially available from Nippon Shokubai Co., Ltd.)
MA: methyl acrylate (commercially available from Nippon Shokubai Co., Ltd.)
St: styrene (commercially available from Chuo Kaseihin Co., Inc.)
2EHA: 2-ethylhexyl acrylate (commercially available from Nippon Shokubai Co., Ltd.)
SHA: 2-mercaptoethyl acrylate (Synthesis 6)
AA: allyl acrylate (commercially available from Tokyo Chemical Industry Co., Ltd.)
AA modified component: modified component obtained by converting allyl acrylate to 1,2-ethanedithiol
2-MTA: methoxyethyl acrylate (commercially available from Osaka Organic Chemical Industry Ltd.)
LMA: lauryl methacrylate (commercially available from Mitsubishi Chemical Corporation)

(Polymerization Initiator)
Synthesis 1: ethyl-2-methyl-2-n-butyltellanyl-propionate (TERP polymerization initiator)
Synthesis 2: 4-branch organic iodine-based living radical polymerization initiator
Synthesis 3: 5-branch organic iodine-based living radical polymerization initiator
Synthesis 4: 6-branch organic iodine-based living radical polymerization initiator
CP-I: 2-iodo-2-methylpropionitrile (commercially available from Tokyo Chemical Industry Co., Ltd.)
BM1448: 4-cyano-4-[(dodecylsulfanylthiocarbonyl)sulfanyl] methylpentanoate (commercially available from BORON MOLECULAR)

EMA-II: ethylene bis(2-iodoisobutyrate) (commercially available from Godo Shigen Co., Ltd.)

PhE-II: ethylene bis(2-iodo-2-phenylacetate) (commercially available from Godo Shigen Co., Ltd.) EMA-III: glycerol tris(2-iodoisobutyrate) (commercially available from Godo Shigen Co., Ltd.)

3f-BiB: 1,1,1-Tris(2-bromoisobutyryloxymethyl)ethane (No. 723185 commercially available from Aldrich)

4f-BiB: Pentaerythritol tetrakis(2-bromoisobutyrate) (No. 723193 commercially available from Aldrich)

6f-BiB: Dipentaerythritol hexakis(2-bromoisobutyrate) (No. 723207 commercially available from Aldrich)

AIBN: 2,2'-azobis(isobutyronitrile) (commercially available from Wako Pure Chemical Industries, Ltd.)

V65: 2,2'-azobis(2,4-dimethylvaleronitrile) (commercially available from Wako Pure Chemical Industries, Ltd.)

(Coupling Agent)

2C-(a) (bifunctional isocyanate (a)): hexamethylene diisocyanate (commercially available from Tosoh Corporation)

3C-(b) (trifunctional isocyanate (b)): TDI-TMP adduct component (commercially available from Nippon Polyurethane Industry Co., Ltd.)

4C-(c) (tetrafunctional isocyanate (c)): Synthesis 7

6C-(d) (hexafunctional isocyanate (d)): Synthesis 8

(Synthesis of TERP Polymerization Initiator)

Synthesis 1:
(ethyl-2-methyl-2-n-butyltellanyl-propionate)

Synthesis was performed according to the method disclosed in PCT International Publication No. WO 2007/119884. Specifically, 6.38 g (50 mmol) of metallic tellurium [product name: Tellurium (−40 mesh) commercially available from Aldrich] was suspended in 50 mL of THF, and 34.4 mL (55 mmol) of n-butyllithium (1.6 M hexane solution commercially available from Aldrich) was gradually added dropwise thereto at room temperature (for 10 minutes). The reaction solution was stirred until metallic tellurium completely disappeared (for 20 minutes). 10.7 g (55 mmol) of ethyl-2-bromo-isobutyrate was added to the reaction solution at room temperature and the mixture was stirred for 2 hours. After the reaction was completed, the solvent was concentrated under a reduced pressure, and then distilled off under a reduced pressure to obtain 7.67 g (a yield of 46.5%) of a yellow oily compound of Synthesis 1. In addition, the formation of a target product was confirmed by $^1$H-NMR analysis.

Synthesis 2: 4-Branch Organic Iodine-Based Living Radical Polymerization Initiator In a 200 mL flask including a nitrogen gas introduction pipe and a stirrer, 5.19 g (7.1 mmol) of 4f-BiB: Pentaerythritol tetrakis(2-bromoisobutyrate) (No. 723193 commercially available from Aldrich), and 5.09 g (34 mmol) of sodium iodide (commercially available from Wako Pure Chemical Industries, Ltd.) were dissolved in 20 mL of acetonitrile, purging with nitrogen was performed, and the mixture was then heated and stirred at 80° C. for 8 hours. After the reaction was completed, filtration was performed, and the solvent was concentrated under a reduced pressure to obtain 4.98 g (a yield of 87.2%) of a white solid compound of Synthesis 2. In addition, the formation of a target product was confirmed by $^1$H-NMR analysis.

Synthesis 3: 5-Branch Organic Iodine-Based Living Radical Polymerization Initiator In a 500 mL flask including a nitrogen gas introduction pipe and a stirrer, 50.0 g (0.22 mol) of 2-bromoisobutyryl bromide (commercially available from Tokyo Chemical Industry Co., Ltd.), 5.0 g (0.028 mol) of α-D-glucose (commercially available from Aldrich), and 50 mL of pyridine were dissolved in 100 mL of chloroform, purging with nitrogen was performed, and the mixture was then heated and stirred at 60° C. for 12 hours. After the reaction was completed, filtration was performed, and the solvent was concentrated under a reduced pressure to obtain 2.25 g (a yield of 30.0%) of a white solid intermediate compound. Next, in a 100 mL flask including a nitrogen gas introduction pipe and a stirrer, 0.50 g (0.54 mmol) of an intermediate compound and 0.5 g (3.3 mmol) of sodium iodide were dissolved in 50 mL of acetonitrile, purging with nitrogen was performed, and the mixture was then heated and stirred at 80° C. for 12 hours. After the reaction was completed, filtration was performed, and the solvent was concentrated under a reduced pressure to obtain 0.38 g (a yield of 79.2%) of a white solid compound of Synthesis 3. In addition, the formation of a target product was confirmed by $^1$H-NMR analysis.

Synthesis 4: 6-Branch Organic Iodine-Based Living Radical Polymerization Initiator In a 200 mL flask including a nitrogen gas introduction pipe and a stirrer, 8.15 g (7.1 mmol) of 6f-BiB: Dipentaerythritol hexakis(2-bromoisobutyrate) (No. 723207 commercially available from Aldrich) and 5.09 g (34 mmol) of sodium iodide (commercially available from Wako Pure Chemical Industries, Ltd.) were dissolved in 20 mL of acetonitrile, purging with nitrogen was performed, and the mixture was then heated and stirred at 80° C. for 8 hours. After the reaction was completed, filtration was performed, and the solvent was concentrated under a reduced pressure to obtain 7.98 g (a yield of 84.2%) of a white solid compound of Synthesis 4. In addition, the formation of a target product was confirmed by $^1$H-NMR analysis.

Synthesis 5: Methacrylate-Based Monomer Having Mercapto Group (CAS: 44836-12-6)

In a 200 mL flask including a nitrogen gas introduction pipe and a stirrer, 7.81 g (100 mmol) of 2-mercaptoethanol (commercially available from Tokyo Chemical Industry Co., Ltd.), 11.8 g (110 mmol) of methacryl chloride (commercially available from Tokyo Chemical Industry Co., Ltd.), and 5 mL of trimethylamine were dissolved in 100 mL of chloroform, purging with nitrogen was performed, and the mixture was then stirred at room temperature for 6 hours. After the reaction was completed, filtration was performed, and additionally, only a target product was isolated and purified by column purification to obtain 0.78 g (a yield of 13.2%) of a compound of Synthesis 5. In addition, the formation of a target product was confirmed by $^1$H-NMR analysis.

Synthesis 6: Acrylate-Based Monomer Having Mercapto Group (CAS: 122366-42-1)

In a 200 mL flask including a nitrogen gas introduction pipe and a stirrer, 7.81 g (100 mmol) of 2-mercaptoethanol (commercially available from Tokyo Chemical Industry Co., Ltd.), 10.5 g (110 mmol) of acryloyl chloride (commercially available from Tokyo Chemical Industry Co., Ltd.), and 5 mL of trimethylamine were dissolved in 100 mL of chloroform, purging with nitrogen was performed, and the mixture was then stirred at room temperature for 6 hours. After the reaction was completed, filtration was performed, and additionally, only a target product was isolated and purified by column purification to obtain 0.72 g (a yield of 14.2%) of a compound of Synthesis 6. In addition, the formation of a target product was confirmed by $^1$H-NMR analysis.

Synthesis 7: tetrafunctional Isocyanate (c)

In a 100 mL flask including a nitrogen gas introduction pipe and a stirrer, 12.2 g (100 mmol) of L-1,2,3,4-butane tetraol (commercially available from Tokyo Chemical Industry Co., Ltd.), and 76.6 g (440 mmol) of tolylene-2,4-diisocyanate (commercially available from Tokyo Chemical Industry Co., Ltd.) were added, purging with nitrogen was performed, and the mixture was then heated and stirred at 100° C. for 3 hours. After the reaction was completed, filtration was performed to obtain 80.1 g (a yield of 87.2%) of a target product compound of Synthesis 7. In addition, the formation of a target product was confirmed by $^1$H-NMR analysis.

Synthesis 8: Hexafunctional Isocyanate (d)

In a 500 mL flask including a nitrogen gas introduction pipe and a stirrer, 25.4 g (100 mmol) of dipentaerythritol (commercially available from Tokyo Chemical Industry Co., Ltd.) and 114.9 g (660 mmol) of tolylene-2,4-diisocyanate (commercially available from Tokyo Chemical Industry Co., Ltd.) were dissolved in 100 mL of toluene, purging with nitrogen was performed, and the mixture was then heated and stirred at 60° C. for 3 hours. After the reaction was completed, filtration was performed to obtain 100.7 g (a yield of 70.2%) of a target product compound of Synthesis 8. In addition, the formation of a target product was confirmed by $^1$H-NMR analysis.

[Content (%) of (Hydrophobic) Ethylenically Unsaturated Monomer in Block Copolymer (C)]

The content of the hydrophobic ethylenically unsaturated monomer with respect to the total amount of ethylenically unsaturated monomers prepared, which constituting the polymer block (A) and the polymer block (B), was determined.

[Content (Mass %) of Polymer Block (A) with Respect to Polymer Block (A) and Polymer Block (B)]

The content of the polymer block (A) with respect to polymer block (A) and the polymer block (B) in the block copolymer (C) was calculated. Specifically, the content of the polymer block (A) with respect to the total amount of ethylenically unsaturated monomers prepared, which constituting the polymer block (A) and the polymer block (B), was determined.

(Example R1): Synthesis of Block Copolymer (C) by Coupling Reaction

A block copolymer (C) was synthesized by the RAFT method. Specifically, in a 2,000 mL flask including a nitrogen gas introduction pipe and a stirrer, 3.5 g of BM1448 (RAFT agent), 0.02 g of AIBN, 16.8 g of MMA, 2.0 g of AMA, and 1.6 g of St were reacted in 200 g of a methyl ethyl ketone solvent in an environment at 75° C. for 8 hours to obtain a polymer block (A) having an alkenyl group. The conversion rates of MMA, AMA, and St calculated from $^1$H-NMR were all 99.5% or more.

Next, 0.03 g of AIBN, 120.0 g of BA, 24.0 g of BMA, and 16.0 g of 2EHA were added to a total amount of the prepolymer solution, and the mixture was reacted at 75° C. for 20 hours. The conversion rates of the second-stage monomers BA, BMA, and 2EHA calculated from $^1$H-NMR were all 100%.

Then, the mixture was cooled to room temperature, and filtered, washed, and dried to obtain an A-B diblock polymer containing the polymer block (B). In addition, 70.0 g of the diblock component obtained in this manner was dissolved in 300 g of toluene, 18 g of monoethylamine as a treatment agent was added, and the mixture was stirred at 30° C. for 18 hours. According to $^1$H-NMR analysis and IR analysis, and mercaptan titration analysis, it was confirmed that the thiocarbonylthio group at the terminal of the polymer block (B) was quantitatively converted to a mercapto group.

Next, 200 g of dehydrated toluene, 0.24 g of bifunctional isocyanate (a) as a coupling agent, and 0.01 g of dibutyltin bisisooctylthioglycolate as a catalyst were added to 100 g of an A-B diblock polymer having a mercapto group at the terminal, and reacted at 80° C. for 10 hours to cause a coupling reaction. Then, toluene was distilled off, the obtained polymer was subjected to $^1$H-NMR analysis and IR analysis, mercaptan titration analysis, and MALDI-TOFMS analysis and thereby a star-shaped block polymer of [A-B]$_2$X having a coupling agent residue X which is a thiourethane bond in the main chain was obtained.

In addition, a new 1,000 mL flask including a nitrogen gas introduction pipe and a stirrer was prepared, 100 g of the obtained star-shaped block polymer of [A-B]$_2$X, 3.2 g of 1,2-ethanedithiol, 0.03 g of V65, and 200 g of a diglyme solvent were put into the flask, an enthiol reaction was caused by a method of reacting for 12 hours in an environment at 60° C., a mercapto group was introduced into a part of the alkenyl group of the structural unit derived from AMA to obtain a block copolymer (C) having a 2-branch structure. The obtained polymer was subjected to $^1$H-NMR analysis and IR analysis, mercaptan titration analysis, and MALDI-TOFMS analysis, and thereby a star-shaped block polymer of [A-B]$_2$X having a mercapto group in the main chain of the polymer block (A) was obtained.

Tables 1 and 2 show the contents of the structural units of the monomer units calculated from the preparation ratio of the obtained block copolymers (C), physical property values such as Mn, the degree of polydispersity, the mercapto group content, and the content of iodine, and Tg of the polymer block (A) and the polymer block (B) (the same applies to the following examples).

$^1$H-NMR spectral data of the synthesized block copolymer (C) is shown below. $^1$H-NMR (400 MHz, deuterated chloroform solvent) δ ppm: 7.40-7.27, 6.71-6.52, 5.92, 5.31, 4.48, 4.50, 4.03, 3.60, 2.90-2.69, 2.27, 1.90, 1.60, 1.37, 0.94 (all signals are broad).

Example R2

A block copolymer (C) was synthesized by the RCMP method. Specifically, in a 2,000 mL flask including a nitrogen gas introduction pipe and a stirrer, 0.47 g of CP-I, 0.001 g of iodine, 15.0 g of tetrabutylammonium iodide, 21.6 g of MMA, and 1.38 g of AMA were reacted in 200 g of a toluene solvent at 70° C. for 8 hours to obtain a polymer block (A) having an alkenyl group. The conversion rates of MMA and AMA calculated from $^1$H-NMR were all 100%.

Next, 154.0 g of BA was added to a total amount of the prepolymer solution, and the mixture was reacted at 110° C. for 16 hours. The conversion rate of the second-stage monomer BA calculated from $^1$H-NMR was 100%.

Then, the mixture was cooled to room temperature, alumina powder (commercially available from Aldrich) was added thereto, the mixture was stirred for 1 hour, and then filtered, washed and dried to obtain an A-B diblock polymer having iodine at the terminal of the polymer block (B).

5.0 g of 2-aminoethanol and 150.0 g of diglyme were added to 100.0 g of the obtained diblock polymer and reacted at 110° C. for 8 hours, the mixture was cooled to room temperature and then filtered, washed, and dried, and $^1$H-NMR analysis and IR analysis, mercaptan titration analysis, and MALDI-TOFMS analysis were then performed, and thereby an A-B diblock polymer having a hydroxy group at the terminal of the polymer block (B) was obtained.

Next, an enthiol reaction was caused in the same method as in Example R1 except that a coupling reaction was caused in the same method as in Example R1, a star-shaped block polymer of [A-B]$_2$X having a coupling agent residue X was synthesized, and 6.2 g of 1,2-ethanedithiol was then used, a mercapto group was introduced into the alkenyl group of the structural unit derived from AMA, and thereby a block copolymer (C) having a 2-branch structure shown in Tables 1 and 2 was obtained. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 5.92, 5.31, 4.48, 3.60, 2.90-2.69, 2.27, 1.90, 1.60, 1.37, 0.94 (all signals are broad).

Example R3

A block copolymer (C) having a 3-branch structure as shown in Tables 1 and 2 was obtained in the same RCMP method as in Example R2 except that a trifunctional isocyanate (b) was used as a coupling agent. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 5.93, 5.40, 4.48, 3.60, 2.90-2.69, 2.27, 1.90, 1.60, 1.37, 0.94 (all signals are broad).

Example R4

A block copolymer (C) having a 4-branch structure shown in Tables 1 and 2 was obtained in the same RAFT method as in Example R1 except that a tetrafunctional isocyanate (c) was used as a coupling agent. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 5.93-5.92, 5.40, 5.31, 4.48, 4.03, 3.60, 2.90-2.69, 2.27, 1.90, 1.60, 1.37, 0.94 (all signals are broad).

Example R5

A block copolymer (C) having a 6-branch structure shown in Tables 1 and 2 was obtained in the same RCMP method as in Example R2 except that a hexafunctional isocyanate (d) was used as a coupling agent. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 5.93-5.92, 5.40, 5.31, 4.48, 4.03, 3.60, 2.90-2.69, 2.27, 1.90, 1.60, 1.37, 0.94 (all signals are broad).

Comparative Examples R1 and R2

As comparative examples, a block copolymer having no mercapto group introduced was synthesized. Specifically, the same RAFT method as in Example R1 was performed in Comparative Example R1, the same RCMP method as in Example R2 was performed in Comparative Example R2, and thereby block copolymers according to comparative examples shown in Tables 1 and 2 were obtained. In addition, the target product was confirmed by $^1$H-NMR analysis of the obtained polymer.

$^1$H-NMR spectral data of the block copolymer (C) synthesized in Comparative Example R1 is shown below.

$^1$H-NMR (400 MHz, deuterated chloroform solvent) δ ppm: 7.40-7.27, 6.71-6.52, 4.50, 4.03, 3.60, 2.27, 1.90, 1.60, 1.37, 0.94 (all signals are broad).

$^1$H-NMR spectral data of the block copolymer (C) synthesized in Comparative Example R2 is shown below.

$^1$H-NMR (400 MHz, deuterated chloroform solvent) δ ppm: 4.03, 3,97, 3.60, 2.27, 1.90, 1.60, 1.37, 0.94 (all signals are broad).

TABLE 1

| | | | | Example R1 | Example R2 | Example R3 | Example R4 |
|---|---|---|---|---|---|---|---|
| Production Example | | | | C1 | C2 | C3 | C4 |
| Method of synthesizing A-B diblock polymer | | | | RAFT | RMCP | RMCP | RAFT |
| Polymerization initiator | | | | BM1448 | CP-I | CP-I | BM1448 |
| Type of terminal functional group | | | | SH group | OH group | OH group | SH group |
| Coupling agent (for connection) | | | | 2C-(a) | 2C-(a) | 3C-(b) | 4C-(c) |
| Number of q in case of [A-B]$_q$X | | | | 2 | 2 | 3 | 4 |
| Polymer block (A) | Monomer (mass %) | Derived from methacrylic acid ester | MMA | 82% | 94% | 100% | 80% |
| | | | BMA | 0% | 0% | 0% | 0% |
| | | | AMA | 2% | 2% | 0% | 5% |
| | | | AMA modified with 1,2-ethanedithiol | 8% | 4% | 0% | 2% |
| | | Derived from acrylic acid ester | MA | 0% | 0% | 0% | 13% |

TABLE 1-continued

|  |  |  |  |  |  |  |  |
|---|---|---|---|---|---|---|---|
|  |  | Other | St | 8% | 0% | 0% | 0% |
|  | Tg(° C.) of <Polymer block (A)>$_{Total}$ |  |  | 99 | 101 | 105 | 84 |
|  | Preparation ratio (mass %) |  | Derived from methacrylic acid ester | 92% | 100% | 100% | 87% |
|  |  |  | Derived from methyl methacrylate | 82% | 94% | 100% | 80% |
| Polymer block (B) | Monomer (mass %) | Derived from methacrylic acid ester | MMA | 0% | 0% | 0% | 0% |
|  |  |  | BMA | 15% | 0% | 0% | 6% |
|  |  |  | LMA | 0% | 0% | 0% | 0% |
|  |  | Derived from acrylic acid ester | BA | 75% | 100% | 96% | 90% |
|  |  |  | 2EHA | 10% | 0% | 0% | 0% |
|  |  |  | AA | 0% | 0% | 3.5% | 2% |
|  |  |  | AA modified with 1,2-ethanedithiol | 0% | 0% | 0.5% | 2% |
|  | Tg(° C.) of <Polymer block (B)[X]> |  |  | −38 | −45 | −44 | −41 |
|  | Preparation ratio (mass %) |  | Derived from acrylic acid ester | 85% | 100% | 100% | 94% |
|  |  |  | Derived from butyl acrylate | 75% | 100% | 96% | 90% |

|  |  |  |  | Example R5 | Comparative Example R1 | Comparative Example R2 |
|---|---|---|---|---|---|---|
| Production Example |  |  |  | C5 | J1 | J2 |
| Method of synthesizing A-B diblock polymer |  |  |  | RMCP | RAFT | RMCP |
| Polymerization initiator |  |  |  | CP-I | BM1448 | CP-I |
| Type of terminal functional group |  |  |  | OH group | SH group | OH group |
| Coupling agent (for connection) |  |  |  | 6C-(d) | 2C-(a) | 6C-(d) |
| Number of q in case of [A-B]$_q$X |  |  |  | 6 | 2 | 6 |
| Polymer block (A) | Monomer (mass %) | Derived from methacrylic acid ester | MMA | 90% | 80% | 90% |
|  |  |  | BMA | 0% | 5% | 7% |
|  |  |  | AMA | 5% | 0% | 0% |
|  |  |  | AMA modified with 1,2-ethanedithiol | 5% | 0% | 0% |
|  |  | Derived from acrylic acid ester | MA | 0% | 2% | 3% |
|  |  | Other | St | 0% | 13% | 0% |
|  | Tg(° C.) of <Polymer block (A)>$_{Total}$ |  |  | 99 | 96 | 94 |
|  | Preparation ratio (mass %) |  | Derived from methacrylic acid ester | 100% | 85% | 97% |
|  |  |  | Derived from methyl methacrylate | 90% | 80% | 90% |
| Polymer block (B) | Monomer (mass %) | Derived from methacrylic acid ester | MMA | 0% | 5% | 0% |
|  |  |  | BMA | 0% | 10% | 6% |
|  |  |  | LMA | 0% | 0% | 4% |
|  |  | Derived from acrylic acid ester | BA | 90% | 75% | 90% |
|  |  |  | 2EHA | 0% | 10% | 0% |
|  |  |  | AA | 7% | 0% | 0% |
|  |  |  | AA modified with 1,2-ethanedithiol | 3% | 0% | 0% |
|  | Tg(° C.) of <Polymer block (B)[X]> |  |  | −43 | −36 | −43 |
|  | Preparation ratio (mass %) |  | Derived from acrylic acid ester | 100% | 85% | 90% |
|  |  |  | Derived from butyl acrylate | 90% | 75% | 90% |

TABLE 2

|  | Example R1 | Example R2 | Example R3 | Example R4 | Example R5 | Comparative Example R1 | Comparative Example R2 |
|---|---|---|---|---|---|---|---|
| Production Example | C1 | C2 | C3 | C4 | C5 | J1 | J2 |
|  |  |  | Properties of block copolymer (C) |  |  |  |  |
| Mn | 67,000 | 220,000 | 110,000 | 328,000 | 450,000 | 59,000 | 198,000 |
| Mw/Mn | 1.2 | 1.5 | 1.3 | 2.3 | 2.5 | 1.3 | 2.2 |
| Mass % of (hydrophobic) ethylenically unsaturated monomer | 98% | 99% | 100% | 98% | 96% | 100% | 100% |
| Content (mass %) of polymer block (A) | 20% | 23% | 15% | 40% | 32% | 23% | 38% |

TABLE 2-continued

|  | Example R1 | Example R2 | Example R3 | Example R4 | Example R5 | Comparative Example R1 | Comparative Example R2 |
|---|---|---|---|---|---|---|---|
| Introduction of mercapto group | | | | | | | |
| Presence of mercapto group | Yes | Yes | Yes | Yes | Yes | No | No |
| Introduction method | Thiol-ene reaction | Thiol-ene reaction | Thiol-ene reaction | Thiol-ene reaction | Thiol-ene reaction | — | — |
| Introduction position | A | A | B | A + B | A + B | — | — |
| Main chain or terminal | Main chain | Main chain | Main chain | Main chain | Main chain | — | — |
| Thiol group concentration (mmol/g) | 0.073 | 0.042 | 0.021 | 0.094 | 0.172 | — | — |
| Iodine content (ppm) | — | 10 | 100 | — | 2,000 | — | 800 |

Example R6

A block copolymer (C) was synthesized by the TERP method. Specifically, in a glove box purged with argon, 0.25 g of ethyl-2-methyl-2-n-butyltellanyl-propionate produced in Synthesis 1, 0.01 g of AIBN, 25.7 g of MMA and 1.4 g of SHMA were reacted in 200 g of a methyl ethyl ketone solvent at 50° C. for 6 hours to obtain a prepolymer. The conversion rates of the MMA and SHMA calculated from $^1$H-NMR were all 99.5% or more. Next, 146.0 g of BA was added to a total amount of the prepolymer solution, and the mixture was reacted at 50° C. for 40 hours. The conversion rate of the second-stage monomer BA calculated from $^1$H-NMR was 99.5% or more. In addition, 25.7 g of MMA and 1.4 g of SHMA were added to a total amount of the prepolymer solution, and the mixture was reacted at 50° C. for 6 hours. The conversion rates of the third-stage monomers MMA and SHMA calculated from $^1$H-NMR were all 99.5% or more. Then, the mixture was cooled to room temperature, filtered, washed and dried to obtain a block copolymer (C) having an A-B-A triblock structure having a mercapto group in the main chain of the polymer block (A) and having an initiator residue X at the chain terminal. In addition, the target product was confirmed by $^1$H-NMR analysis and IR analysis, mercaptan titration analysis, and MALDI-TOFMS analysis of the obtained polymer. Table 3 and Table 4 show the physical property values of the block copolymer (C) according to Example R6 (the same applies to the following examples and comparative examples).

$^1$H-NMR spectral data of the synthesized block copolymer (C) is shown below. $^1$H-NMR (400 MHz, deuterated chloroform solvent) δ ppm: 4.03, 3.60, 2.84, 2.27, 1.90, 1.60, 1.37, 0.94 (all signals are broad).

Example R7

A block copolymer (C) was synthesized by the RAFT method. Specifically, in a 2,000 mL flask including a nitrogen gas introduction pipe and a stirrer, 2.1 g of BM1448 (RAFT agent), 0.02 g of AIBN, 44.6 g of MMA and 0.5 g of SHMA were reacted in 200 g of a methyl ethyl ketone solvent in an environment at 75° C. for 6 hours to obtain a prepolymer. The conversion rates of MMA and SHMA calculated from $^1$H-NMR were all 99.5% or more. Next, 0.03 g of AIBN, 107.8 g of 2EHA and 2.2 g of SHA were added to a total amount of the prepolymer solution, and the mixture was reacted at 75° C. for 10 hours. The conversion rates of the second-stage monomers 2EHA and SHA calculated from $^1$H-NMR were all 100%. In addition, 0.02 g of AIBN, 44.6 g of MMA and 0.5 g of SHMA were added to a total amount of the prepolymer solution, and the mixture was reacted at 75° C. for 7 hours. The conversion rates of the third-stage monomers MMA and SHMA calculated from $^1$H-NMR were all 99.5% or more. Then, the mixture was cooled to room temperature, filtered, washed and dried to obtain a block copolymer (C) having an A-B-A triblock structure having a mercapto group in the main chains of both the polymer block (A) and the polymer block (B) and an initiator residue X at the chain terminal. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.50, 4.03, 3.60, 2.84, 2.27, 1.90, 1.60, 1.37, 0.94 (all signals are broad).

Example R8

A block copolymer (C) was synthesized by the ATRP method. Specifically, in a 2,000 mL flask including a nitrogen gas introduction pipe and a stirrer, 1.0 g of copper(I) bromide, 3.6 g of 3f-BiB: 1,1,1-Tris(2-bromoisobutyryloxymethyl)ethane (No. 723185 commercially available from Aldrich), 1.2 g of N,N,N',N'',N''-pentamethyldiethylenetriamine, 146.0 g of BA and 7.8 g of 2EHA were reacted in 200 g of a methyl ethyl ketone solvent at 85° C. for 8 hours to obtain a prepolymer. The conversion rates of BA and 2EHA calculated from $^1$H-NMR were all 100%. Next, 22.8 g of MMA and 0.4 g of SHMA were added to a total amount of the prepolymer solution, and the mixture was reacted at 85° C. for 10 hours. The conversion rates of the second-stage monomers MMA and SHMA calculated from $^1$H-NMR were all 100%. Then, the mixture was cooled to room temperature, filtered, washed and dried to obtain a block copolymer (C) having a 3-branch [A-B]$_3$X star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.50, 4.03, 3.60, 2.84, 2.27, 1.90, 1.60, 1.37, 0.94 (all signals are broad).

(Example R9) ATRP/Thiol-Ene Reaction

A block copolymer (C) was synthesized by the ATRP method. Specifically, in a 2,000 mL flask including a nitrogen gas introduction pipe and a stirrer, 1.4 g of copper(I) bromide, 2.0 g of 4f-BiB: Pentaerythritol tetrakis(2-bromoisobutyrate) (No. 723193 commercially available from Aldrich), 1.0 g of N,N,N',N'',N''-pentamethyldiethylenetriamine, 129.6 g of BA and 32.4 g of LMA were reacted in 200 g of a methyl ethyl ketone solvent at 85° C. for 20 hours to obtain a prepolymer. The conversion rates of BA and LMA calculated from $^1$H-NMR were all 100%. Next, 30.4 g of MMA and 3.8 g of AMA were added to a total amount of the prepolymer solution, and the mixture was reacted at 85° C. for 20 hours. The conversion rates of the second-stage monomers MMA and AMA calculated from $^1$H-NMR were all 99.5% or more. Then, the mixture was cooled to room temperature, and filtered, washed, and dried to obtain a star-shaped block polymer of [A-B]$_4$X containing the polymer block (A) having an alkenyl group. Next, an enthiol reaction was caused in the same method as in Example R1 except that 2.26 g of 1,2-ethanedithiol was used, and a thiol group was introduced into the alkenyl group of the structural unit derived from AMA to obtain a block copolymer (C) having a 4-branch [A-B]$_4$X star-shaped block structure. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 5.92, 5.31, 4.48, 4.03, 3.97, 3.60, 2.90-2.69, 2.27, 1.90, 1.60, 1.37, 0.94 (all signals are broad).

(Example R10) RCMP/Monomer Copolymerization

A block copolymer (C) was synthesized by the RCMP method. Specifically, in 2,000 mL flask including a nitrogen gas introduction pipe and a stirrer, 0.91 g of PhE-II, 0.02 g of iodine, 16.8 g of tetrabutylammonium iodide and 146.0 g of BA were reacted in 200 g of a toluene solvent at 110° C. for 20 hours to obtain a prepolymer. Next, 51.4 g of MMA and 3.8 g of SHMA were added to a total amount of the prepolymer solution, and the mixture was reacted at 110° C. for 6 hours. Then, the mixture was cooled to room temperature, filtered, washed and dried to obtain a block copolymer (C) having a 2-branch [A-B]$_2$X star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.03, 3.60, 2.84, 2.27, 1.90, 1.60, 1.37, 0.94 (all signals are broad).

Example R11

According to the same RCMP method as in Example R10, polymerization was performed under the conditions shown in Table 3 to obtain a block copolymer (C) having a 2-branch [A-B]$_2$X star-shaped block structure having a mercapto group in the main chain of the polymer block (B). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 4.50, 4.27, 4.21, 4.03, 3.85, 3.65, 3.60, 2.84, 2.27, 1.90, 1.60, 1.37, 0.94 (all signals are broad).

(Example R12) RCMP/Thiol-Ene Reaction

A block copolymer (C) was synthesized by the RCMP method. Specifically, in a 2,000 mL flask including a nitrogen gas introduction pipe and a stirrer, 0.24 g of EMA-III, 0.03 g of iodine, 13.8 g of tetrabutylammonium iodide, 108.0 g of BA, and 12.0 g of AA were reacted in 200 g of a toluene solvent at 110° C. for 24 hours to obtain a prepolymer. The conversion rates of BA and AA calculated from $^1$H-NMR were all 100%. Next, 64.0 g of MMA, 8.0 g of AMA, and 8.0 g of St were added to a total amount of the prepolymer solution, and the mixture was reacted at 110° C. for 16 hours. The conversion rates of the second-stage monomers MMA, AMA and St calculated from $^1$H-NMR were all 100%. Then, the mixture was cooled to room temperature, alumina powder (commercially available from Aldrich) was added thereto, the mixture was stirred for 1 hour, and then filtered, washed and dried to obtain a star-shaped block polymer of [A-B]$_3$X containing the polymer block (A) having an alkenyl group. Next, an enthiol reaction was caused in the same method as in Example R1 except that 3.2 g of 1,2-ethanedithiol was used, and a thiol group was introduced into the alkenyl group of the structural unit derived from AMA to obtain a block copolymer (C) having a 3-branch [A-B]$_3$X star-shaped block structure. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 5.92, 5.31, 4.48, 4.03, 3.60, 2.90-2.69, 2.27, 1.90, 1.60, 1.37, 0.94 (all signals are broad).

(Example R13) RCMP/Thiol-Ene Reaction

A block copolymer (C) was synthesized by the RCMP method. Specifically, in a 2,000 mL flask including a nitrogen gas introduction pipe and a stirrer, 0.54 g of EMA-II, 0.01 g of iodine, 9.2 g of tetrabutylammonium iodide, and 160.0 g of BA were reacted in 200 g of a toluene solvent at 110° C. for 20 hours to obtain a prepolymer. The conversion rate of BA calculated from $^1$H-NMR was 100%. Next, 30.0 g of MMA and 10.0 g of AMA were added to a total amount of the prepolymer solution, and the mixture was reacted at 110° C. for 16 hours. The conversion rates of the second-stage monomers MMA and AMA calculated from $^1$H-NMR were all 100%. Then, the mixture was cooled to room temperature, alumina powder (commercially available from Aldrich) was added thereto, the mixture was stirred for 1 hour, and then filtered, washed and dried to obtain a star-shaped block polymer of [A-B]$_2$X containing the polymer block (A) having an alkenyl group. Next, an enthiol reaction was caused in the same method as in Example R1 except that 1.2 g of 1,2-ethanedithiol was used, and a thiol group was introduced into the alkenyl group of the structural unit derived from AMA to obtain a block copolymer (C) having a 2-branch [A-B]$_2$X star-shaped block structure. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 5.92, 5.31, 4.48, 3.60, 2.90-2.69, 2.27, 1.90, 1.60, 1.37, 0.94 (all signals are broad).

(Example R14) RCMP/Terminal Conversion

A block copolymer (C) was synthesized by the RCMP method. Specifically, in a 2,000 mL flask including a nitrogen gas introduction pipe and a stirrer, 0.84 g of EMA-III, 0.005 g of iodine, 9.7 g of tetrabutylammonium iodide, and 150.0 g of BA were reacted in 200 g of a toluene solvent at 110° C. for 24 hours to obtain a prepolymer. The conversion rate of BA calculated from $^1$H-NMR was 100%. Next, 50.0 g of MMA was added to a total amount of the prepolymer solution, and the mixture was reacted at 110° C. for 16 hours. The conversion rate of the second-stage monomer MMA calculated from $^1$H-NMR was also 100%. Then, the mixture was cooled to room temperature and then filtered, washed and dried to obtain a precursor polymer having a 3-branch [A-B]$_3$X star-shaped block structure containing iodine at the terminal of the polymer block (A).

In addition, 7.2 g of cysteamine and 150.0 g of diglyme were added to 100.0 g of the obtained precursor polymer, and the mixture was reacted at 110° C. for 8 hours. Then, the mixture was cooled to room temperature, alumina powder (commercially available from Aldrich) was added thereto, and the mixture was stirred for 1 hour and then filtered, washed and dried to obtain a block copolymer (C) having a 3-branch [A-B]$_3$X star-shaped block structure having a mercapto group at the terminal of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.03 (derived from BA), 3.60 (derived from MMA), 2.27, 1.90, 1.60, 1.37, 0.94 (all signals are broad).

Example R15

According to the same RCMP method as in Example R14, EMA-II was used as a multi-branch polymerization initiator, and polymerization was performed under the conditions shown in Example R3 to obtain a block copolymer (C) having a 2-branch [A-B]$_2$X star-shaped block structure having a mercapto group at the terminal of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 4.50, 4.03, 3.60, 2.27, 1.90, 1.60, 1.37, 0.94 (all signals are broad).

Example R16

According to the same RCMP method as in Example R10, Synthesis 2 was used for a multi-branch polymerization initiator, and polymerization was performed under the conditions shown in Table 3 such as the monomer preparation ratio to obtain a block copolymer (C) having a 4-branch [A-B]$_4$X star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.03, 3.60, 2.84, 2.27, 1.90, 1.60, 1.37, 0.94 (all signals are broad).

Example R17

According to the same RCMP method as in Example R13, the compound obtained in Synthesis 4 was used as a multi-branch polymerization initiator, polymerization was performed under the conditions shown in Table 3 such as the monomer preparation ratio, a mercapto group was introduced into the alkenyl group of the structural unit derived from AMA to obtain a block copolymer (C) having a 6-branch [A-B]$_6$X star-shaped block structure. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 5.92, 5.31, 4.48, 4.21, 4.03, 3.85, 3.60, 2.90-2.69, 2.27, 1.90, 1.60, 1.37, 0.94 (all signals are broad).

Example R18

According to the same RCMP method as in Example R13, EMA-II was used as a multi-branch polymerization initiator, a mercapto group was introduced into the alkenyl group of the structural unit derived from AMA, and polymerization was performed under the conditions shown in Table 3 such as the monomer preparation ratio to obtain a block copolymer (C) having a 2-branch [A-B]$_2$X star-shaped block structure. In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 5.92, 5.31, 4.48, 4.03, 3.60, 2.90-2.69, 2.27, 1.90, 1.60, 1.37, 0.94 (all signals are broad).

Example R19

According to the same RCMP method as in Example R14, EMA-III was used as a multi-branch polymerization initiator, and polymerization was performed under the conditions shown in Table 3 such as the monomer preparation ratio to obtain a block copolymer (C) having a 3-branch [A-B]$_3$X star-shaped block structure having a mercapto group at the terminal of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.27, 4.21, 4.03, 3.85, 3.65, 3.60, 2.27, 1.90, 1.60, 1.37, 0.94 (all signals are broad).

Example R20

According to the same RCMP method as in Example R10, the compound obtained in Synthesis 3 was used as a multi-branch polymerization initiator, and polymerization was performed under the conditions shown in Table 3 such as the monomer preparation ratio to obtain a block copolymer (C) having a 5-branch [A-B]$_5$X star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 4.27, 4.21, 4.03, 3.97, 3.85, 3.65, 3.60, 2.84, 2.27, 1.90, 1.60, 1.37, 0.94 (all signals are broad).

Example R21

According to the same RCMP method as in Example R10, the compound obtained in Synthesis 4 was used as a multi-branch polymerization initiator, and polymerization was performed under the conditions shown in Table 5 such as the monomer preparation ratio to obtain a block copolymer (C) having a 6-branch $[A-B]_6X$ star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 4.50, 4.03, 3.60, 2.84, 2.27, 1.90, 1.60, 1.37, 0.94 (all signals are broad).

Example R22

According to the same RCMP method as in Example R10, EMA-II was used as a multi-branch polymerization initiator, and polymerization was performed under the conditions shown in Table 5 such as the monomer preparation ratio to obtain a block copolymer (C) having a 2-branch $[A-B]_2X$ star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. 1H-NMR (400 MHz, deuterated chloroform solvent) δ ppm: 7.40-7.27, 6.71-6.52, 4.50, 4.03, 3.60, 2.84, 2.27, 1.90, 1.60, 1.37, 0.94 (all signals are broad).

Example R23

According to the same RCMP method as in Example R10, EMA-III was used as a multi-branch polymerization initiator, and polymerization was performed under the conditions shown in Table 5 such as the monomer preparation ratio to obtain a block copolymer (C) having a 3-branch $[A-B]_3X$ star-shaped block structure having a mercapto group in the main chain of the polymer block (A). In addition, the target product was confirmed by $^1$H-NMR analysis and IR analysis, mercaptan titration analysis, and MALDI-TOFMS analysis of the obtained polymer.

$^1$H-NMR spectral data of the synthesized block copolymer (C) is shown below. $^1$H-NMR (400 MHz, deuterated chloroform solvent) δ ppm: 7.40-7.27, 6.71-6.52, 4.50, 4.03, 3.60, 2.84, 2.27, 1.90, 1.60, 1.37, 0.94 (all signals are broad).

Comparative Examples R3 to R11

According to the methods corresponding to Examples R6 to R24, block copolymers having structural units derived from the monomers shown in Tables 5 and 6 were obtained by the RAFT method in Comparative Example R3, the RCMP method in Comparative Examples R4 to R6 and R9 to R11, the TERP method in Comparative Example R7, and the ATRP method in Comparative Example R8.

$^1$H-NMR spectral data of the block copolymer (C) synthesized in Comparative Example R3 is shown below.
$^1$H-NMR (400 MHz, deuterated chloroform solvent) δ ppm: 4.03, 3.60, 2.27, 1.90, 1.60, 1.37, 0.94 (all signals are broad).

$^1$H-NMR spectral data of the block copolymer (C) synthesized in Comparative Example R4 is shown below.
$^1$H-NMR (400 MHz, deuterated chloroform solvent) δ ppm: 4.21, 4.03, 3.85, 3.60, 2.27, 1.90, 1.60, 1.37, 0.94 (all signals are broad).

$^1$H-NMR spectral data of the block copolymer (C) synthesized in Comparative Example R5 is shown below.
$^1$H-NMR (400 MHz, deuterated chloroform solvent) δ ppm: 4.50, 4.03, 3.97, 3.60, 2.84, 2.27, 1.90, 1.60, 1.37, 0.94 (all signals are broad).

$^1$H-NMR spectral data of the block copolymer (C) synthesized in Comparative Example R6 is shown below.
$^1$H-NMR (400 MHz, deuterated chloroform solvent) δ ppm: 4.03, 3.60, 2.27, 1.90, 1.60, 1.37, 0.94 (all signals are broad).

$^1$H-NMR spectral data of the block copolymer (C) synthesized in Comparative Example R7 is shown below.
$^1$H-NMR (400 MHz, deuterated chloroform solvent) δ ppm: 4.03, 3.60, 2.84, 2.27, 1.90, 1.60, 1.37, 0.94 (all signals are broad).

$^1$H-NMR spectral data of the block copolymer (C) synthesized in Comparative Example R8 is shown below.
$^1$H-NMR (400 MHz, deuterated chloroform solvent) δ ppm: 4.03, 3.60, 2.84, 2.27, 1.90, 1.60, 1.37, 0.94 (all signals are broad).

$^1$H-NMR spectral data of the block copolymer (C) synthesized in Comparative Example R9 is shown below.
$^1$H-NMR (400 MHz, deuterated chloroform solvent) δ ppm: 7.40-7.27, 6.71-6.52, 4.03, 3.60, 2.84, 2.27, 1.90, 1.60, 1.37, 0.94 (all signals are broad).

$^1$H-NMR spectral data of the block copolymer (C) synthesized in Comparative Example R10 is shown below.
$^1$H-NMR (400 MHz, deuterated chloroform solvent) δ ppm: 4.50, 4.03, 3.97, 3.60, 2.27, 1.90, 1.60, 1.37, 0.94 (all signals are broad).

$^1$H-NMR spectral data of the block copolymer (C) synthesized in Comparative Example R11 is shown below.
$^1$H-NMR (400 MHz, deuterated chloroform solvent) δ ppm: 7.40-7.27, 6.71-6.52, 5.92, 5.31, 4.48, 4.21, 4.03, 3.85, 3.60, 2.90-2.69, 2.27, 1.90, 1.60, 1.37, 0.94 (all signals are broad).

TABLE 3

|  |  |  |  | Example | | | | | | |
|---|---|---|---|---|---|---|---|---|---|---|
|  |  |  |  | R6 | R7 | R8 | R9 | R10 | R11 | R12 |
| Production Example | | | | C6 | C7 | C8 | C9 | C10 | C11 | C12 |
| Polymerization method | | | | TERP | RAFT | ATRP | ATRP | RMCP | RMCP | RMCP |
| Polymerization initiator | | | | Synthesis 1 | BM1448 | 3f-BiB | 4f-BiB | PhE-II | EMA-II | EMA-III |
| Number of q in case of $[A-B]_qX$ or A-B-A triblock structure | | | | A-B-A | A-B-A | 3 | 4 | 2 | 2 | 3 |
| Polymer block (A) | Monomer (mass %) | Derived from methacrylic | MMA | 95% | 99% | 99% | 80% | 95% | 75% | 80% |
|  |  |  | BMA | 0% | 0% | 0% | 0% | 0% | 0% | 0% |
|  |  |  | SHMA | 5% | 1% | 1% | 0% | 5% | 0% | 0% |

TABLE 3-continued

| | | | | | | | | | | |
|---|---|---|---|---|---|---|---|---|---|---|
| | | acid ester | AMA | 0% | 0% | 0% | 2% | 0% | 0% | 8% |
| | | | AMA modified with 1,2-ethanedithiol | 0% | 0% | 0% | 8% | 0% | 0% | 2% |
| | | | HEMA | 0% | 0% | 0% | 0% | 0% | 10% | 0% |
| | | Derived from acrylic acid ester | BA | 0% | 0% | 0% | 0% | 0% | 0% | 0% |
| | | | MA | 0% | 0% | 0% | 0% | 0% | 0% | 0% |
| | | Other | St | 0% | 0% | 0% | 10% | 0% | 15% | 10% |
| | Tg(° C.) of <Polymer block (A)>$_{Total}$ | | | 102 | 104 | 104 | 98 | 102 | 99 | 98 |
| | Preparation ratio (mass %) | | Derived from methacrylic acid ester | 100% | 100% | 100% | 90% | 100% | 85% | 90% |
| | | | Derived from methyl methacrylate | 95% | 99% | 99% | 80% | 95% | 75% | 80% |
| Polymer block (B) | Monomer (mass %) | Derived from methacrylic acid ester | BMA | 0% | 0% | 0% | 0% | 0% | 0% | 0% |
| | | | LMA | 0% | 0% | 0% | 20% | 0% | 0% | 0% |
| | | Derived from acrylic acid ester | BA | 100% | 0% | 95% | 80% | 100% | 80% | 90% |
| | | | 2EHA | 0% | 98% | 5% | 0% | 0% | 10% | 0% |
| | | | SHA | 0% | 2% | 0% | 0% | 0% | 2% | 0% |
| | | | AA | 0% | 0% | 0% | 0% | 0% | 0% | 8% |
| | | | AA modified with 1,2-ethanedithiol | 0% | 0% | 0% | 0% | 0% | 0% | 2% |
| | | | 2-MTA | 0% | 0% | 0% | 0% | 0% | 8% | 0% |
| | Tg(° C.) of <Polymer block (B)[X]> | | | −45 | −54 | −46 | −49 | −45 | −46 | −43 |
| | Preparation ratio (mass %) | | Derived from acrylic acid ester | 100% | 100% | 100% | 80% | 100% | 100% | 100% |
| | | | Derived from butyl acrylate | 100% | 0% | 95% | 80% | 100% | 87% | 90% |

| | | | | Example | | | | | | |
|---|---|---|---|---|---|---|---|---|---|---|
| | | | | R13 | R14 | R15 | R16 | R17 | R18 | R19 |
| Production Example | | | | C13 | C14 | C15 | C16 | C17 | C18 | C19 |
| Polymerization method | | | | RMCP | RMCP | RMCP | RMCP | RMCP | RMCP | RMCP |
| Polymerization initiator | | | | EMA-II | EMA-III | EMA-II | Synthesis 2 | Synthesis 4 | EMA-II | EMA-III |
| Number of q in case of [A-B]$_q$X or A-B-A triblock structure | | | | 2 | 3 | 2 | 4 | 6 | 2 | 3 |
| Polymer block (A) | Monomer (mass %) | Derived from methacrylic acid ester | MMA | 75% | 100% | 50% | 99% | 70% | 5% | 85% |
| | | | BMA | 0% | 0% | 0% | 0% | 5% | 0% | 0% |
| | | | SHMA | 0% | 0% | 0% | 1% | 0% | 0% | 0% |
| | | | AMA | 21% | 0% | 0% | 0% | 0% | 0% | 0% |
| | | | AMA modified with 1,2-ethanedithiol | 4% | 0% | 0% | 0% | 0% | 0% | 0% |
| | | | HEMA | 0% | 0% | 0% | 0% | 10% | 0% | 10% |
| | | Derived from acrylic acid ester | BA | 0% | 0% | 0% | 0% | 5% | 0% | 0% |
| | | | MA | 0% | 0% | 0% | 0% | 5% | 0% | 5% |
| | | Other | St | 0% | 0% | 50% | 0% | 5% | 95% | 0% |
| | Tg(° C.) of <Polymer block (A)>$_{Total}$ | | | 90 | 105 | 102 | 104 | 77 | 100 | 93 |
| | Preparation ratio (mass %) | | Derived from methacrylic acid ester | 100% | 100% | 50% | 100% | 85.0% | 5% | 95% |
| | | | Derived from methyl methacrylate | 75% | 100% | 50% | 99% | 70% | 5% | 85% |
| Polymer block (B) | Monomer (mass %) | Derived from methacrylic acid ester | BMA | 0% | 0% | 15% | 0% | 10% | 50% | 0% |
| | | | LMA | 0% | 0% | 15% | 0% | 0% | 0% | 0% |
| | | Derived from acrylic acid ester | BA | 100% | 100% | 70% | 100% | 80% | 40% | 85% |
| | | | 2EHA | 0% | 0% | 0% | 0% | 0% | 0% | 0% |
| | | | SHA | 0% | 0% | 0% | 0% | 0% | 0% | 0% |
| | | | AA | 0% | 0% | 0% | 0% | 9% | 5% | 0% |
| | | | AA modified with 1,2-ethanedithiol | 0% | 0% | 0% | 0% | 1% | 5% | 0% |
| | | | 2-MTA | 0% | 0% | 0% | 0% | 0% | 0% | 15% |
| | Tg(° C.) of <Polymer block (B)[X]> | | | −45 | −45 | −41 | −45 | −37 | −14 | −46 |
| | Preparation ratio (mass %) | | Derived from acrylic acid ester | 100% | 100% | 70% | 100% | 90% | 50% | 100% |
| | | | Derived from butyl acrylate | 100% | 100% | 70% | 100% | 80% | 40% | 100% |

TABLE 4

|  | Example | | | | | | | |
|---|---|---|---|---|---|---|---|---|
|  | R6 | R7 | R8 | R9 | R10 | R11 | R12 | R13 |
| Production Example | C6 | C7 | C8 | C9 | C10 | C11 | C12 | C13 |
| Properties of block copolymer (C) | | | | | | | | |
| Mn | 79,000 | 95,000 | 148,000 | 239,000 | 15,000 | 118,000 | 320,000 | 67,000 |
| Mw/Mn | 1.1 | 1.9 | 1.9 | 2.2 | 1.2 | 1.4 | 1.6 | 1.3 |
| Mass % of (hydrophobic) ethylenically unsaturated monomer | 99% | 98% | 100% | 98% | 99% | 90% | 98% | 99% |
| Conent (mass %) of polymer block (A) | 30% | 45% | 23% | 19% | 27% | 50% | 40% | 20% |
| Introduction of mercapto group | | | | | | | | |
| Presence of mercapto group | Yes | Yes | Yes | Yes | Yes | Yes | Yes | Yes |
| Introduction method | Monomer copolymerization | Monomer copolymerization | Monomer copolymerization | Thiol-ene reaction | Monomer copolymerization | Monomer copolymerization | Thiol-ene reaction | Thiol-ene reaction |
| Introduction position | A | A + B | A | A | A | B | A + B | A |
| Main chain or terminal | Main chain | Main chain | Main chain | Main chain | Main chain | Main chain | Main chain | Main chain |
| Thiol group concentration (mmol/g) | 0.092 | 0.114 | 0.016 | 0.069 | 0.092 | 0.076 | 0.094 | 0.036 |
| Iodine content (ppm) | — | — | — | — | 250 | 0.1 | 700 | 50 |

|  | Example | | | | | |
|---|---|---|---|---|---|---|
|  | R14 | R15 | R16 | R17 | R18 | R19 |
| Production Example | C14 | C15 | C16 | C17 | C18 | C19 |
| Properties of block copolymer (C) | | | | | | |
| Mn | 126,000 | 289,000 | 28,000 | 85,000 | 5,000 | 9,400 |
| Mw/Mn | 1.4 | 2.1 | 2.5 | 1.2 | 1.3 | 1.2 |
| Mass % of (hydrophobic) ethylenically unsaturated monomer | 100% | 100% | 100% | 99% | 96% | 86% |
| Conent (mass %) of polymer block (A) | 25% | 19% | 35% | 4% | 13% | 20% |
| Introduction of mercapto group | | | | | | |
| Presence of mercapto group | Yes | Yes | Yes | Yes | Yes | Yes |
| Introduction method | Terminal conversion | Terminal conversion | Monomer copolymerization | Thiol-ene reaction | Thiol-ene reaction | Terminal conversion |
| Introduction position | A | A | A | B | B | A |
| Main chain or terminal | Terminal | Terminal | Main chain | Main chain | Main chain | Terminal |
| Thiol group concentration (mmol/g) | 0.024 | 0.007 | 0.024 | 0.047 | 0.211 | 0.319 |
| Iodine content (ppm) | 100 | 1,200 | 2,000 | 500 | 9,500 | 4,000 |

TABLE 5

|  | Example | | | | Comparative Example | | |
|---|---|---|---|---|---|---|---|
|  | R20 | R21 | R22 | R23 | R3 | R4 | R5 |
| Production Example | C20 | C21 | C22 | C23 | J3 | J4 | J5 |
| Polymerization method | RMCP | RMCP | RMCP | RMCP | RAFT | RMCP | RMCP |
| Polymerization initiator | Synthesis 3 | Synthesis 4 | EMA-II | EMA-III | BM1448 | EMA-III | CP-I |

TABLE 5-continued

| | | | | | | | | | | |
|---|---|---|---|---|---|---|---|---|---|---|
| Number of q in case of [A-B]$_q$X or A-B-A triblock structure | | | | 5 | 6 | 2 | 3 | A-B-A | 3 | 1 |
| Polymer block (A) | Monomer (mass %) | Derived from methacrylic acid ester | MMA | 80% | 99% | 78% | 60% | 100% | 90% | 80% |
| | | | BMA | 0% | 0% | 0% | 0% | 0% | 0% | 7% |
| | | | SHMA | 0% | 1% | 4% | 20% | 0% | 0% | 3% |
| | | | HEMA | 5% | 0% | 0% | 0% | 0% | 5% | 0% |
| | | Derived from acrylic acid ester | BA | 0% | 0% | 0% | 0% | 0% | 0% | 0% |
| | | | MA | 0% | 0% | 0% | 0% | 0% | 5% | 10% |
| | | Other | St | 15% | 0% | 18% | 20% | 0% | 0% | 0% |
| | Tg(° C.) of <Polymer block (A)>$_{Total}$ | | | 101 | 104 | 102 | 94 | 105 | 118 | 84 |
| | Preparation ratio (mass %) | Derived from methacrylic acid ester | | 85% | 100% | 82% | 80% | 100% | 90% | 90% |
| | | Derived from methyl methacrylate | | 80% | 99% | 78% | 60% | 100% | 90% | 80% |
| Polymer block (B) | Monomer (mass %) | Derived from methacrylic acid ester | MMA | 2% | 0% | 0% | 0% | 0% | 0% | 0% |
| | | | BMA | 10% | 0% | 8% | 0% | 0% | 10% | 5% |
| | | | LMA | 8% | 0% | 0% | 0% | 0% | 0% | 5% |
| | | Derived from acrylic acid ester | BA | 70% | 80% | 90% | 0% | 100% | 90% | 85% |
| | | | 2EHA | 0% | 18% | 2% | 85% | 0% | 0% | 5% |
| | | | SHA | 2% | 2% | 0% | 15% | 0% | 0% | 0% |
| | | | AA | 0% | 0% | 0% | 0% | 0% | 0% | 0% |
| | | | AA modified with 1,2-ethanedithiol | 0% | 0% | 0% | 0% | 0% | 0% | 0% |
| | | | 2-MTA | 8% | 0% | 0% | 0% | 0% | 0% | 0% |
| | Tg(° C.) of <Polymer block (B)[X]> | | | −40 | −46 | −41 | −49 | −45 | −40 | −44 |
| | Preparation ratio (mass %) | Derived from acrylic acid ester | | 78% | 100% | 92% | 100% | 100% | 90% | 90% |
| | | Derived from butyl acrylate | | 76% | 80% | 90% | 0% | 100% | 90% | 85% |

| | | | | Comparative Example | | | | | |
|---|---|---|---|---|---|---|---|---|---|
| | | | | R6 | R7 | R8 | R9 | R10 | R11 |
| Production Example | | | | J6 | J7 | J8 | J9 | J10 | J11 |
| Polymerization method | | | | RMCP | TERP | ATRP | RMCP | RMCP | RMCP |
| Polymerization initiator | | | | CP-I | Synthesis 1 | 3f-BiB | EMA-II | EMA-II | PhE-II |
| Number of q in case of [A-B]$_q$X or A-B-A triblock structure | | | | 1 | A-B-A | 3 | 2 | 2 | 2 |
| Polymer block (A) | Monomer (mass %) | Derived from methacrylic acid ester | MMA | 90% | 20% | 75% | 10% | 80% | 60% |
| | | | BMA | 0% | 0% | 20% | 60% | 10% | 10% |
| | | | SHMA | 0% | 2% | 1% | 0% | 0% | 0% |
| | | | HEMA | 0% | 0% | 0% | 0% | 0% | 10% |
| | | Derived from acrylic acid ester | BA | 0% | 8% | 0% | 20% | 5% | 10% |
| | | | MA | 10% | 70% | 4% | 0% | 5% | 5% |
| | | Other | St | 0% | 0% | 0% | 10% | 0% | 5% |
| | Tg(° C.) of <Polymer block (A)>$_{Total}$ | | | 92 | 17 | 79 | 16 | 77 | 62 |
| | Preparation ratio (mass %) | Derived from methacrylic acid ester | | 90% | 22% | 96% | 70% | 90% | 80% |
| | | Derived from methyl methacrylate | | 90% | 20% | 75% | 10% | 80% | 60% |
| Polymer block (B) | Monomer (mass %) | Derived from methacrylic acid ester | MMA | 0% | 15% | 55% | 0% | 0% | 0% |
| | | | BMA | 0% | 75% | 5% | 8% | 0% | 0% |
| | | | LMA | 0% | 0% | 0% | 0% | 10% | 0% |
| | | Derived from acrylic acid ester | BA | 100% | 5% | 40% | 90% | 80% | 80% |
| | | | 2EHA | 0% | 0% | 0% | 0% | 10% | 10% |
| | | | SHA | 0% | 5% | 0% | 2% | 0% | 0% |
| | | | AA | 0% | 0% | 0% | 0% | 0% | 5% |
| | | | AA modified with 1,2-ethanedithiol | 0% | 0% | 0% | 0% | 0% | 5% |
| | | | 2-MTA | 0% | 0% | 0% | 0% | 0% | 0% |
| | Tg(° C.) of <Polymer block (B)[X]> | | | −45 | 24 | 23 | −40 | −48 | −44 |
| | Preparation ratio (mass %) | Derived from acrylic acid ester | | 100% | 10% | 40% | 92% | 90% | 100% |
| | | Derived from butyl acrylate | | 100% | 5% | 40% | 90% | 80% | 80% |

TABLE 6

|  | Example | | | | Comparative Example | | |
| --- | --- | --- | --- | --- | --- | --- | --- |
|  | R20 | R21 | R22 | R23 | R3 | R4 | R5 |
| Production Example | C20 | C21 | C22 | C23 | J3 | J4 | J5 |
| Properties of block copolymer (C) | | | | | | | |
| Mn | 220,000 | 500,000 | 39,000 | 425,000 | 79,000 | 248,000 | 39,000 |
| Mw/Mn | 1.9 | 2.6 | 1.8 | 1.7 | 1.2 | 1.7 | 1.1 |
| Mass % of (hydrophobic) ethylenically unsaturated monomer | 91% | 98% | 98% | 84% | 100% | 99% | 99% |
| Content (mass %) of polymer block (A) | 24% | 45% | 60% | 30% | 30% | 25% | 45% |
| Introduction of mercapto group | | | | | | | |
| Presence of mercapto group | Yes | Yes | Yes | Yes | No | No | Yes |
| Introduction method | Monomer copolymerization | Monomer copolymerization | Monomer copolymerization | Monomer copolymerization | — | — | Monomer copolymerization |
| Introduction position | B | A + B | A | A + B | — | — | A |
| Main chain or terminal | Main chain | Main chain | Main chain | Main chain | — | — | Main chain |
| Thiol group concentration (mmol/g) | 0.115 | 0.114 | 0.164 | 1.205 | — | — | — |
| Iodine content (ppm) | 10,500 | 200 | 1 | 600 | — | 2,000 | 7,000 |

|  | Comparative Example | | | | | |
| --- | --- | --- | --- | --- | --- | --- |
|  | R6 | R7 | R8 | R9 | R10 | R11 |
| Production Example | J6 | J7 | J8 | J9 | J10 | J11 |
| Properties of block copolymer (C) | | | | | | |
| Mn | 129,000 | 82,000 | 145,000 | 389,000 | 4,500 | 521,000 |
| Mw/Mn | 1.4 | 1.1 | 1.5 | 2.4 | 1.1 | 2.4 |
| Mass % of (hydrophobic) ethylenically unsaturated monomer | 100% | 96% | 100% | 99% | 100% | 94% |
| Content (mass %) of polymer block (A) | 25% | 30% | 25% | 50% | 40% | 15% |
| Introduction of mercapto group | | | | | | |
| Presence of mercapto group | Yes | Yes | Yes | Yes | Yes | Yes |
| Introduction method | Terminal conversion | Monomer copolymerization | Monomer copolymerization | Monomer copolymerization | Terminal conversion | Thiol-ene reaction |
| Introduction position | B | A + B | A | B | A | B |
| Main chain or terminal | Terminal | Main chain | Main chain | Main chain | Terminal | Main chain |
| Thiol group concentration (mmol/g) | 0.008 | 0.306 | 0.017 | 0.076 | 0.444 | 0.206 |
| Iodine content (ppm) | 1,200 | — | — | 700 | 20 | 5,000 |

<Film Physical Property and Self-Pressure-Sensitive Adhesive Physical Property of Block Copolymer (C)>

The block copolymers (C) of Examples R1 to R23 and the block copolymers according to Comparative Examples R1 to R11 were molded into a film by the following method, and the film physical property and the self-pressure-sensitive adhesiveness were evaluated based on the following criteria. The results are shown in Table 7.

(Production of Film)

300 mL of toluene was added to 100 parts of the block copolymers according to the examples and the comparative examples to obtain resin compositions. In Comparative Example R12, a commercially available block copolymer (LA2330 commercially available from Kuraray Co., Ltd.) was used. Then, the resin compositions according to the examples and the comparative examples were applied onto a peeling-treated surface of a polyethylene terephthalate detachable film base material having a thickness of 38 μm (product name "SP-PET382050", commercially available from LINTEC Corporation) with a doctor blade so that the thicknesses after drying were 65 μm and 1 mm to prepare two levels of films. Then, both films were dried at 25° C. for 100 hours to obtain a laminate having a resin film with each film thickness.

(Tensile Strength at Break and Tensile Elongation at Break)

Laminates having a thickness of 1 mm according to the examples and the comparative examples were cut to a size of 250 mm×700 mm, and a dumbbell No. 3 test piece was drawn to prepare a test piece α. Then, a tensile test was performed on a resin film from which a detachable film was peeled off from the test piece α using a tensile test machine (RTG1310, commercially available from AND) under conditions of a temperature of 23° C., a humidity of 50%, a sample inter-chuck distance of 40 mm, and a speed of 50 mm/min, and thus the tensile strength at break and the tensile elongation at break of the resin film were measured. According to the measurement, the strength when the resin film was broken was set as the tensile strength at break, and the elongation when breakage occurred was set as the tensile elongation at break.

(Pressure-Sensitive Adhesive Force/180° Peeling Test)

Laminates having a thickness of 65 μm according to the examples and the comparative examples were cut to a size of 25 mm×100 mm to prepare a test piece β. Next, the resin film was placed on the stainless steel plate (SUS304, surface finish BA, surface roughness of 50 nm, and a size of 50 mm×125 mm) according to JIS G4305 and JIS B0601 so that it faced the stainless steel plate. Next, a 2 kg rubber roller was reciprocated once on the test piece β at a speed of 300 mm/min, and thus the test piece β and the stainless steel plate were bonded together. In addition, the detachable film was peeled off from the test piece β, and a polyethylene terephthalate film having a thickness of 25 μm specified in JIS C2318 was laminated on the resin film according to JIS Z0237. Then, a 2 kg rubber roller was again reciprocated once on the polyethylene terephthalate film at a speed of 300 mm/min, and thus a 180° peeling strength evaluation sample γ was obtained. Subsequently, using a tensile test machine (RTG1250A, commercially available from AND), the sample was left for 24 hours at a temperature of 23° C. and a humidity of 50%, and according to JIS Z0237, a 180° direction tensile test was performed at a peeling speed of 300 mm/min, and the 180° peeling strength (N/25 mm) was measured.

(Holding Force)

The test piece β was attached to the stainless steel plate according to JIS G4305 and JIS B0601 described above at a size of 25 mm×25 mm, a 2 kg rubber roller was reciprocated once on the test piece β at a speed of 300 mm/min, and thus the test piece β and the stainless steel plate were bonded together. In addition, the detachable film was peeled off from the test piece β, and a polyethylene terephthalate film having a thickness of 25 μm specified in JIS C2318 was laminated on the resin film according to JIS Z0237. Then, a 2 kg rubber roller was again reciprocated once on the polyethylene terephthalate film at a speed of 300 mm/min. Then, the sample was left for 24 hours at a temperature of 23° C. and a humidity of 50% to prepare a holding force evaluation sample δ. Then, the holding force evaluation sample δ was hung with a weight with a load of 1 kg under conditions of a temperature of 100° C. and a relative humidity of 50%, and the time until the weight fell was determined. When the weight did not fall after 20 hours, the deviation distance between the test piece β and the stainless steel plate after 20 hours was measured, and the holding force was evaluated based on the following criteria.

+++: the deviation distance was 1.0 mm or less.
++: the deviation distance was more than 1.0 mm and 10.0 mm or less.
+: the deviation distance was more than 10.0 mm and 20.0 mm or less.
NG: the deviation distance was more than 20.0 mm, or the weight fell.

Similarly, the holding force of the holding force evaluation sample δ was evaluated under conditions of a temperature of 120° C. and a relative humidity of 50% based on the above criteria.

TABLE 7

| | | Film physical properties | | Self-pressure-sensitive adhesiveness properties | | |
|---|---|---|---|---|---|---|
| | | Tensile strength at break | Tensile elongation at break | Pressure-sensitive adhesive force/180° peeling test Against stainless steel | Holding force | |
| | Polymer used | MPa | % | N/25 mm | 100° C. | 120° C. |
| Example R1 | C1 | 10.0 | 700% | 10 | ++ | + |
| Example R2 | C2 | 11.5 | 800% | 11 | +++ | + |
| Example R3 | C3 | 11.0 | 900% | 12 | ++ | + |
| Example R4 | C4 | 12.0 | 850% | 10 | ++ | + |
| Example R5 | C5 | 13.8 | 1000% | 13 | ++ | + |
| Example R6 | C6 | 12.5 | 1100% | 11 | +++ | + |
| Example R7 | C7 | 12.2 | 1100% | 12 | ++ | + |
| Example R8 | C8 | 13.5 | 1100% | 13 | +++ | + |
| Example R9 | C9 | 14.2 | 1200% | 12 | +++ | + |

TABLE 7-continued

| | | Film physical properties | | Self-pressure-sensitive adhesiveness properties | | |
| | | | | Pressure-sensitive adhesive | | |
| | | Tensile strength at break | Tensile elongation at break | force/180° peeling test Against stainless steel | Holding force | |
| | Polymer used | MPa | % | N/25 mm | 100° C. | 120° C. |
|---|---|---|---|---|---|---|
| Example R10 | C10 | 18.5 | 1400% | 17 | +++ | ++ |
| Example R11 | C11 | 19.2 | 1500% | 18 | +++ | ++ |
| Example R12 | C12 | 19.0 | 1300% | 19 | +++ | ++ |
| Example R13 | C13 | 18.0 | 1400% | 18 | +++ | ++ |
| Example R14 | C14 | 20.0 | 2000% | 17 | +++ | +++ |
| Example R15 | C15 | 17.0 | 1200% | 19 | +++ | +++ |
| Example R16 | C16 | 16.4 | 1100% | 18 | +++ | ++ |
| Example R17 | C17 | 19.8 | 1200% | 19 | +++ | ++ |
| Example R18 | C18 | 10.0 | 700% | 12 | ++ | ++ |
| Example R19 | C19 | 10.3 | 800% | 10 | ++ | ++ |
| Example R20 | C20 | 11.2 | 1000% | 15 | ++ | ++ |
| Example R21 | C21 | 13.7 | 1200% | 17 | ++ | ++ |
| Example R22 | C22 | 10.0 | 1000% | 13 | ++ | ++ |
| Example R23 | C23 | 12.9 | 1300% | 19 | ++ | ++ |
| Comparative Example R1 | J1 | 4.0 | 400% | 5 | NG | NG |
| Comparative Example R2 | J2 | 9.0 | 900% | 6 | + | NG |
| Comparative Example R3 | J3 | 3.0 | 500% | 6 | + | NG |
| Comparative Example R4 | J4 | 12.0 | 700% | 7 | + | NG |
| Comparative Example R5 | J5 | 1.0 | 100% | 10 | NG | NG |
| Comparative Example R6 | J6 | 1.5 | 190% | 11 | NG | NG |
| Comparative Example R7 | J7 | 2.0 | 100% | 13 | NG | NG |
| Comparative Example R8 | J8 | 13.4 | 90% | 2 | + | NG |
| Comparative Example R9 | J9 | 3.0 | 500% | 12 | + | NG |
| Comparative Example R10 | J10 | 4.0 | 500% | 12 | ++ | NG |
| Comparative Example R11 | J11 | 9.7 | 1200% | 13 | ++ | NG |
| Comparative Example R12 | LA2330 | 6.0 | 500% | 9 | + | NG |

<Evaluation of Properties of Resin Composition (D2), Stretch Conductor, and Actuator>

The conductive material shown in Table 8 and ethyl diglycol acetate as a solvent were added to 100 parts of the block copolymers according to Examples R1 to R23 and Comparative Examples R1 to R12 so that the total solid content was 85 mass %, the mixture was then kneaded with three-roll mills, and thereby resin compositions (D2) according to Examples X1 to X22 were obtained. In addition, for comparison, resin compositions according to Comparative Examples X1 to X12 were prepared. The conductive materials used a as follows, and the contents of the block copolymer and the conductive material are as shown in Table 8.

AgC-A: flake-like conductive fine particle (D50=3.5 to 5.5 µm, commercially available from Fukuda Metal Foil & Powder Co., Ltd.) and AgC-G: chain/spherical conductive fine particle (D50=0.2 to 5.0 µm, commercially available from Fukuda Metal Foil & Powder Co., Ltd.) were used.

In addition, evaluation samples for stretch conductors and actuators were prepared using the resin compositions of the examples and the comparative examples. The evaluation results are shown in Table 8.

(Preparation of Stretch Conductor)

The obtained resin composition (D2) was applied to a urethane film base material by screen printing, and heated at 80° C. for 30 minutes to form a stretch conductor having a thickness of 25 µm.

(Preparation of Dielectric Elastic Component Forming Paste)

Barium titanate (BaTiO$_3$/ferroelectric particles) and a block copolymer (LA2330 commercially available from Kuraray Co., Ltd.) were added at a mass ratio of 45/15, and ethyl diglycol acetate as a solvent was additionally added so that the total solid content was 85 mass %, the mixture was then kneaded with three-roll mills, and thereby a dielectric elastic component forming paste was prepared.

(Preparation of Actuator)

The obtained resin composition (D2) was applied to a release polyester film base material by printing a predetermined pattern by screen printing and heated at 80° C. for 30 minutes to form a stretch conductor having a thickness of 15 µm. Next, on the obtained stretch conductor, printing, drying and curing were performed in the same manner as above using the dielectric elastic component forming paste, and a dielectric elastic layer having a thickness of 25 µm was formed. In addition, the same printing, drying and curing as above were performed using the resin composition (D2), a stretch conductor layer having a thickness of 15 µm was formed, and a capacitor having a three-layer structure was formed. The obtained capacitor was peeled off from the release polyester film, cut into a predetermined shape, and a single-layer dielectric actuator was obtained. A voltage of 0 to 1,000 V was applied to the electrode of the obtained dielectric actuator, and the rate of change in the amount of displacement and the operation of the actuator at that time were confirmed.

(Volume Resistivity)

The volume resistivity of the stretch conductors according to the examples and the comparative examples was measured. Specifically, a stretch conductor sheet was cut to a width of 10 mm and a length of 140 mm to prepare a test piece. Using a surface resistance measuring instrument (product number: Loresta AP MCP-T400, probe: ASP probe (4-pin probe, commercially available from Mitsubishi Chemical Corporation), in an atmosphere at a temperature of 25° C. and a relative humidity of 50%, the volume resistivity of the obtained test piece was measured according to JIS K7194.

The initial state was evaluated based on the following criteria.

Initial Evaluation Criteria:
+++: less than $2.0 \times 10^{-4}$ Ω·cm
++: $2.0 \times 10^{-4}$ Ω·cm or more and less than $9.9 \times 10^{-4}$ Ω·cm
+: $9.9 \times 10^{-4}$ Ω·cm or more and less than $9.9 \times 10^{-3}$ Ω·cm
NG: $9.9 \times 10^{-3}$ Ω·cm or more In addition, the volume resistivity of the stretch conductor after 10 days in an environment of a temperature of 85° C. and a relative humidity of 85% was measured by the same method, and the rate of change (change after the test) from the initial stage was evaluated based on the following criteria.

[Rate of change (%)]=[(volume resistivity of test piece before test)−(volume resistivity of test piece after test)]÷[(volume resistivity of test piece before test)]

+++: the rate of change was 20% or less.
++: the rate of change was more than 20% and 50% or less.
+: the rate of change was more than 50% and 100% or less.
NG: the rate of change was more than 100%.

(Change in Resistance Value)

The stretch conductors according to the examples and the comparative examples were formed into samples having a size of 20 mm×60 mm, the ends thereof were fixed to a Tensilon tensile test device, a stretching cycle in which the sample was extended to 50% at 25° C., a relative humidity of 50%, and a speed of 4 mm/s, then held for 2 s, then unloaded at a speed of 4 mm/s, and held for 2 s was repeated 1,000 times, and the rate of change after 1,000 times was calculated according to the following formula.

[Rate of change (%)]=[($R_{1,000}$)−($R_0$)]÷[($R_0$)]×100

Here, $R_{1000}$ indicates a resistance value immediately after the stretching cycle was repeated 1,000 times, and $R_0$ indicates a resistance value using the same film before the measurement started. The result was evaluated based on the following criteria.

+++: the rate of change was 20% or less.
++: the rate of change was more than 20% and 50% or less.
+: the rate of change was more than 50% and 100% or less.
NG: the rate of change was more than 100%.

In addition, the appearance of the stretch conductor after being shrunk 1,000 times was compared with the state before the test, and evaluated based on the following criteria.

+++: no change was observed in appearance.
++: very few cleavages such as cracks occurred in the appearance
+: at least some cleavages such as cracks occurred in the appearance.
NG: the appearance was completely fractured or cracked, and the coating film was peeled off.

(Responsiveness of Actuator Amount of Displacement of Actuator and Rate of Change Thereof)

The amount of displacement of the actuators and the rate of change thereof according to the examples and the comparative examples were obtained. Specifically, a displacement amount measurement marker was attached to one electrode of the actuator, the amount of displacement (mm) of the marker when a DC voltage of 500 V was applied with a voltage amplifier between electrodes (product number: HEOPS-10B2, commercially available from Matsusada Precision Inc.) was measured using a displacement meter (product number: LK-GD500, commercially available from Keyence Corporation), and evaluated by computing the rate of change according to the following computation formula.

The rate of change in the amount of displacement was obtained based on

[Rate of change in amount of displacement (%)]= [amount of displacement (mm)÷radius (mm) of electrode before voltage is applied]×100.

+++: the rate of change in the amount of displacement was 5.0% or more.
++: the rate of change in the amount of displacement was 2.0% or more and less than 5.0%.
+: the rate of change in the amount of displacement was 0.5% or more and less than 2.0%.
NG: the rate of change in the amount of displacement was less than 0.5%.

(Responsiveness of Actuator|Continuous Operation)

In addition, regarding the responsiveness of the actuators according to the examples and the comparative examples, the operation stop time when the continuous operation was performed was obtained. In continuous operation conditions, a sinusoidal alternating electric field having an amplitude of 500 V and a frequency of 5 kHz was applied to the obtained actuator, and evaluation was performed with a continuous operation test for 500 minutes.

TABLE 8

|  |  | Resin composition | | | Conductive material Silver | | Stretch conductor | | | | Actuator Responsiveness | |
|---|---|---|---|---|---|---|---|---|---|---|---|---|
|  |  | Polymer used | | | | | Volume resistivity (Ω·cm) | | Change in resistance value (Ω) | Electrode state | | |
|  |  | Type | Parts by mass | | Flake AgC-A | Chain/ spherical AgC-G | Initial | Change after test | Rate of change after repeated stretching 1000 times | Appearance after repeated stretching 1000 times | Rate of change in amount of displacement | Continuous operation (operation stop time) minutes |
| Example | X1 | C1 | 10 | | 90 | — | ++ | ++ | ++ | ++ | + | 280 |
|  | X2 | C2 | 19 | | — | 81 | +++ | ++ | ++ | +++ | + | 270 |
|  | X3 | C5 | 12 | | 88 | — | ++ | ++ | ++ | ++ | + | 220 |
|  | X4 | C6 | 20 | | — | 80 | ++ | ++ | ++ | ++ | ++ | 300 |
|  | X5 | C7 | 15 | | — | 85 | ++ | ++ | ++ | ++ | + | 330 |
|  | X6 | C8 | 20 | | — | 80 | ++ | ++ | ++ | ++ | ++ | 320 |
|  | X7 | C9 | 10 | | 90 | — | +++ | ++ | ++ | +++ | ++ | 340 |

TABLE 8-continued

| | | | | | Stretch conductor | | | | | |
|---|---|---|---|---|---|---|---|---|---|---|
| | Resin composition | | | | Volume resistivity (Ω·cm) | Change in resistance value (Ω) | Electrode state | Actuator Responsiveness | | |
| | Polymer used | | Conductive material Silver | | | Rate of change after repeated stretching 1000 times | Appearance after repeated stretching 1000 times | Rate of change in amount of displacement | Continuous operation (operation stop time) minutes |
| | Type | Parts by mass | Flake AgC-A | Chain/spherical AgC-G | Initial | Change after test | | | | |
| X8 | C10 | 21 | — | 79 | +++ | +++ | ++ | +++ | +++ | 440 |
| X9 | C12 | 10 | 90 | — | +++ | ++ | ++ | +++ | +++ | 420 |
| X10 | C13 | 19 | — | 81 | +++ | +++ | +++ | +++ | +++ | 500> |
| X11 | C14 | 20 | — | 80 | +++ | +++ | +++ | +++ | +++ | 500> |
| X12 | C15 | 8 | 92 | — | +++ | +++ | +++ | +++ | +++ | 500> |
| X13 | C16 | 20 | — | 80 | +++ | +++ | ++ | +++ | +++ | 460 |
| X14 | C17 | 15 | — | 85 | +++ | +++ | ++ | +++ | +++ | 480 |
| X15 | C18 | 25 | — | 75 | +++ | ++ | ++ | ++ | ++ | 380 |
| X16 | C19 | 12 | 88 | — | +++ | ++ | ++ | ++ | ++ | 340 |
| X17 | C20 | 9 | 91 | — | +++ | ++ | ++ | ++ | ++ | 450 |
| X18 | C21 | 8 | 92 | — | +++ | ++ | ++ | ++ | ++ | 480 |
| X19 | C22 | 20 | — | 80 | +++ | ++ | ++ | ++ | ++ | 360 |
| X20 | C23 | 21 | — | 81 | +++ | ++ | ++ | ++ | ++ | 310 |
| X21 | C13/LA2330 = 50/50 (mass %) | 20 | — | 80 | +++ | +++ | +++ | +++ | +++ | 500> |
| X22 | C14/LA2330 = 20/80 (mass %) | 10 | 90 | — | +++ | +++ | +++ | +++ | +++ | 500> |
| Comparative Example X1 | J1 | 20 | — | 80 | + | NG | + | + | NG | 30 |
| X2 | J2 | 19 | — | 81 | ++ | NG | + | + | NG | 30 |
| X3 | J3 | 10 | 90 | — | ++ | NG | + | + | NG | 40 |
| X4 | J4 | 12 | 88 | — | ++ | NG | + | + | NG | 50 |
| X5 | J5 | 23 | — | 77 | + | + | NG | NG | NG | 10 |
| X6 | J6 | 19 | — | 81 | ++ | + | NG | NG | NG | 10 |
| X7 | J7 | 10 | 90 | — | ++ | + | + | NG | NG | 30 |
| X8 | J8 | 8 | 92 | — | ++ | + | + | + | NG | 30 |
| X9 | J9 | 25 | — | 75 | ++ | + | ++ | ++ | NG | 280 |
| X10 | J10 | 21 | — | 79 | ++ | + | ++ | ++ | NG | 270 |
| X11 | J11 | 9 | 91 | — | +++ | + | ++ | ++ | NG | 300 |
| X12 | LA2330 | 19 | — | 81 | ++ | NG | + | + | NG | 90 |

It was confirmed that the stretch conductors and the actuators of Examples X1 to X22 formed of the resin composition (D2) containing the block copolymers of Examples R1 to R12 even after being left in a high temperature and high humidity environment (85° C., a relative humidity of 85%×10 days) exhibited excellent conductivity. In addition, it was confirmed that the appearance after the stretching test was excellent.

<Preparation of Resin Composition (D1) and Pressure-Sensitive Adhesive Film and Evaluation of Properties>

An isocyanate-based cross-linking agent (Coronate L, commercially available from Nippon Polyurethane Industry Co., Ltd.) in a formulation amount shown in Table 9 was added to 100 parts of each block copolymer shown in Table 9 to obtain resin compositions (D1) according to Examples X21 to X35. In addition, for comparison, resin compositions according to Comparative Examples X13 to X18 were prepared. In addition, an adhesive layer was formed of these resin compositions, and the film physical property and the pressure-sensitive adhesive physical property were evaluated. The production conditions and the evaluation results are shown in Table 9.

(Production of Pressure-Sensitive Adhesive Film)

The resin compositions according to examples and comparative examples were applied onto a peeling-treated surface of a polyethylene terephthalate detachable film base material having a thickness of 38 μm (product name "SP-PET382050", commercially available from LINTEC Corporation) with a doctor blade so that the thicknesses after drying were 65 μm and 1 mm to prepare two levels of films. Then, both films were dried at 40° C. for 100 hours to obtain a pressure-sensitive adhesive film which is a laminate having an adhesive layer (resin film) with each film thickness.

(Tensile Strength at Break and Tensile Elongation at Break)

According to the same method as in the above resin film, measurement was performed using an adhesive layer having a thickness of 1 mm formed of the resin composition (D1). Specifically, the test was performed after the polyethylene terephthalate detachable film base material was peeled off.

(Gel Fraction)

For the adhesive layer from which the polyethylene terephthalate detachable film base material was peeled off, the mass before immersion in toluene and the mass after immersion in toluene at room temperature for 24 hours and drying at 80° C. for 5 hours were determined, and the gel fraction was determined from the following formula.

Gel fraction (%)=[A/B]×100

A: dry mass after adhesive layer was immersed in toluene (not including mass of toluene)

B: mass of adhesive layer before immersion in toluene (Pressure-Sensitive Adhesive Force/180° Peeling Test and Holding Force)

For the adhesive layer of the pressure-sensitive adhesive film, according to the same method as in the above resin film, measurement was performed using an adhesive layer (film) having a thickness of 65 μm formed of the resin composition (D1).

In addition, the holding force of the adhesive layer was evaluated based on the following criteria. Measurement was performed in the same method as in the resin film except that the temperature was changed to 150° C.

+++: the deviation distance was 1.0 mm or less.
++: the deviation distance was more than 1.0 mm and 10.0 mm or less.
+: the deviation distance was more than 10.0 mm and 20.0 mm or less.
NG: the deviation distance was more than 20.0 mm or the weight fell.

a process (c) in which at least one or more mercapto groups are introduced at an arbitrary timing, wherein the glass transition temperature of the polymer block (A) is 20° C. or higher, the glass transition temperature of [polymer block (B)]$_q$X (where, q represents an integer of 2 or more and 6 or less) of the star-shaped block structure is lower than 20° C., and the mercapto group in the process (c) is introduced from at least one raw material of the polymer block (A), the polymer block (B) and the organic iodine-based living radical polymerization initiator, and/or is introduced into a side group, a side chain or a molecular terminal according to chemical conversion of the polymer block (A) and/or the polymer block (B).

TABLE 9

|  |  | Resin composition | | Cross-linking agent | Film physical properties | | Pressure-sensitive adhesive film | | | |
|---|---|---|---|---|---|---|---|---|---|---|
|  |  | | | | | | | Pressure-sensitive adhesive physical properties | | |
|  |  | Polymer used | | (Coronate)L/ isocyanate-based | Tensile strength at break MPa | Tensile elongation at break % | Gel fraction % | Pressure-sensitive adhesive force (against stainless steel) N/25 mm | Holding force 120° C. | Holding force 150° C. |
|  |  | Polymer used | Parts by mass | | | | | | | |
| Example | X23 | C1 | 100 | 2.0 | 20.0 | 1000% | 90% | 15 | ++ | + |
|  | X24 | C2 | 100 | 3.0 | 21.8 | 1100% | 92% | 18 | +++ | + |
|  | X25 | C5 | 100 | 1.0 | 20.0 | 1200% | 89% | 19 | ++ | + |
|  | X26 | C6 | 100 | 20.0 | 21.8 | 1600% | 96% | 17 | +++ | + |
|  | X27 | C9 | 100 | 2.0 | 28.0 | 1700% | 90% | 19 | +++ | ++ |
|  | X28 | C10 | 100 | 10.0 | 32.0 | 2000% | 99% | 24 | +++ | ++ |
|  | X29 | C12 | 100 | 5.0 | 35.9 | 2100% | 99% | 28 | +++ | ++ |
|  | X30 | C13 | 100 | 1.0 | 37.2 | 2500% | 92% | 26 | +++ | +++ |
|  | X31 | C14 | 100 | 2.0 | 39.0 | 3000% | 90% | 24 | +++ | +++ |
|  | X32 | C16 | 100 | 0.5 | 32.0 | 1300% | 87% | 28 | +++ | ++ |
|  | X33 | C17 | 100 | 4.0 | 32.0 | 1500% | 90% | 29 | +++ | ++ |
|  | X34 | C18 | 100 | 7.0 | 20.0 | 1200% | 90% | 19 | +++ | + |
|  | X35 | C19 | 100 | 0.1 | 21.0 | 1300% | 81% | 18 | +++ | + |
|  | X36 | C20 | 100 | 30.0 | 22.0 | 1500% | 99% | 20 | +++ | + |
|  | X37 | C23 | 100 | 15.0 | 24.0 | 1900% | 92% | 29 | +++ | + |
| Comparative Example | X13 | J1 | 100 | 2.0 | 4.0 | 400% | 9% | 7 | + | NG |
|  | X14 | J4 | 100 | 1.0 | 11.0 | 600% | 82% | 10 | + | NG |
|  | X15 | J6 | 100 | 20.0 | 1.5 | 180% | 49% | 9 | NG | NG |
|  | X16 | J8 | 100 | 10.0 | 13.0 | 90% | 10% | 8 | + | NG |
|  | X17 | J11 | 100 | 1.0 | 10.0 | 1200% | 79% | 16 | ++ | NG |
|  | X18 | LA2330 | 100 | 5.0 | 5.0 | 400% | 5% | 8 | NG | NG |

APPENDICES

This specification also discloses inventions of the following technical ideas understood from the above embodiments.

Appendix 1

A method of producing a block copolymer (C), including
a process (a), in which at least one organic iodine-based living radical polymerization initiator having 2 to 6 carbon-iodine bonds and a monomer mainly composed of an ethylenically unsaturated monomer for polymerizing a polymer block (B) are mixed, and living radical polymerization is initiated to obtain a star-shaped block structure having the polymer block (B) with the organic iodine-based living radical polymerization initiator residue X as a base point,
a process (b) in which a monomer mainly composed of an ethylenically unsaturated monomer for polymerizing a polymer block (A) is added and the polymer block (A) is synthesized by living radical polymerization after the process (a), and Appendix 2

A method of producing a block copolymer (C), including
a process (d) in which an organic iodine-based living radical polymerization initiator having one carbon-iodine bond and any one of a monomer mainly composed of an ethylenically unsaturated monomer for polymerizing a polymer block (A) and a monomer mainly composed of an ethylenically unsaturated monomer for polymerizing a polymer block (B) are mixed, and living radical polymerization is initiated to obtain the polymer block (A) or the polymer block (B) with the organic iodine-based living radical polymerization initiator residue as a base point,
a process (e) in which, when the polymer block (A) is polymerized in the process (d), a monomer mainly composed of an ethylenically unsaturated monomer for polymerizing a polymer block (B) is added, when the polymer block (B) is polymerized in the process (d), a monomer mainly composed of an ethylenically unsaturated monomer for polymerizing a polymer block (A) is added, and living radical polymerization is performed to obtain a diblock structure of polymer block (A)-polymer block (B) after the process (d), a process (f) in which the diblock structure is coupled with a coupling agent having 2 to 6 bonding sites to obtain a star-shaped block structure, and a process (c) in which at least one or more mercapto groups are introduced at an arbitrary timing, wherein the glass transition temperature of the polymer block (A) is 20° C. or higher, the glass transition temperature of [polymer block (B)]$_q$X (where, q represents an integer of 2 or more and 6 or less) of the star-shaped block structure is lower than 20° C., and the mercapto group in the process (c) is introduced from at least one raw material of the polymer block (A), the polymer block (B) and the organic iodine-based living radical polymerization initiator, and/or is introduced into a side group, a side chain or a molecular terminal according to chemical conversion of the polymer block (A) and/or the polymer block (B).

Appendix 3

A method of producing a block copolymer (C), including a process (g) in which at least one organic iodine-based living radical polymerization initiator having two carbon-iodine bonds and a monomer mainly composed of an ethylenically unsaturated monomer for polymerizing a polymer block (A) are mixed, and living radical polymerization is initiated to synthesize a polymer block (A), a process (h) in which a monomer mainly composed of an ethylenically unsaturated monomer for polymerizing a polymer block (B) is added, and a polymer block (B) is synthesized by living radical polymerization after the process (g), a process (i) in which a monomer mainly composed of an ethylenically unsaturated monomer for polymerizing a polymer block (A) is added, and a triblock structure of polymer block (A)-polymer block (B)-polymer block (A) is obtained by living radical polymerization after the process (h), and a process (c) in which at least one or more mercapto groups are introduced at an arbitrary timing, wherein the glass transition temperature of the polymer block (A) is 20° C. or higher, the glass transition temperature of the polymer block (B) of the triblock structure is lower than 20° C., and the mercapto group in the process (c) is introduced from at least one raw material of the polymer block (A), the polymer block (B) and the organic iodine-based living radical polymerization initiator, and/or is introduced into a side group, a side chain or a molecular terminal according to chemical conversion of the polymer block (A) and/or the polymer block (B).

Appendix 4

A block copolymer (C) obtained by the production method according to any one of Appendices 1 to 3.

INDUSTRIAL APPLICABILITY

Since the block copolymer of the present invention has excellent stretchability and can effectively reduce the occurrence of cracks during extension, it can be preferably used as a component of a resin composition for forming a pressure-sensitive adhesive film or a stretch conductor.

Priority is claimed on Japanese Patent Application No. 2019-225478, filed Dec. 13, 2019, and Japanese Patent Application No. 2020-060765, filed Mar. 30, 2020, the contents of which are incorporated herein by reference.

What is claimed is:

1. A block copolymer mainly composed of a structural unit derived from an ethylenically unsaturated monomer, which has at least one mercapto group, a number average molecular weight of 5,000 to 500,000, wherein the block copolymer contains an organic iodine-based living radical polymerization initiator residue and has any structure of the following General Formulae (2) to (4), and the polymerization unit in the General Formulae (2) to (4) is a block structure that is a triblock structure of polymer block (A)-polymer block (B)-polymer block (A) or a star-shaped block structure of [polymer block (A)-polymer block (B)]$_q$X, wherein q represents an integer of 2 or more and 6 or less, the glass transition temperature of the polymer block (A) is 20° C. or higher, the glass transition temperature of the polymer block (B) in the case of the triblock structure and the glass transition temperature of [polymer block (B)]$_q$X in the case of the star-shaped block structure are lower than 20° C., and X represents an initiator residue and/or a coupling agent residue, or its derivatives,

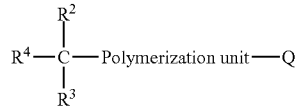

General Formula (2)

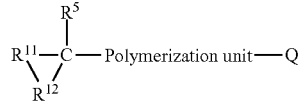

General Formula (3)

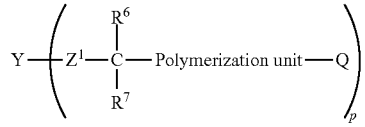

General Formula (4)

where the polymerization unit is a polymer unit mainly composed of a structural unit derived from an ethylenically unsaturated monomer independently for each branch from Y in the case of General Formula (4), $Z^1$ each independently represents a divalent group selected from the group consisting of an ester group, a ketone group and an amide group, or a direct bond for each branch from Y, Q represents a monovalent molecular terminal group, and the molecular terminal group is a functional group, a hydrocarbon group which may have a functional group, or an iodine group independently for each branch from Y, Y represents a p-valent hydrocarbon group which may have a substituent, p represents an integer of 2 to 6, $R^2$, $R^5$ and $R^6$ each independently represent a hydrogen atom or a monovalent hydrocarbon group which may have a substituent independently for each branch from Y in the case of General Formula (4), $R^3$ and $R^7$ each independently represent a hydrogen atom, a monovalent hydrocarbon group which may have a substituent or —$COR^8$ independently for each branch from Y in the case of General Formula (4), $R^4$ represents a monovalent hydrocarbon group which may have a substituent, —$COR^8$, a cyano group or a nitro group, $R^2$ and $R^3$, $R^3$ and $R^4$, $R^2$ and $R^4$ and $R^6$ and $R^7$ each independently may be bonded to each other to form a ring independently for each branch from Y in the case of General Formula (4), $R^8$ each independently represents a hydrogen atom, a hydroxy group, an alkoxy group, an amino group or a monovalent hydrocarbon group which may have a substituent, $R^{11}$ represents a divalent hydrocarbon group, which may have a substituent, $R^{12}$ represents a divalent hydrocarbon group selected from the group consisting of an alkylene group, an arylene group and an alkylene oxide group or a direct bond, and the hydrocarbon group may have a heterocycle, and each independently include at least one of a chain hydrocarbon group, an alicyclic hydrocarbon group and an aromatic hydrocarbon group.

2. The block copolymer according to claim 1, wherein at least some of the mercapto groups are introduced by a thiol-ene reaction between an alkenyl group of a precursor of the block copolymer and a compound represented by General Formula (1):

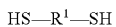  General Formula (1)

where $R^1$ each independently represents a divalent organic group having at least one selected from among an alkylene group, an arylene group, a heterocyclic group and an alkylene oxide group, which may have a substituent.

3. The block copolymer according to claim 1, which is obtained by a living radical polymerization method.

4. The block copolymer according to claim 1, wherein the polymer block (A) has a mercapto group, and the polymer block (B) does not have a mercapto group.

5. The block copolymer according to claim 1, wherein the mercapto group is introduced into at least a part of the molecular terminal.

6. The block copolymer according to claim 1, wherein the polymer block (A) contains 50 mass % or more of a structural unit derived from a methacrylic acid ester, and the polymer block (B) contains 70 mass % or more of a structural unit derived from an acrylic acid ester.

7. The block copolymer according to claim 1, wherein the polymer block (A) contains 50 mass % or more of a structural unit derived from methyl methacrylate and the polymer block (B) contains 70 mass % or more of a structural unit derived from butyl acrylate.

8. The block copolymer according to claim 1, wherein 90 mass % or more of the ethylenically unsaturated monomer is a hydrophobic ethylenically unsaturated monomer.

9. The block copolymer according to claim 1, wherein the degree of polydispersity (Mw/Mn) is 2.5 or less.

10. The block copolymer according to claim 1, wherein the content of the polymer block (A) with respect to the polymer block (A) and the polymer block (B) of the block copolymer is in a range of 1 to 50 mass %.

11. The block copolymer according to claim 1, wherein the molar concentration of the mercapto group contained in 1 g of the block copolymer is in a range of 0.00001 to 1.0 mmol/g.

12. A resin composition containing the block copolymer according to claim 1.

13. The resin composition according to claim 12, wherein the content of iodine with respect to the block copolymer is in a range of 0.0001 to 10,000 ppm (by mass).

14. The resin composition according to claim 12, which contains a cross-linking agent that is able to crosslink with the block copolymer.

15. The resin composition according to claim 12, further containing at least one conductive material selected from the group consisting of conductive fine particles and conductive nanowires.

16. A stretch conductor formed of the resin composition according to claim 15.

17. An electronic device having the stretch conductor according to claim 16.

18. A pressure-sensitive adhesive film having an adhesive layer formed of the resin composition according to claim 12.

* * * * *